United States Patent [19]

Florin et al.

[11] Patent Number: 5,594,509
[45] Date of Patent: Jan. 14, 1997

[54] METHOD AND APPARATUS FOR AUDIO-VISUAL INTERFACE FOR THE DISPLAY OF MULTIPLE LEVELS OF INFORMATION ON A DISPLAY

[75] Inventors: Fabrice Florin, Mill Valley; Michael Buettner, Burlingame; Glenn Corey, San Rafael; Janey Fritsche, Mill Valley; Peter Maresca, Palo Alto; Peter Miller, Los Altos Hills; Bill Purdy, San Anselmo; Stuart Sharpe; Nick West, both of San Francisco, all of Calif.

[73] Assignee: Apple Computer, Inc., Cupertino, Calif.

[21] Appl. No.: 81,931

[22] Filed: Jun. 22, 1993

(Under 37 CFR 1.47)

[51] Int. Cl.$^6$ ............................................. H04N 5/45
[52] U.S. Cl. .................. 348/731; 348/705; 348/734; 348/505; 348/906
[58] Field of Search ........................ 348/731, 734, 348/484, 706, 906, 467, 564, 705, 569, 462, 570, 468, 7, 563, 10, 565, 552; 358/335; H04N 5/445, 5/45

[56] References Cited

U.S. PATENT DOCUMENTS

| Re. 32,632 | 12/1985 | Atkinson | 340/709 |
|---|---|---|---|
| Re. 34,340 | 8/1993 | Freeman | 358/86 |
| 4,290,142 | 9/1981 | Schnee et al. | 455/3 |

(List continued on next page.)

FOREIGN PATENT DOCUMENTS

| 0239884 | 10/1987 | European Pat. Off. . | |
|---|---|---|---|
| 393555 | 10/1990 | European Pat. Off. | H04N 7/08 |
| 420123 | 4/1991 | European Pat. Off. | H04N 5/702 |

(List continued on next page.)

OTHER PUBLICATIONS

Alexander, Visualizing cleared-off desktops, *Computer World*, May 6, 1991, p. 20.
Hiroshi Ishii, Kazuho Arita, Clearface: Translucent Multiuser Interface for Team Work Station, *ECSCW*, Sep., 1991, pp. 6–10.
Hiroshi Ishii, Naomi Miyaka, Toward an Open Shared Workspace, *Communication of the ACM*, Dec., 1991, vol. 34, No. 12, pp. 37–50.

(List continued on next page.)

*Primary Examiner*—James J. Groody
*Assistant Examiner*—Jeffrey S. Murrell
*Attorney, Agent, or Firm*—Blakely, Sokoloff, Taylor & Zafman

[57] ABSTRACT

An interactive audio-visual (A/V) transceiver is advantageously coupled to a television and/or telephone (T/T) cable, a TV, a video recorder (VCR), and other A/V devices. The A/V transceiver switches data between a program/service provider and the connected A/V devices. In one embodiment, the transceiver includes three primary modules, a main module including a CPU, a system bus, system memory, an infra-red (IR) control unit, an audio-visual bus, an A/V decoder, an A/V processor, and an A/V encoder, an A/V connect module including a number of tuner/demodulators and a switch, and an optional CD ROM module. The A/V transceiver hardware is complemented with an operating system and software program which supports the functions provided in the A/V user interface. Additionally, a remote control device is provided to communicate with the A/V transceiver to interactively manage selection of program and service sources, selection program and service offerings from any selected source, viewing of selected program offerings, and interaction with selected service offerings. The remote control device is advantageously provided with a basic A/V control button group, an interactive control button group, an auxiliary control button group and a numeric key pad to facilitate control of the transceiver. The interactive control button group includes an info button, a list button, a categories button, a pix button, a mark button, a jump button, and a pointing device consisting of up, down, left, and right arrow buttons, and a center select button.

71 Claims, 50 Drawing Sheets

U.S. PATENT DOCUMENTS

| | | | |
|---|---|---|---|
| 4,381,522 | 4/1983 | Lambert | 358/86 |
| 4,533,910 | 8/1985 | Sukonick et al. | 340/721 |
| 4,536,791 | 8/1985 | Campbell et al. | 358/122 |
| 4,555,775 | 11/1985 | Pike | 364/900 |
| 4,573,072 | 2/1986 | Freeman | 358/86 |
| 4,622,545 | 11/1986 | Atkinson | 340/747 |
| 4,641,205 | 2/1987 | Beyers, Jr. | 358/335 |
| 4,706,121 | 11/1987 | Young | 348/906 |
| 4,748,618 | 5/1988 | Braun et al. | 370/94 |
| 4,750,036 | 6/1988 | Martinez | 358/147 |
| 4,772,882 | 9/1988 | Mical | 340/709 |
| 4,785,408 | 11/1988 | Britton et al. | 364/513.5 |
| 4,812,834 | 3/1989 | Wells | 340/721 |
| 4,829,558 | 5/1989 | Welsh | 358/84 |
| 4,847,604 | 7/1989 | Doyle | 340/706 |
| 4,847,700 | 6/1989 | Freeman | 358/343 |
| 4,873,623 | 10/1989 | Lane et al. | 364/188 |
| 4,884,223 | 11/1989 | Ingle et al. | 364/550 |
| 4,890,320 | 12/1989 | Monslow et al. | 380/10 |
| 4,899,136 | 2/1990 | Beard et al. | 340/706 |
| 4,914,517 | 4/1990 | Duffield | 358/191.1 |
| 4,914,732 | 4/1990 | Henderson et al. | 340/825 |
| 4,931,783 | 6/1990 | Atkinson | 340/710 |
| 4,935,865 | 6/1990 | Rowe et al. | 364/188 |
| 4,937,821 | 6/1990 | Boulton | 358/86 |
| 4,939,507 | 7/1990 | Beard et al. | 340/706 |
| 4,959,720 | 9/1990 | Duffield et al. | 348/734 |
| 4,977,455 | 12/1990 | Young | 358/455 |
| 4,987,486 | 1/1991 | Johnson et al. | 358/86 |
| 4,995,078 | 2/1991 | Monslow et al. | 380/10 |
| 5,008,853 | 4/1991 | Bly et al. | 364/900 |
| 5,014,125 | 5/1991 | Pocock et al. | 358/86 |
| 5,047,867 | 9/1991 | Steubbe et al. | 348/569 |
| 5,062,060 | 10/1991 | Kolnic . | |
| 5,072,412 | 12/1991 | Henderson et al. | 395/159 |
| 5,148,154 | 9/1992 | Mackay et al. | 340/712 |
| 5,151,782 | 9/1992 | Ferraro | 358/86 |
| 5,151,789 | 9/1992 | Young | 358/194.1 |
| 5,155,806 | 10/1992 | Hoeber et al. | 395/157 |
| 5,157,768 | 10/1992 | Hoeber et al. | 395/157 |
| 5,177,604 | 1/1993 | Martinez | 358/86 |
| 5,195,092 | 3/1993 | Wilson et al. | 370/94.2 |
| 5,206,722 | 4/1993 | Kwan | 358/86 |
| 5,220,420 | 6/1993 | Hoarty et al. | 358/86 |
| 5,223,924 | 6/1993 | Strubbe | 358/86 |
| 5,236,199 | 8/1993 | Thompson, Jr. | 273/439 |
| 5,239,540 | 8/1993 | Rovira et al. | 370/77 |
| 5,247,347 | 9/1993 | Litteral et al. | 358/85 |
| 5,253,066 | 10/1993 | Vogel | 348/906 |
| 5,253,067 | 10/1993 | Chaney et al. | 358/191.1 |
| 5,283,819 | 2/1994 | Glick et al. | 379/90 |
| 5,353,121 | 10/1994 | Young et al. | 348/563 |
| 5,357,276 | 10/1994 | Banker et al. | 348/7 |
| 5,404,393 | 4/1995 | Remillard | 379/96 |
| 5,410,326 | 4/1995 | Goldstein | 348/134 |
| B1 4,977,455 | 4/1993 | Young | 358/142 |

FOREIGN PATENT DOCUMENTS

| | | | |
|---|---|---|---|
| 6174476 | 4/1986 | Japan | H04N 5/445 |
| 48879 | 2/1990 | Japan | H04N 5/445 |
| 8601962 | 3/1986 | WIPO | H04N 7/16 |
| 8912370 | 12/1989 | WIPO | H04N 7/167 |
| 9001243 | 2/1990 | WIPO | H04N 7/18 |
| 396062 | 11/1990 | WIPO | H04N 7/173 |
| 9118476 | 11/1991 | WIPO | H04N 7/10 |
| 9311639 | 6/1993 | WIPO | H04N 7/16 |
| 9311640 | 6/1993 | WIPO | H04N 7/16 |
| 9311638 | 6/1993 | WIPO | H04N 7/16 |

OTHER PUBLICATIONS

Article entitled: Learning Considerations In User Interface Design: The Room Model; author: Patrick P. Chan; publication of the Software Portability Laboratory, University of Waterloo, Waterloo, Ontario, Canada, Jul., 1984.

Article entitled: Creation/Modification of the Audio Signal Processor Setup For A PC Audio Editor; publication International Business Machines, IBM Technical Disclosure Bulletin, vol. 30, No. 10, Mar. 1988.

Article entitled: Browsing Within Time–Driven Multimedia Documents; authors: Stavros Christodoulakis and Steven Graham; publication of the Institute for Computer Research, University of Waterloo, Waterloo, Ontario, Canada, Jul., 1988.

Article entitled: Impact: An Interactive Natural–Motion–Picture Dedicated Multi–Media Authoring System; authors: Hirotada Ueda, Takafumi Miyatake, and Satoshi Yoshizawa; Communications of the ACM, Mar., 1991, pp. 343–350.

Instructional manual entitled: Sonic The Hedgehog; authors: Sega of America, 1991.

42nd Annual Convention and Exposition of the National Cable Television Association, Jun. 6, 1993, SF, CA, pp. 82–89, Mack Daily "Addressable Decoder with Downloadable Operation".

18th International Television Symposium and Technical Exhibition, May 10, 1993, Montreux, Switzerland, pp. 555–567, Hoarty "Multimedia a on Cable Television Systems".

IBM Technical Disclosure Bulletin, vol. 34, No. 7A, Dec. 1991, pp. 375–377, "Interactive Computer Conference Server".

IBM Technical Disclosure Bulletin, vol. 36, No. 7, Jul. 1993, pp. 53–54, "Interactive Device for Conventional TVs to Improve Functionality".

Elektor, No. 4, Apr. 1990, pp. 10–12 "D2B–Homebus Für Audio and Video".

42nd Annual Convention and Exposition of the NCTA, Jun. 6, 1993, SF, CA, pp. 223–236, Bestler "Flexible Data Structures and Interface Rituals for Rapid Development of OSD Applications".

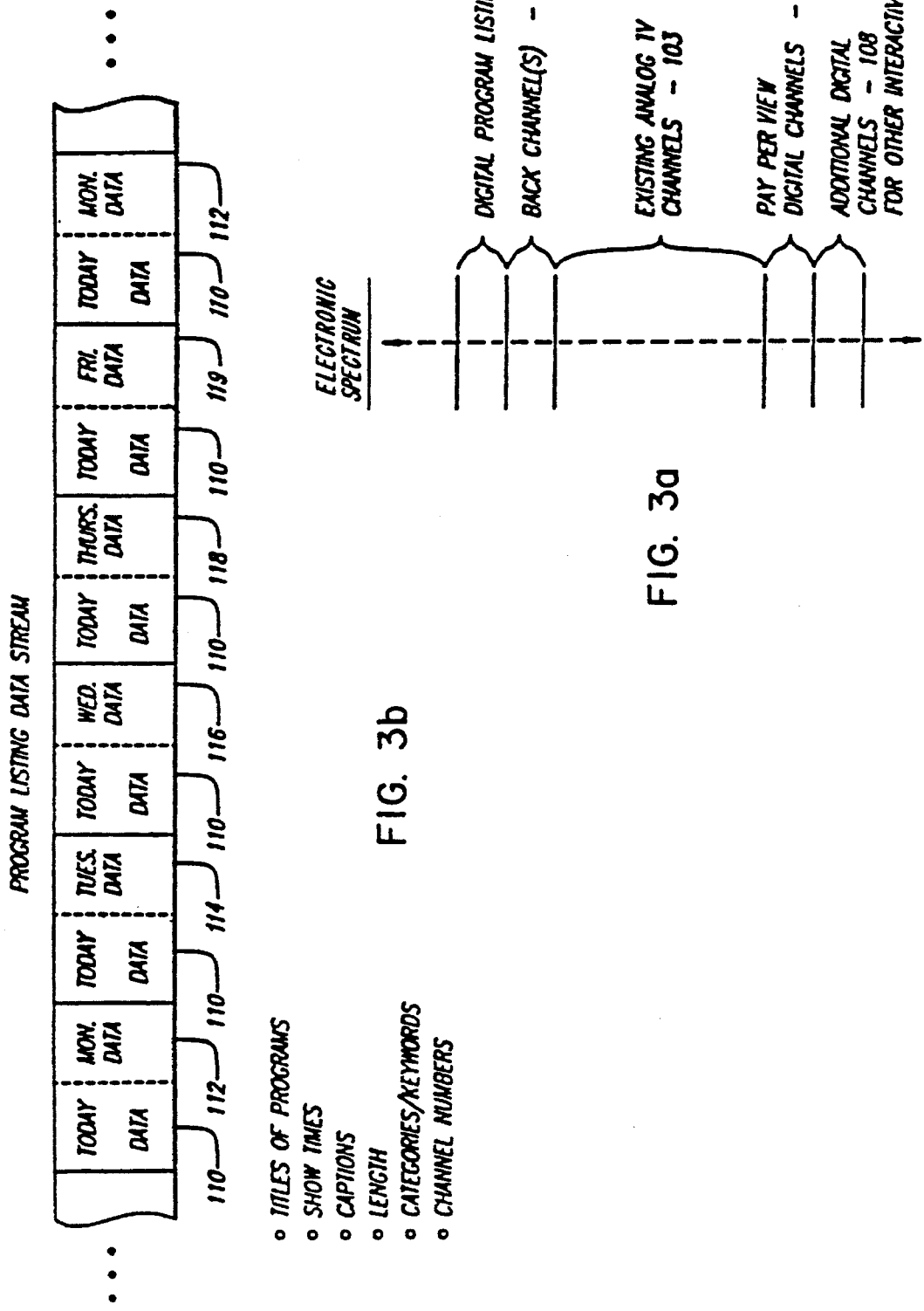

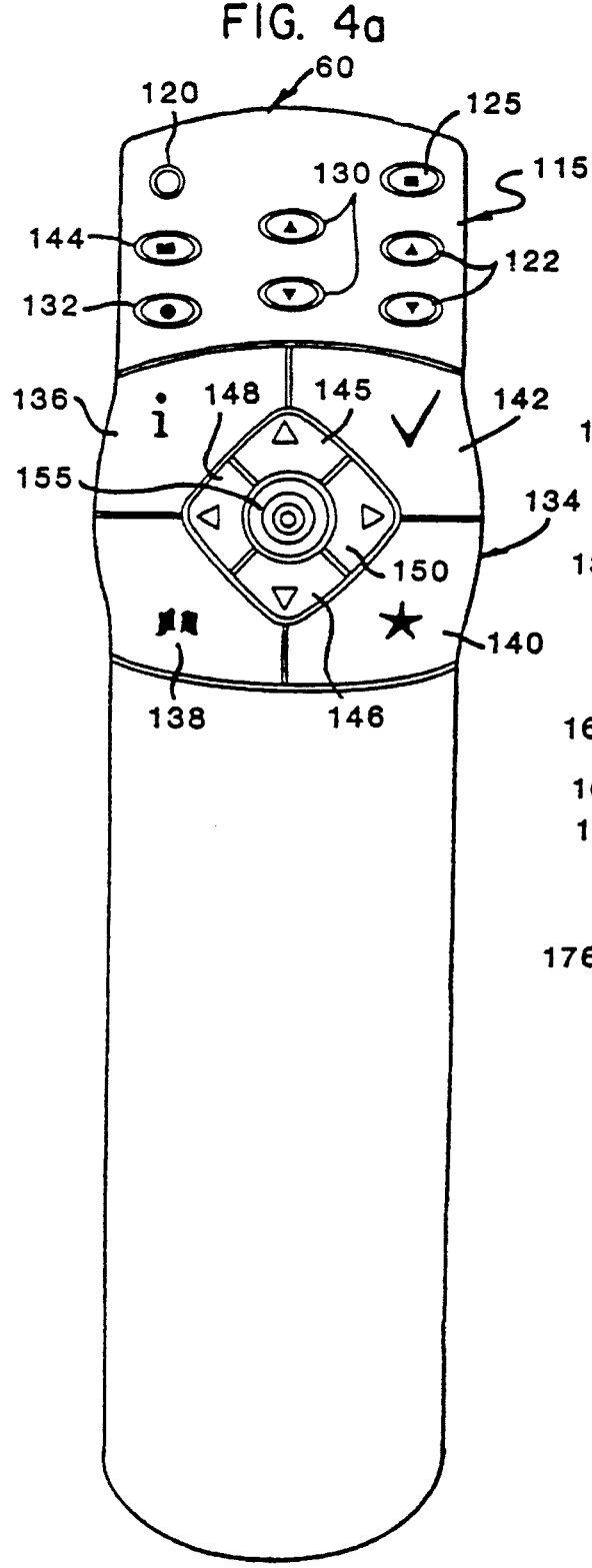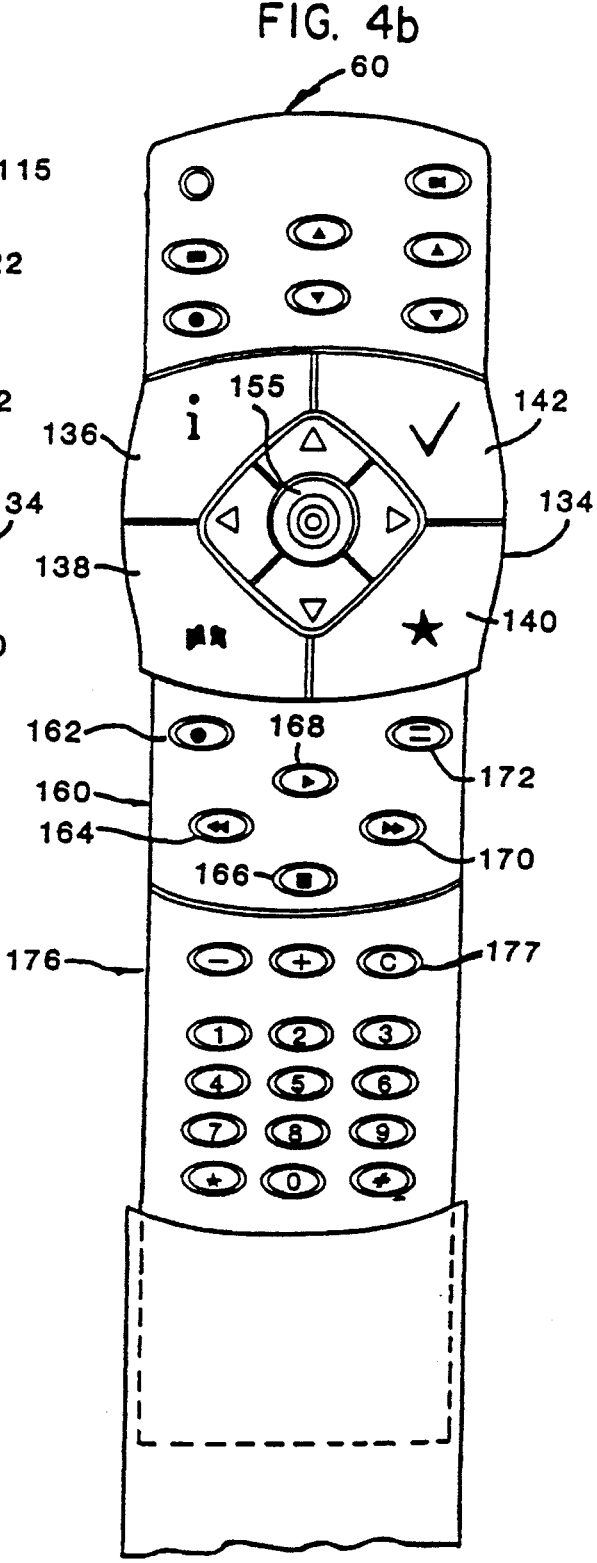

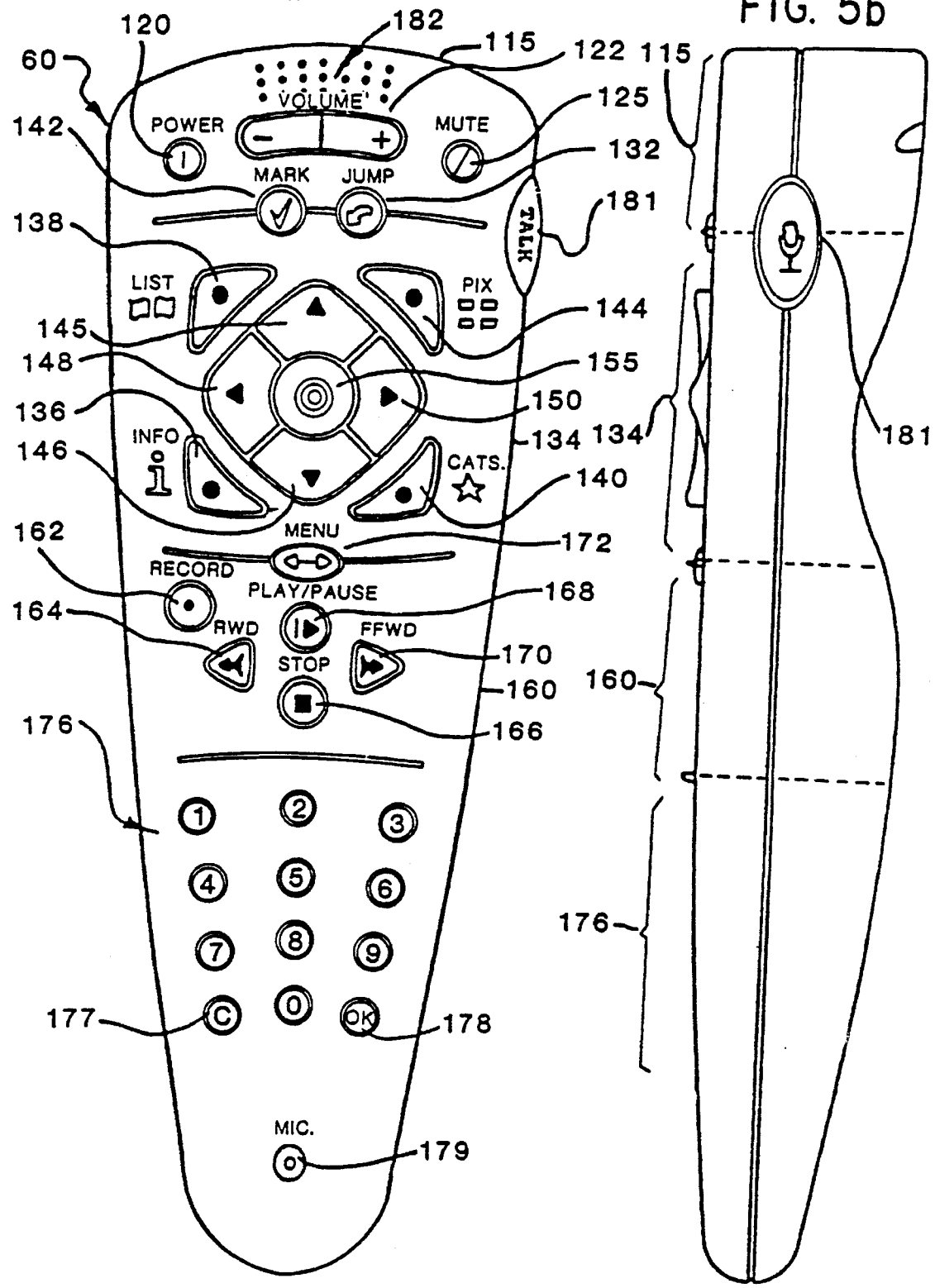

1

METHOD AND APPARATUS FOR AUDIO-VISUAL INTERFACE FOR THE DISPLAY OF MULTIPLE LEVELS OF INFORMATION ON A DISPLAY

RELATED APPLICATIONS

The present application is related to the following contemporaneously filed applications:

(a) Ser. No. 08/082,081, entitled "Method And Apparatus For Controlling An Audio-Visual System For Selectively Viewing And Interacting With Programs And Services From A Number of Program/Service Sources";

(b) Ser. No. 08/082,056, entitled "Methods And Apparatus For Managing Selection Of Audio-Visual Program And Service Offerings";

(c) Ser. No. 08/081,471, entitled "Methods And Apparatus For Managing Viewing Of And Interaction With Audio-Visual Program And Service Offerings".

BACKGROUND OF THE INVENTION

1. Field of the Invention

The present invention relates to the field of audio-visual systems. More specifically, the present invention relates to a system for selectively viewing and interacting with programs and services from a number of program/service sources, a control device for controlling the system, and the methods and apparatus incorporated in the system for managing selection, viewing, and interacting with the program/service offerings.

2. Art Background

Over the past 40 years, television and motion pictures have become an important aspect of everyday life for people in the industrialized world. The development of advanced technology in the areas of digital and high definition television (HDTV), video recording systems, laser disks and compact disc (CD) entertainment systems, coupled with satellite, cable television and telephone services, have provided opportunities for viewers to store, retrieve and selectively display a variety of television and audio-visual or interactive programming on home entertainment systems. Over the past decade, improvements in personal computing systems have provided a variety of powerful miniaturized personal computers which permit the storage of data and control of home appliances, such as entertainment systems, through the use of microprocessors. Additionally, a variety of graphic user interfaces have been developed to ease human interaction with these new personal computer systems.

The combination of computer technology with television (TV) and audio-visual (A/V) systems, has fostered the development of multi-media interactive entertainment systems. The combination of computer hardware and software with audio-visual systems has brought new forms of art and entertainment into being. CD read only memory (ROM) systems coupled to personal computers permit interactive video computer simulations, unique self-paced learning environments and interactive "movies", not possible in earlier television systems (See, "*The Revolution Starts Here*", Newsweek, page 42 (Jan. 18, 1993)). It is known that consumers desire interactive television and multi-media applications for home use. One of the biggest challenges for an interactive television service is the design of an interface that is easy and fun to use by average consumers.

2

In the computer industry, a variety of graphic user interfaces have been developed to facilitate human interaction with computer systems. Many display systems utilize metaphors in the design of the interface as a way of maximizing human familiarity, and conveying information between the user and the computer. It is well known that designing around a familiar metaphor helps reduce human learning time (See for example, Patrick Chart, "Learning Considerations In User Interface Design: *The Room Model*", Report CS-84-16, University of Waterloo Computer Science Department, Ontario, Canada, July, 1984, and the references cited therein). Research in interface design using metaphors in man-machine interfaces may be applied to multi-media systems, and in particular, to interactive television systems.

The marriage of video and television technology with computer interface technology provides consumers with maximum flexibility in storing, retrieving and viewing television and other audio-visual programming. As will be described, the present invention provides methods and apparatus for presenting an improved audio-visual user interface, which includes various user-selectable features for viewing and controlling a television, video tape recorder (VCR) and other audio-visual devices. As will be disclosed, the present invention's user interface provides a user-friendly mechanism for consumers to view, record, and play back TV and A/V programs, as well as control other A/V home entertainment devices using a remote control device. Furthermore, information such as TV program listings and additional information related to programs as well as selecting and controlling categories of interactive programs and services may be provided through the user interface of the present invention.

SUMMARY OF THE INVENTION

The present invention provides methods and apparatus for presenting an improved audio-visual user interface for selecting and displaying cable television or other audio-visual programs, as well as controlling various audio-visual devices and interactive services. The present invention assumes a service provider provides cable television and/or telephone (T/T) service to users via a T/T cable, including a digital channel of program/service listings, at least one digital back channel (from the user's home to a central file server), a number of analog TV channels, a number of digital pay-per-view channels, and other interactive services transmitted from remote storage devices such as digital file servers. Under the present invention an interactive audio-visual (A/V) transceiver is advantageously coupled to a user's television, video tape recorder, and the T/T cable. In one embodiment, the transceiver includes three primary modules. A main module includes a central processing unit (CPU) coupled over a digital system bus to system memory and, preferably, an infrared (IR) or similar wireless control unit. The main module is further coupled over an audio-visual bus to an A/V decoder, an A/V processor, an A/V encoder, a TV, an A/V connect module connected to the T/T cable, and to one or more VCRs and other A/V devices. The main module may also be coupled to an optional CD ROM module, to permit the playback of multi-media CD ROM titles, audio CDs, and the like. Other optional modules or external devices (such as additional VCRs, CDs, hard disks, telephone, fax and answering machines) may be connected to this transceiver and controlled through the use of the audio-visual user interface of the present invention. The A/V transceiver hardware is complemented with an operating system software program which supports the functions provided in the present invention's audio-visual user interface.

In operation, the cable or telephone service provider transmits an interleaved data stream preferably including a television program listing, together with program titles, program times, categories, channel numbers and the like, from a central file server on the digital channel of program listings to the transceiver. The data is interleaved such that the current day's data is followed by other weekly data.

A remote control device is preferably provided for communicating with the transceiver, and includes a number of user selectable interactive functions such as: an info button, a list button, a categories button, a pix button, a mark button, a jump button, a select button, and a pointing device consisting of a set of cross-hair arrow buttons (up, down, left, right) or other pointing devices capable of providing the same functions (such as a mouse, thumb stick or touch pad). While viewing the TV, a user may obtain additional information on a current program by depressing the info button, and obtaining more detailed information using the pointing device. By depressing the list button on the remote control device, the transceiver displays a program listing of the current programs available for viewing. Through the use of the pointing device, viewers can scroll up and down the program listing or view a highlighted program in full screen by pressing the select button. By pushing the right or left arrow buttons on the pointing device, program listings may also be viewed for different hours, days and up to several weeks in advance through the present invention's use of data interleaving. The depression of the categories button on the remote control device results in the display of a categories menu bar on the TV screen, which includes categories such as "all", "sports", "news" and "favorites". The selection of one of these categories results in the display of only programs within that category. Moreover, through the depressions of both the list button and the categories button, a program listing is displayed of the currently available programs within the selected category. Through the use of the arrow buttons on the pointing device, category listings for different times and dates up to several weeks in advance may also be viewed. The selection of the favorites category results in the display of currently available favorite programs, including programs that are frequently watched by a particular TV household, marked programs, or programs that match preselected user preferences.

The depression of the pix button results in the display of a "visual menu" of multiple picture-in-picture (PIP) windows along the perimeter of the TV screen. Each of the PIP windows displays one of the programs currently being received by the A/V transceiver in the last category selected by the viewer. The PIP windows are displayed at a variable frame rate (N) (depending on the number of windows), and are captured by one or more tuners in the transceiver. A center PIP window displays a larger video image (along with audio) of the currently highlighted PIP window. The other PIP windows can be similarly viewed by using the pointing device on the remote control. The depression of the mark button allows users to "bookmark" a particular program for later viewing. The depression of the jump button allows a user to jump between previously marked programs.

Additional features, functions, and interface screens are available to the viewer using the teachings of the present invention, including a menu button for controlling other devices connected to the A/V transceiver (such as CD, VCR, etc.), a record button for making copies of programs onto connected A/V recording devices (such as VCRs, hard disks, etc.), a plurality of control buttons for playing back, stopping, rewinding, or fast-forwarding audio-visual programs on connected A/V playback devices, a numeric keypad for dialing channel numbers, confirming financial transactions with personal identification numbers, an optional microphone with talk button for supplementing the present user interface with direct voice commands through the use of voice recognition technology, a pay-per view interface, and a home shopping interface, as well as other features described herein.

BRIEF DESCRIPTION OF THE DRAWINGS

FIG. 3a diagramatically illustrates the electronic spectrum utilized by the present invention.

FIG. 3b conceptually illustrates the present invention's use of an interleaving data stream to download program/service listings, and other information, to the present invention's A/V transceiver.

FIG. 4a illustrates one embodiment of the remote control device of the present invention with the sliding panel in a closed position.

FIG. 4b illustrates the first embodiment of the remote control device of the present invention shown in FIG. 4a with the sliding panel in an open position.

FIGS. 5a and 5b illustrate a second embodiment of the remote control device of the present invention with no sliding panel and additional features.

NOTATION AND NOMENCLATURE

Figure 1:
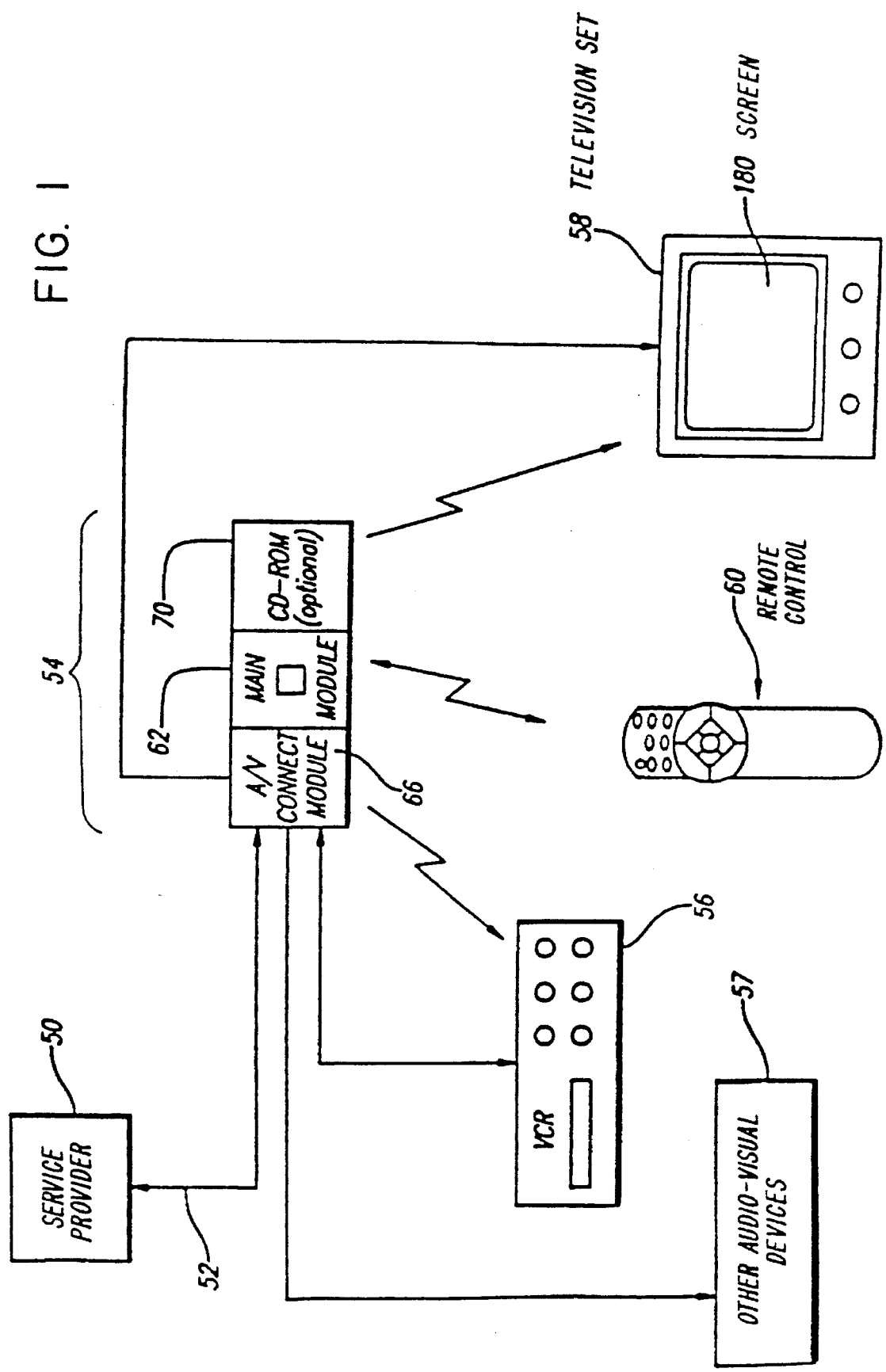
FIG. 1 is a functional block diagram of the audio-visual (A/V) system of the present invention.

The detailed descriptions which follow are presented largely in terms of interface display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantifies take the form of electrical or magnetic signals capable of being stored, transferred, combined, compared, displayed and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers, digitally controlled displays or other similar devices. In all cases, there should be borne in mind the distinction between the method operations of operating a computer and/or display system, and the method of computation itself. The present invention relates to method steps for operating a computer and interactive display system, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method steps presented herein are not inherently related to any particular computer or other apparatus. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by the Assignee, Apple Computer, Inc., as well as other manufacturers of computer and computer controlled muti-media systems.

DETAILED DESCRIPTION OF THE INVENTION

The following detailed description will be divided into several sections. The first of these will describe a general system arrangement for receiving and generating the audio-visual user interface of the present invention. Subsequent sections will deal with the functional aspects such as the present invention's interactive functions, which includes the info, list, record, mark, jump, category, pix and menu functions, as well as the overall structure and operation of the present invention's user interface.

In addition, in the following description, numerous specific details are set forth such as functional blocks representing data processing devices, and metaphors such as screen, menu and other configurations to assist the user in navigating through the user interface, etc., to provide a thorough understanding of the present invention. However, it will be apparent to one skilled in the art that the present invention may be practiced without these specific details. In other instances, well known circuits and structures are not described in detail so as not to obscure the present invention unnecessarily. For the purpose of this application, the word "audio-visual" and its abbreviation, "A/V", will be used interchangeably and will have the same meaning.

General System Configuration

The multi-media interactive television system of the present invention is illustrated in schematic form in FIG. 1. As shown in FIG. 1, a cable or telephone service provider 50 provides cable television or telephone (T/T) services over a T/T cable 52 to a plurality of users coupled to the cable or telephone system, as is known. Although in this Specification reference is made to a cable television or telephone system, it will be appreciated by one skilled in the art that the present invention may be used in conjunction with a variety of other electronic transmission systems including satellite service systems, microwave systems, fiber optic, and radio frequency (RF) systems.

As illustrated in FIG. 1, the T/T cable 52 is coupled to an audio-visual transceiver 54 which comprises a number of separately identifiable modules. The transceiver 54 is intended to be located in proximity to and coupled to a VCR 56, a television (TV) 58, as well as one or more optional audio-visual devices 57 such as additional VCRs, laser disc players, camcorders, stereos, various storage devices, telephones, faxes and answering machines, as shown. Moreover, it is contemplated that transceiver 54 may be directly incorporated into the VCR 56, the TV 58, or one the other A/V devices 57. As will be described below, a remote control device 60 communicates with the transceiver 54 preferably through a wireless transmission signal (for example, an infrared (IR) signal), or other mechanisms known in the art. Additionally, as illustrated in FIG. 1, the transceiver 54 is further capable of communicating with the television 58, the VCR 56 and the other A/V devices 57 through infrared or other means.

Figure 2:
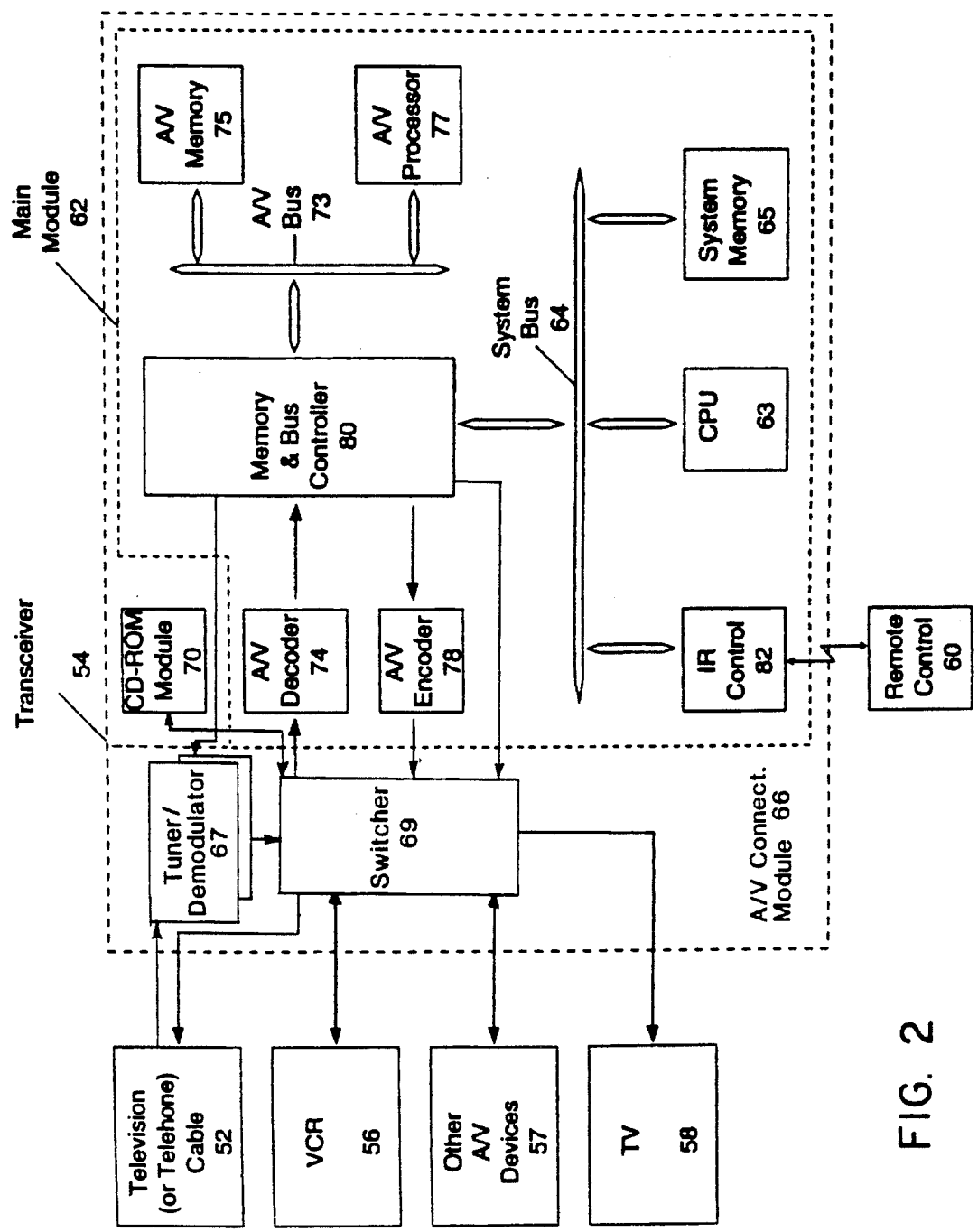
FIG. 2 is a functional block diagram illustrating the major components of the audio-visual transceiver of FIG. 1 in further detail.

Referring now to FIGS. 1 and 2, the transceiver 54 comprises three primary modules: a main module 62, an A/V connect module 66 and an optional compact disc read only memory (CD ROM) module 70. The main module 62 includes a central processing unit (CPU) 63 coupled over a system bus 64 to a system memory 65 and an infra-red (IR) control unit 82, which sends and receives wireless control signals to and from the remote control device 60. The CPU 63 is further coupled through the system bus 64 to a memory and bus controller 80, which is itself coupled through an A/V decoder 74 and an A/V encoder 78 to the A/V connect module 66, as well as to an optional CD ROM module 70. The CPU 63 is also coupled through the system bus 64, the memory and bus controller 80 and an A/V bus 73 to an A/V processor 77 and an optional A/V memory 75.

The A/V connect module 66 switches and receives analog audio-visual signals and digital data from a plurality of audio-visual sources including the T/T cable 52, the video cassette recorder (VCR) 56, or the other A/V devices 57, and couples those signals and data to the main module 62 through the video decoder 74. The A/V connect module further switches audio-visual signals and data received from the main module 62 through the video encoder 78, and sends them back out to the T/T cable 52, the VCR 56, the other A/V devices 57 and/or the TV 58. The A/V connect module 66 includes a switcher 67 and one or more programmable tuners/demodulators 69, wherein one tuner/demodulator reads and displays a current program from one of the channels received over the T/T cable 52, and additional tuners/demodulators (or the same tuner/demodulator, used in alternation) are used to read and display data from the side-band channels in picture-in-picture (pip) windows. In addition, the A/V connect module 66 may include descrambling circuitry (not shown) to descramble premium programs received over the T/T cable 52. It is further contemplated that the A/V connect module 66 provides a graphic overlay function that superimposes an A/V signal from the video encoder 78 against another A/V signal from the T/T cable 52, the VCR 56, or the other A/V devices 57 allowing both signals to be simultaneously displayed on the TV 58, the VCR 56 or the other A/V devices 57. Finally, the A/V connect module 66 can be used to transmit data such as order information to the cable (T/T) service provider 50 over a back channel 102 described below.

The A/V decoder 74 is used to decode data encoded in the vertical blanking interval or special side-band cable channels into digital data and couple them to the CPU 63 through the memory and bus controller 80 and the system bus 64. Furthermore, the A/V decoder 74 is used to convert analog audio-visual signals from the A/V connect module 66 into digital A/V data and couple them to the A/V processor 77 through the memory and bus controller 80 and the A/V bus 73. Moreover, the A/V decoder 74 may be used to resize audio-visual signals from the A/V connect module 66 in order to create picture-in-picture windows and the like. It is also contemplated that the A/V decoder 74 may be used to decompress certain analog or digital signals (such as MPEG motion video and the like) and couple them to the A/V processor 77 through the memory and bus controller 80 and the A/V bus 73.

The memory and bus controller 80 is used to route data and control signals between the system bus 64, the A/V bus 73, the A/V decoder 74, the A/V encoder 78 and the optional CD ROM module 70. The A/V bus 73 is a high-speed digital bus used to free up the system bus 64 during the transmission of large amount of audio-visual data between the A/V processor 77, the optional A/V memory 75 and, through the memory and bus controller 80, the A/V decoder 74, the A/V encoder 78, and the optional CD ROM module 70. The A/V processor 77 coupled to the A/V bus 73 is used to manipulate, process, render, mix and otherwise re-arrange digital data into coherent audio-visual displays. An optional A/V memory module 75 also coupled to the A/V bus 73 can be used to store A/V data before or after processing by the A/V processor 77 (using components such as video random access memory (VRAM) to hold, for example, a frame buffer equivalent to one 640×480×8-bit color image in memory).

The A/V encoder 78, coupled to the A/V bus 73 through the memory and bus controller 80, is used to convert digital A/V data from the A/V processor 77 or the optional A/V memory 75 into analog audio-visual signals which are routed to the TV 58, the VCR 56 or the other A/V devices through the A/V connect module 66. It is also contemplated that the A/V encoder 78 may be used to encode other data such as order information sent by the CPU 63 through the memory and bus controller 80 and the system bus 64 and transmit them to the service provider 50 through the A/V connect module 66 and a back channel 102 described below.

The CPU 63 is also coupled over the system bus 64 to a system memory 65 including both volatile and non-volatile memory components. The non-volatile part of system memory 65 includes read-only memory (such as ROM), which is used to store an operating system and playback software, fonts, sounds and the like used in the present invention. The non-volatile part of system memory 65 also includes rewritable memory (such as SRAM), which is used for persistent storage of mark or record indicators, listings of programs viewed or taped, and other user preferences. Additionally, the volatile part of system memory 65 includes sufficient random access memory (such as RAM or DRAM) for the temporary storage of data received over the T/T cable 52 or from the other devices 56–58 connected to the transceiver 54.

The transceiver 54 can also include an optional CD ROM module 70 coupled through the memory and bus controller 80 to the system bus 64 and the CPU 63. This optional CD ROM module 70 constitutes a general purpose storage device to permit playback of optical compact discs (CDs), including multi-media CD ROM titles, audio CDs, photo CDs, and motion picture CDs on the TV 58. It is contemplated that those transceivers which do not include an internal CD ROM module could instead include a CD ROM interface allowing users to connect an external CD ROM drive to the transceiver 54 at a later date. It is also contemplated that this CD ROM module 70 may in the future use different electronic, magnetic, optical or storage technologies other than the current CD ROM embodiment.

Additional modules may be added to the transceiver 54 including, for example, such options as a small computer system interface (SCSI) for accessing digital storage devices such as hard disks, a modem for exchanging digital data over telephone lines, or a serial port for controlling other devices over a wired connection. Another module presently being contemplated is a remote beeper button for locating the remote control device 60. Many consumers often misplace their remote control devices, and it is contemplated that the present invention may provide a function wherein a speaker on remote control 60 would beep while the beeper button is pressed until the user locates the remote control.

Referring now to FIG. 3a, there is shown one possible electronic spectrum of signals provided by the cable T/T service provider 50 over the T/T cable 52 to the transceiver 54. As illustrated in FIG. 3a, the spectrum includes at least one digital program listing channel 100, a plurality of back channels 102, and a plurality of standard analog TV channels 103. In addition, and as will be described more fully below, the spectrum includes pay-per-view digital channels 106, and further additional definable digital channels 108 offering a variety of interactive services, in addition to the general purpose or special channels or services particular to the specific application of the present invention.

As illustrated in FIG. 3b, the digital program listing channel 100 provides data representing daily and weekly program listings and related information from the service provider 50 to the transceiver 54. As shown in FIG. 3b, the listing channel 100 includes a repetitive data stream having data representing today's listing 110 interleaved with weekly listings. For example, there is shown today's data 110, followed by Monday's data 112, and then once again followed by today's data 110. As seen in FIG. 3b, Tuesday's data 114 is followed once again by today's data 110, and thereafter by Wednesday's data 116. Wednesday's data 116 is followed by today's data 110, and thereafter by Thursday's data 118. Thursday's data 118 is followed once again by today's data 110, and thereafter by Friday's data 119. Finally, following today's data 110, Monday's data 112 is once again transmitted along the data stream provided by the service provider 50. For programming purposes, the data preferably will include titles of programs, show times, special captions, length information, categories, and key words, as well as channel numbers provided from the service provider 50 over the T/T cable 52, and received by the transceiver 54. The data stream is an interleaved data stream which repeats on a weekly basis as shown in FIG. 3b. It is presently contemplated that there would be at least 100 different channels of programs and/or services. A weekly program/service listing with information relating to 100 channels of programs/services could require over 2 megabytes of information. This data stream of programs/services listing information (illustrated in FIG. 3b) is received by the transceiver's main CPU module 62, whereafter the sections that are most relevant to the users are stored in the system memory 65. By interleaving the current day's data with the weekly data, the daily data, the CPU module 62 can update the system memory 65 periodically and still provides quick access to the viewer, without having to store all the received program/service information, thereby reducing the amount of system memory 65 required and the associated hardware cost.

Referring once again to FIG. 3a, the back channels 102 are used to engage in a variety of transactions, such as ordering products, home banking services and pay-per-view movies, as will be described more fully below. In operation, any request by a user to view a pay-per-view movie or order a product is transmitted to the service provider 50 over at least one back channel 102 through the T/T cable 52. It is contemplated that as channel capacity increases, so will the number of back channels, allowing for broader band two-way communications such as telephone conversations or interaction with on-line networks.

Referring now to FIGS. 4a, 4b, and FIGS. 5a and 5b, two alternative embodiments of the remote control device 60 are shown in further detail. It is expected that the model shown in FIGS. 5a and 5b would be more commonly used. As illustrated in the figures, both embodiments of the remote control device 60 are comprised of four control button groups 115, 134, 160 and 176. These control button groups 115, 134, 160 and 176 will first be described briefly here, and their usage will be described in further detail below.

The first control button group is the basic control button group 115 which includes standard television control buttons such as power on/off button 120, volume control button 122 and a mute button 125. Moreover, channel up/down buttons 130 are provided to the embodiment illustrated in FIGS. 4a and 4b to increment or decrement the currently viewed channel on television 58, as is well known. For the embodiment illustrated in FIGS. 5a and 5b, the channel control function is effectuated using the up and down arrow buttons 145 and 146.

The second control button group is the interactive control button group 134 which includes an info button 136, a list button 138, a categories button 140, and a mark button 142. The info button 136 permits the user to obtain multiple levels of information on programs while the user is watching one of the program offerings on the TV 58 (or other A/V devices). The list button 138 permits the user to view listings for programs/services. In the presently preferred embodiment, when TV is selected, the list button 138 permits the user to view current and future TV listings up to one week in advance. The categories button 140 permits the viewer to select programs/services by category. For example, and as will be described below, the user may desire to watch only sports programs, only news programs, or the like. As will be disclosed, the categories button 140, and the list button 138 operate in concert to provide listings of selected categories, such as sports or news programs, on the TV 58. The mark button 142 permits the user to mark programs for reminders, later recall, or switching between programs which have been selected using the mark button 142. A jump button 132 lets the user switch to the program that was last marked, then to the program that was marked before that, and so on, until all marked programs have been shown, looping back to the last marked program again. As shown in FIGS. 5a and 5b, the jump button 132 and the mark button 142 are placed side by side together on the dividing line between the first and second control button groups 115 and 134 to emphasize their interrelation.

Also provided with the interactive control button group 134 is a pointing device consisting of an up arrow button 145, a down arrow button 146, a left arrow button 148, and a right arrow button 150. For example, if the user is viewing a program/service listing through the use of list button 138, and desires to scroll up or down within the listing, the up arrow button 145 and the down arrow button 146 are utilized. In addition, a center select button 155 is provided for permitting the user to select one of several choices, represented by words or icons in graphic menus or lists displayed on the TV 58, for example a "bull's eye" as shown in FIG. 5a. As will be described, the interactive control button group 134 may be used in a variety of applications, including selection of pay-per-view channels, home shopping services, and the like, as well as to display and control programs from other A/V devices connected to the transceiver 54.

The third control button group is the auxiliary control button group 160 comprising various A/V control buttons for controlling the VCR 56 or the other A/V devices 57 connected to the transceiver 54. As illustrated in FIG. 5a, the auxiliary control button group 160 includes a record button 162, a rewind button 164, a stop arrow button 166, a play/pause button 168, a fast forward button 170, and a menu button 172. In accordance with the teachings of the present invention, the user depresses the record button 162 while watching a television program on TV 58, which brings up a record panel confirming the current program's title and length, along with a highlighted select icon and confirmation of which A/V device and type to use for recording. Once the center select button 155 is depressed, the VCR 56 or the other selected A/V device 57 begins to record the program currently being viewed by the user. Alternatively, if the user has pressed list button 138, and a program listing is highlighted, pressing the record button 162, and then the center select button 155 results in the VCR 56 being programmed to record the particular show highlighted in the program listing. Pressing the menu button 172 displays icons for all the A/V devices 57 currently connected to the transceiver 54 and allows users to select another device with the arrow buttons. Pressing the center select button 155 displays the output of that device and lets the user control that device.

The fourth control button group is the numeric keypad panel 176, which permits the user to directly enter channel numbers to be viewed on the TV 58 by pressing a single, double or triple digit number, followed by the ok button 178 (FIG. 5a). For the remote control device 60 shown in in FIG.

4b, the user would depress the select button 155 after entering values using the keypad 176. In addition, the numeric keypad 176 may be used by the user to enter a personal identification number ("PIN"), to be transmitted to the service provider 50 through the A/V connect module 66 for payment of pay-per-view movies, products and the like.

In addition to the control button groups, both embodiments comprise a transmitter (not shown) for transmitting signals to the audio-visual system. Additionally, the model illustrated in FIGS. 5a–5b is further provided with a talk button 181, a microphone 179, a speaker 182 and a receiver (not shown). The talk button 181 when depressed allows the user to speak into the microphone 179, thereby providing input to the A/V system through voice, and receive voice feedback from the A/V system through the speaker 182.

Full Screen Viewing Function

Figure 6:
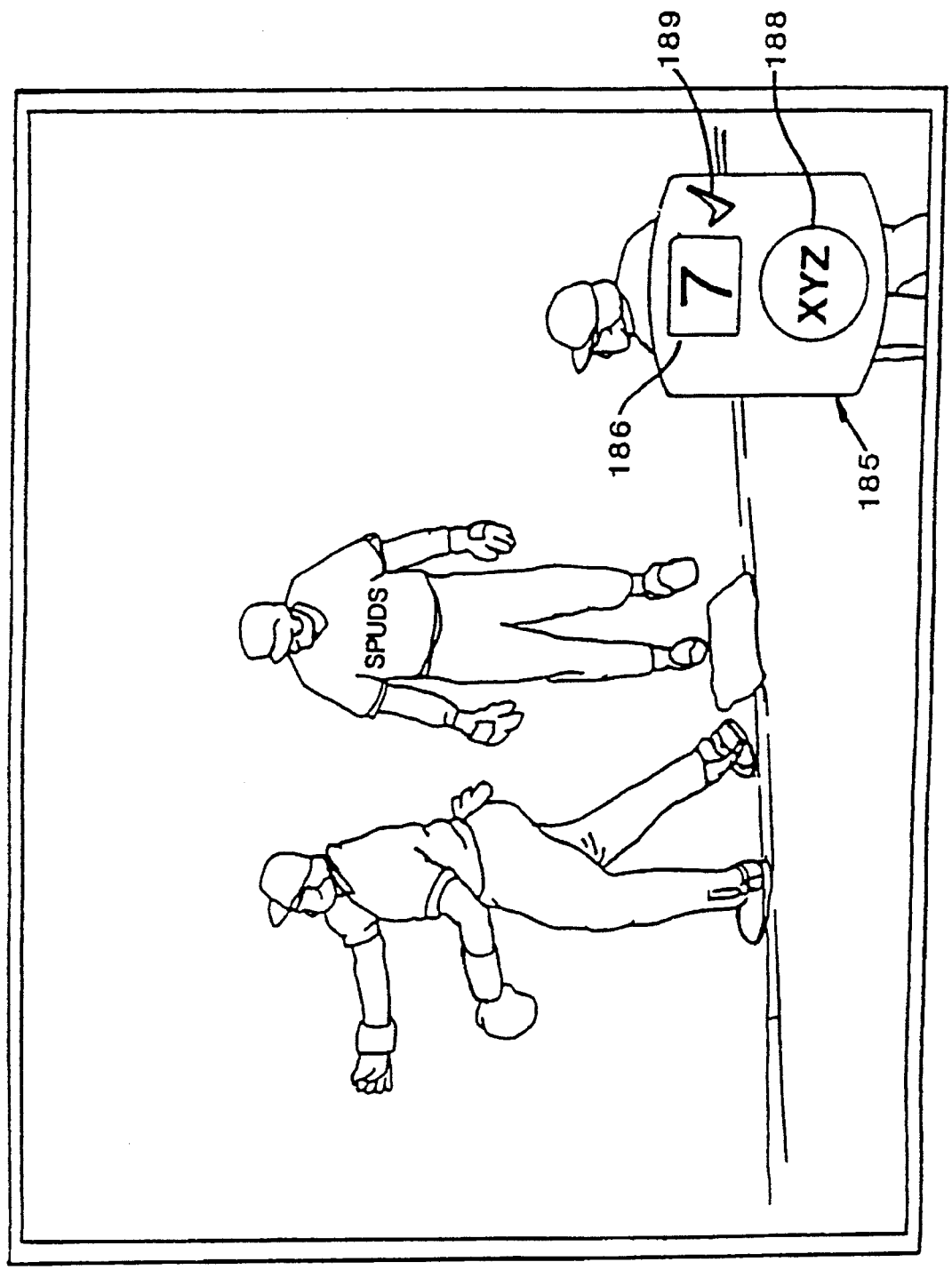
FIG. 6 illustrates the present invention's full screen viewing function as viewed by a user with a graphic overlay panel which includes the current channel number as well as the channel logo and identifier.

Referring now to FIG. 6, there is shown a representative full screen audio-visual program displayed on the screen 180 of the TV 58. By depressing the channel up/down buttons 130 on the remote in FIGS. 4a and 4b, (or by depressing the up and down arrow buttons 145 and 146 on the remote control device in FIGS. 5a–5b), users can switch channels as is commonly done with regular TV remotes. As the user selects a channel to view using the remote control device 60, a graphic overlay panel 185 is displayed in the lower right hand portion of screen 180. As illustrated, the graphic overlay panel 185 includes the channel number currently being viewed 186 along with the channel logo and identifier 188. Additionally, a marking identifier 189, such as a check mark, is also displayed, as will be described, to indicate that the program has been marked through the use of the mark button 142 previously discussed with reference to the remote control device of FIGS. 4a, 4b, and FIGS. 5a and 5b.

Information Function

Figure 7:
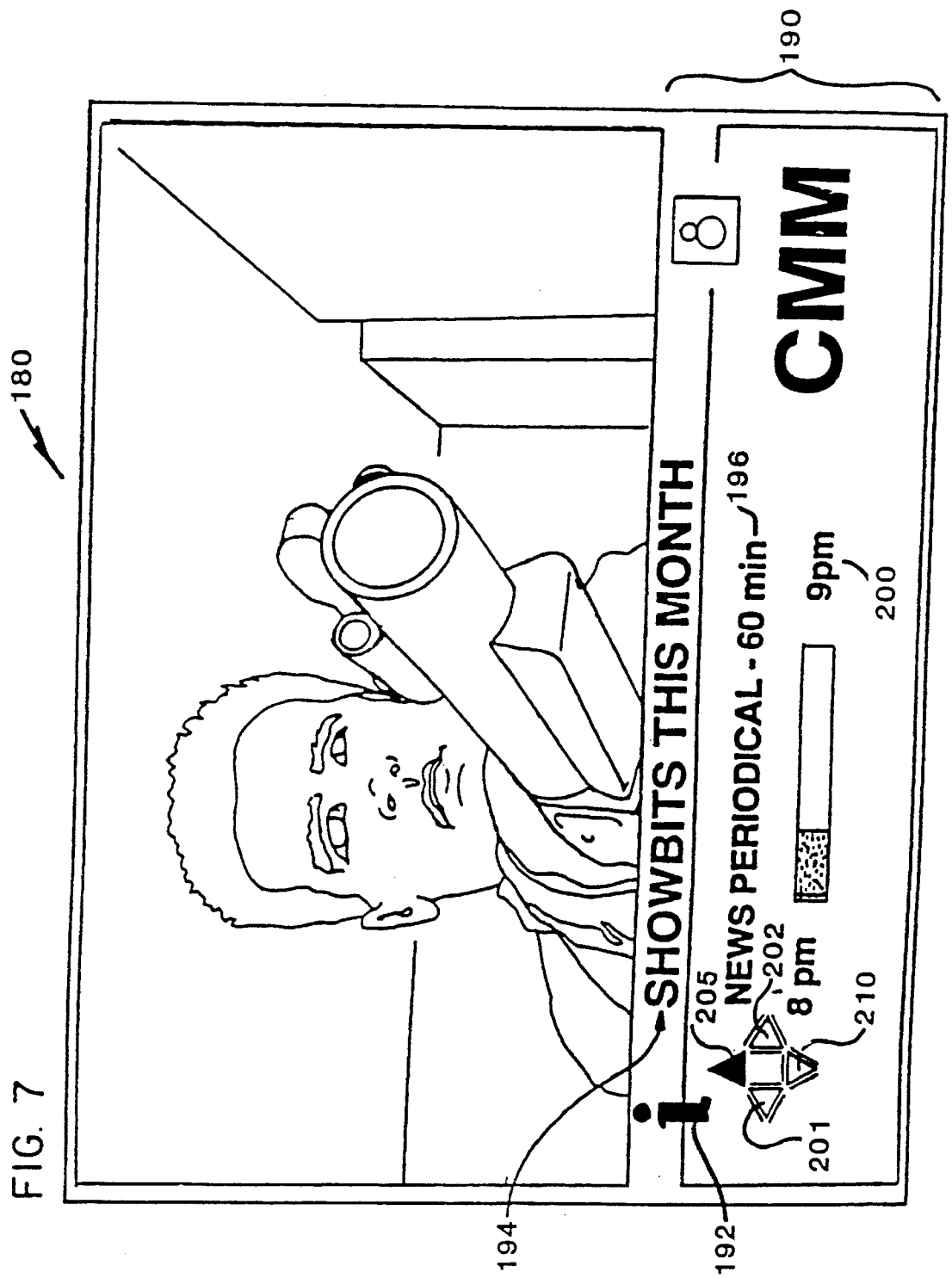
FIG. 7 illustrates the present invention's info function showing the first page of the basic information track ("infotrack").

Referring now to FIG. 7, there is shown the screen 180 in which the information (info) function 136 has been requested by the user. As the user is watching a particular television program on the TV 58, he may depress the info button 136 to obtain information in the form of a graphic overlay panel 190 on the screen 180. In operation, the transceiver 54 coupled with the main module 62 through the A/V connect module 66 superimposes the graphic overlay panel 190 against the currently displayed video image. This process is also used in other functions, such as the full screen viewing function, where the graphic overlay panel 185 is superimposed on the screen 180. The overlay graphic panel 190 contains an "i" logo 192 indicating that the information button 136 has been depressed, and also displays the title of the currently viewed program 194 ("Showbits This Month" in this example), a category name 196 ("News" in this example), and the length of the overall program ("60 min" in this example). In addition, the channel number and network logo ("8" and "CMM" in this example) are also provided to the user. Also, as illustrated in FIG. 7, the overall length of the currently viewed program is graphically illustrated, by a time bar 200 showing how much time remains before the program ends. A left arrow 201, a right arrow 202, and a down arrow 210 are displayed and highlighted to indicate that the left arrow button 148, the right arrow button 150, and the down arrow button 146, of the remote control device 60 can be depressed to cause additional information to be displayed. An up arrow 205 is also displayed, but is not highlighted, to indicate that no additional information will be displayed if the up arrow button 145 is depressed.

Figure 8:
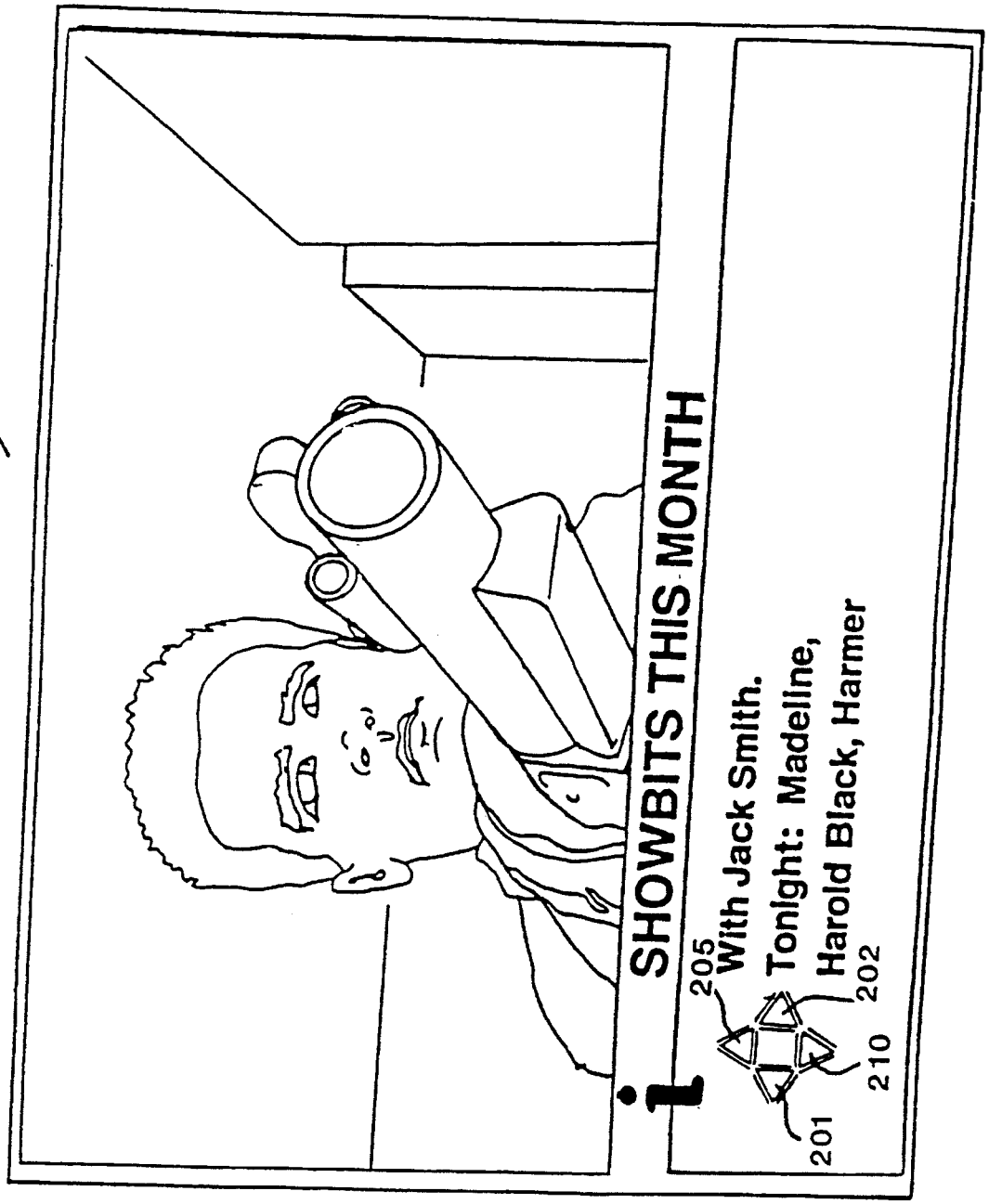
FIG. 8 illustrates the present invention's info function with a second page of basic information, obtained by using the right arrow button on the remote control device.
Figure 9:
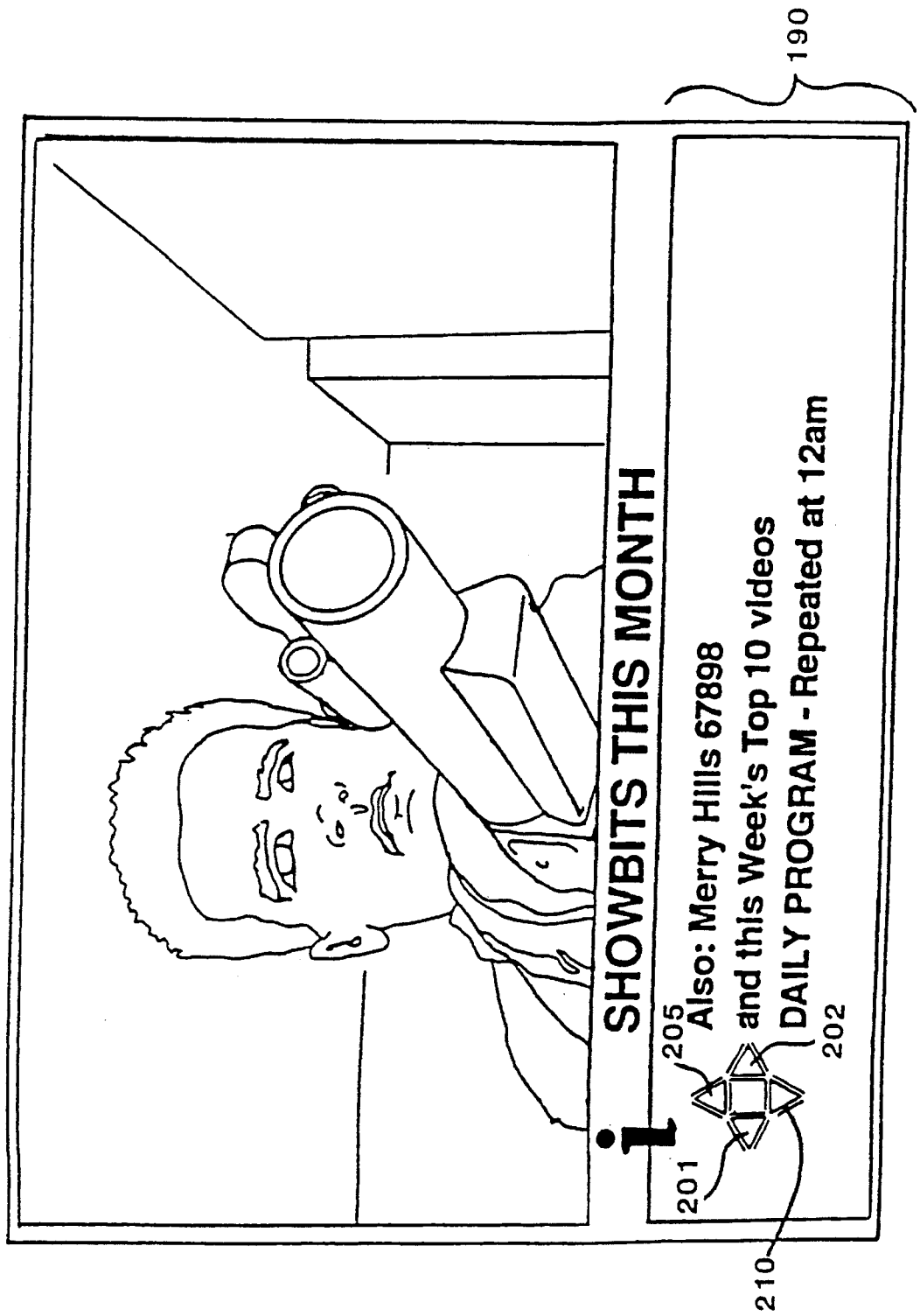
FIG. 9 is an additional illustration of the info function of the present invention in which the user has requested a third page of information using the remote control device.

Referring now to FIG. 8, which illustrates a new graphic overlay panel 190 displayed in response to the user having depressed the right arrow button 150 on the remote control device 60 while using the information function. The transceiver 54 provides additional information on the currently viewed program. As illustrated, an additional page of information on the program currently viewed is displayed. For example, additional guests on the show "Showbits This Month" include "Madeline, Harold Black and Harmer". Referring now to FIG. 9, which illustrates another new graphic overlay panel 190 displayed in response to the user having depressed the right arrow button 150 again. A third page of information is displayed on the screen 180 relating to the currently viewed program "Showbits This Month". It will be noted that the currently viewed television program ("Showbits This Month" in this example) continues to be viewed in the main portion of the screen 180, while different graphic overlay panels 190 are superimposed over the lower third portion of the screen 180.

In the currently preferred embodiment, a user may selectively move between pages of information relating to the currently viewed program by pressing the right arrow button 150 or the left arrow button 148 on the remote control device 60, or alternatively, the main module 62 will automatically scroll through the various pages of information with a predetermined amount of display time for each page of information.

Figure 10:
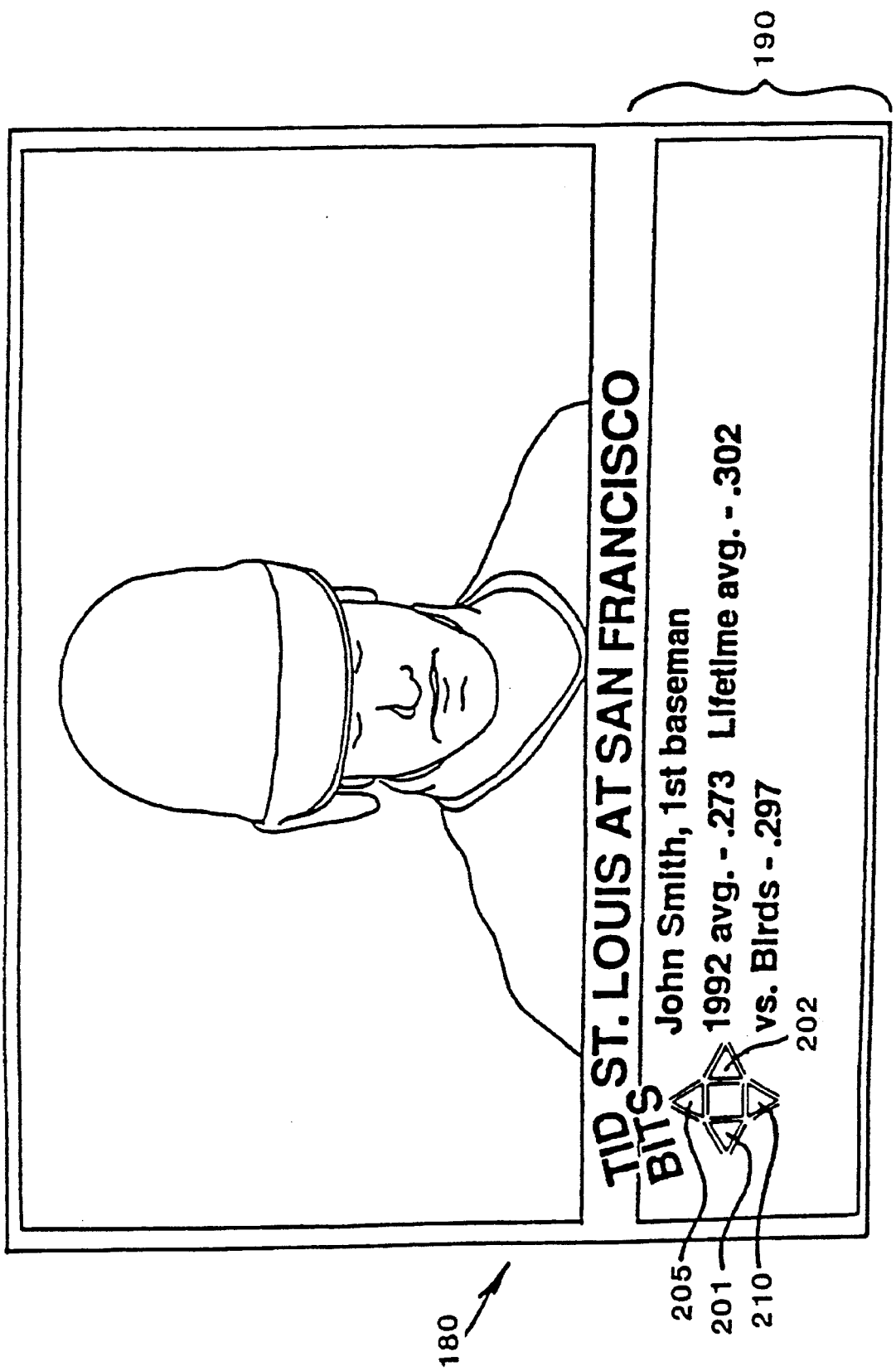
FIG. 10 illustrates the present invention's use of the info function providing the user with additional tracks of information (such as the "Tid Bits" information track), by using the down arrow button of the remote control device.

Referring now to FIG. 10, there is shown a currently viewed baseball game entitled "Saint Louis at San Francisco" displayed on the screen 180. Assume now the user also depresses the info button 136 on the remote control device 60. As previously described, information relating to the currently viewed program is displayed within the graphic overlay panel 190. (n the present example, information relating to the baseball player, "John Smith", is provided within the overlay 190. In the event the down arrow 210 is highlighted, an additional information track is available to the user. This additional information track may be displayed through the use of down arrow button 146 on the remote control device 60, and is referred to here as "Tid Bits". As shown in FIG. 10, the "Tid Bits" information track gives additional information relating to the particular subject currently being displayed on the screen 180. In the example of FIG. 10, the first baseman John Smith is currently being viewed on the screen 180, and information relating to John Smith is provided in the graphic overlay panel 190. It will also be noted that in FIG. 10, the down arrow 210 is highlighted, indicating that yet another information track is available.

Figure 11:
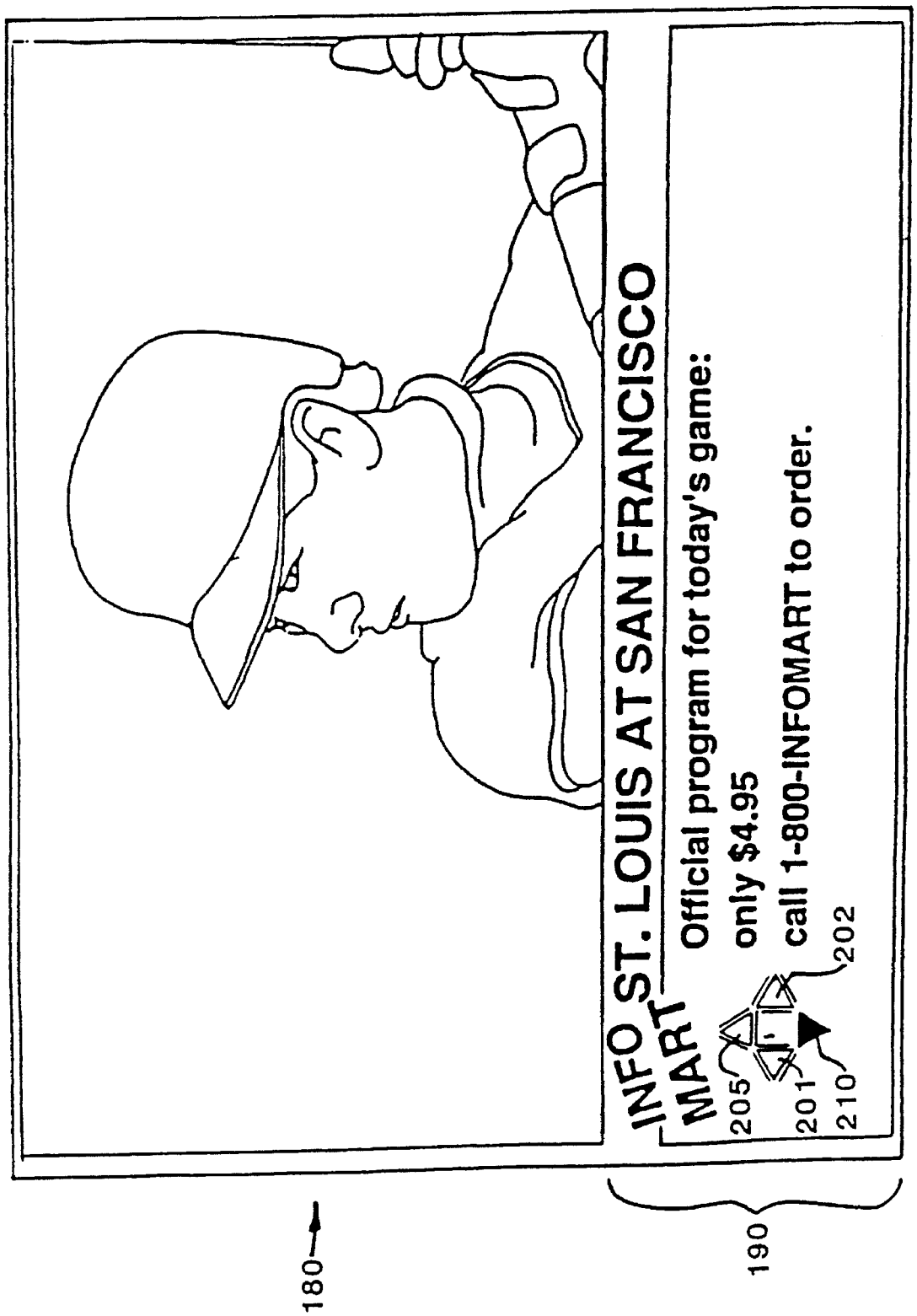
FIG. 11 is a further illustration of additional information tracks ("info-tracks"), such as this "Info Mart", accessible to the user of the present invention using the down arrow button of the remote control device.

Still referring to FIG. 10, it will be noted that a down arrow 210 is shown. By depressing the down arrow button 146 on the remote control device 60 once again, an Info Mart track information track as shown in FIG. 11 is displayed by CPU 63 in the graphic overlay panel 190. As illustrated, the Info Mart information track provides the viewer with the opportunity to purchase products, services, programs and the like related to the program which is currently being viewed (in the present example, the baseball game "Saint Louis at San Francisco"). The information track disappears when the info button 136 is pressed again.

While the information has been described with the left and arrow arrow buttons 148 and 150 causing different pages of an information track to be displayed, and the up and down arrow buttons 145 and 146 causing different information tracks to be displayed, it is contemplated that the information displayed may be related to each other in other application dependent manners. It is further contemplated that tiffs information function can also be used with audio-visual programs or services other than TV shows, in particular when the menu button 172 is used to display the output of the VCR 56, the CD 70, a hard disk, a telephone or another other A/V device 57 connected to the transceiver 54.

The data comprising the information of the various information tracks shown in FIGS. 7–11 are downloaded using the method illustrated in FIG. 3b, i.e. the interleaved data stream transmitted from the service provider 50, to the transceiver 54. The data are stored in the system memory 65 and updated as new data are received over the digital program listing channel 100. Alternatively, data displayed in the information tracks such as the exemplary Tid Bits or Info-Mart information tracks may be transmitted by the service provider 50 to the transceiver 54 using the vertical blanking intervals, which are inherently part of the analog TV channel 103 used to display the currently viewed program on the TV 58. In another embodiment, data comprising the information tracks may be transmitted and downloaded through the use of separate info-track channels comprising additional channels in the electronic spectrum illustrated in FIG. 3a.

List Function

Figure 12:
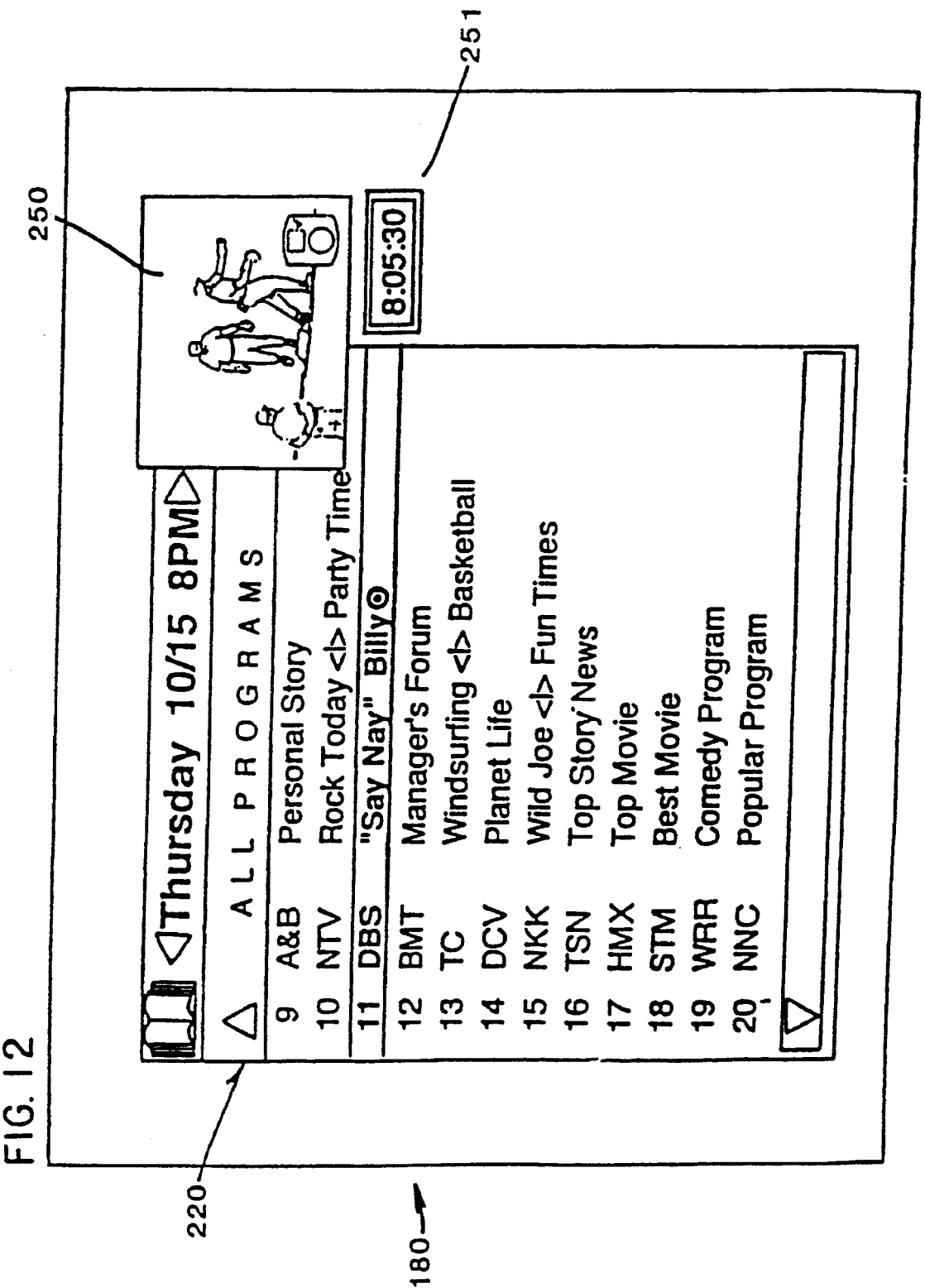
FIG. 12 illustrates the present invention's use of the list function to display current program/service listings and to highlight a particular program. Viewers may scroll up or down that list by using the up or down arrow buttons on the remote control device.

Referring now to FIG. 12, the list function of the present invention will be described. While viewing a television program displayed on the TV 58, the user may depress the list button 138 on the remote control device 60 to obtain a program/service listing for the current date and time during which the user is watching television. As shown in FIG. 12, upon depressing the list button 138, a program/service listing 220 is displayed for the current date and time at which the viewer has depressed the list button 138. As illustrated, programs/services currently available for viewing and interaction are identified by their channel numbers, channel name identifiers (for example, Channel 10, NTV), and by titles of the programs/services. In the event that the program/service listing includes two programs for a given time interval, then the names of both programs are displayed. For example, in FIG. 12, Channel 10 is NTV which beginning at 8:00 p.m. is showing a program entitled "Rock Today", and beginning at 8:10 p.m. is showing a program called "Party Time". In addition, as shown in FIG. 12, a picture-in-picture window 250 continues to display the currently viewed program which the user was last viewing. Accordingly, the user may continue to view the currently selected program, and the current program/service listing simultaneously. By pressing the select button 155 in the current time slot, the user can view the currently highlighted program in full screen, as long as that program is playing live at the current time. For example, in the case of FIG. 13, the pressing of the select button 155 would display NTV's "Rock Today" program in full screen. It will be noted that although the current implementation of the list function displays a list of programs/services on single lines for one hour time slots, the invention's user interface also supports other styles of display, for example, a grid showing programs on two lines, each line representing a two hour time slot.

Figure 13:
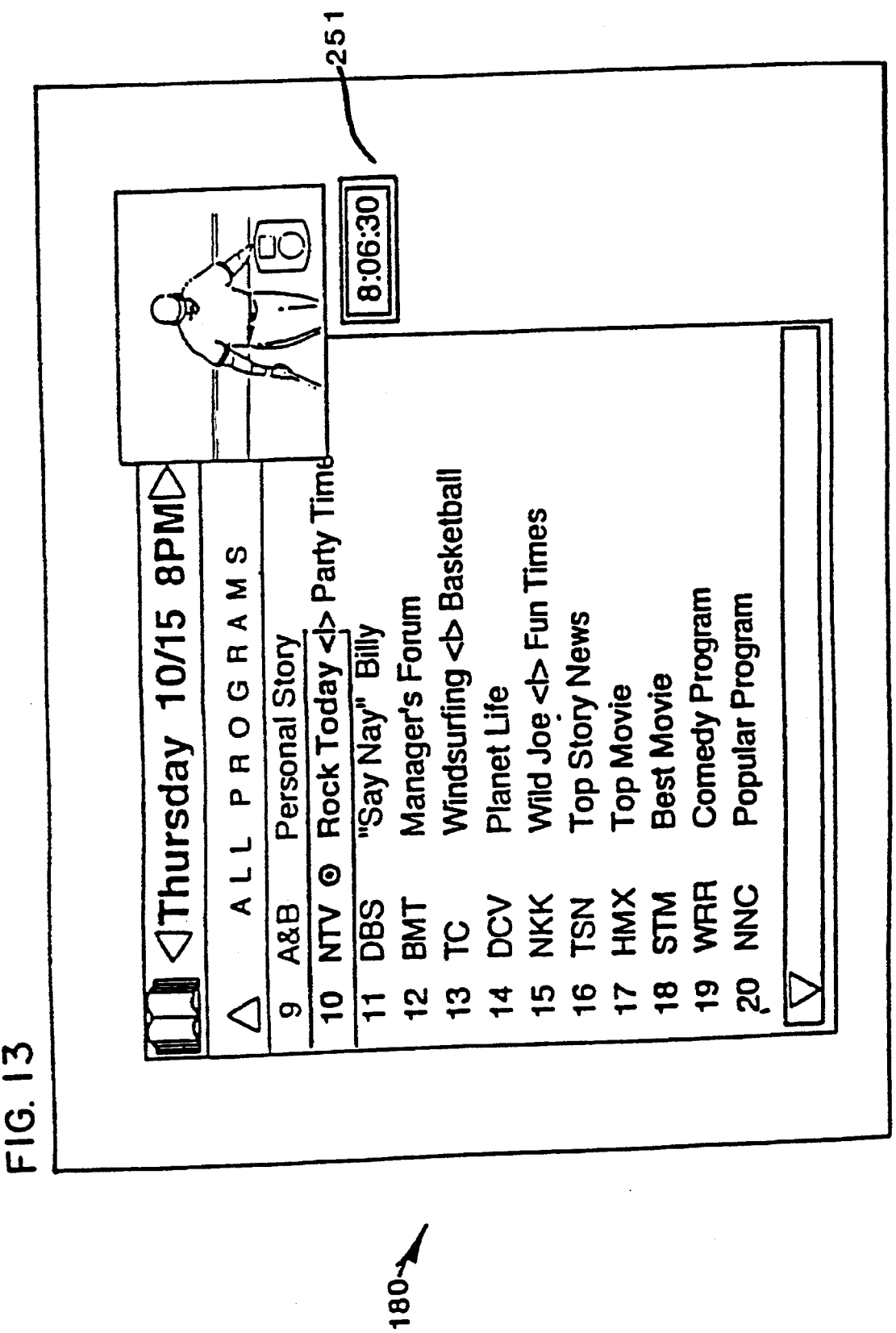
FIG. 13 illustrates the list function of the present invention in which the NTV programming during the hour of 8:00 to 9:00 p.m. includes two programs, one starting at 8:00 p.m., the other starting after the previous program has ended.
Figure 14:
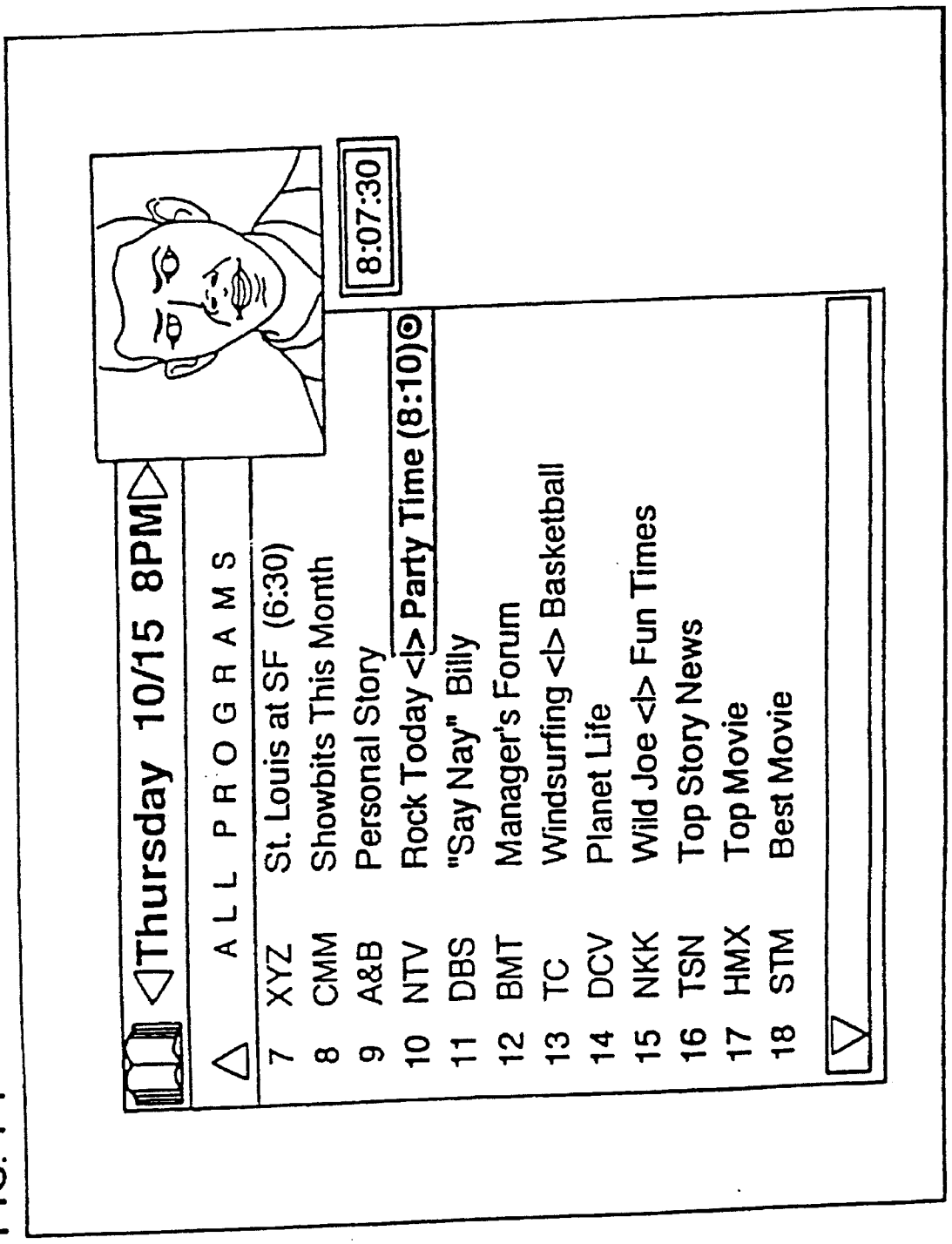
FIG. 14 illustrates the list function of the present invention which allows the user to highlight the second program, which starts at 8:10 p.m., using the right arrow button of the remote control device.

It will also be noted that the currently selected program being displayed in the picture-in-picture window 250 is initially highlighted in the program/service listing to assist the user. In the example of FIG. 12, Channel 11, PBS, a show entitled "Say Nay Billy" is highlighted. Moreover, channels may be selected by pressing the up arrow button 145 or the down arrow button 146 on the remote control device 60 to move the highlighting over to alternate program/service offerings. For example, if the user presses the down arrow button 146, as shown in FIG. 13, the NTV listing is then highlighted. Similarly, as shown in FIG. 14, by continuing to depress the down arrow button 146, the highlighting continues to move upward towards the lower channel numbers and once the highlighting reaches Channel 9, the entire program/service listing scrolls to display consecutively lower channel numbers previously not displayed. At the same time, the higher channel numbers previously displayed at the bottom part of the screen 180 will consecutively disappear. As illustrated in FIG. 14, Channels 7 and 8 are now displayed, and Channels 19 and 20 are no longer displayed to the user. If the up arrow button 145 is now pressed instead, the highlighting will move down towards the higher channel numbers as illustrated in FIG. 14. Notably, movement of the program/service listing and the highlighting in the present invention are specifically calculated to conform with an average person's expectations in using a television remote control. While the list function has been described with the down arrow button 146 causing highlighting to move towards the lower channel numbers, and the up arrow button 145 causing highlighting to move towards the higher channel numbers, it will be appreciated that the correspondence between the arrow buttons 145 and 146 and the highlighting movement may be implemented in other ways as best suits the anticipated user of the interface system.

Figure 16:
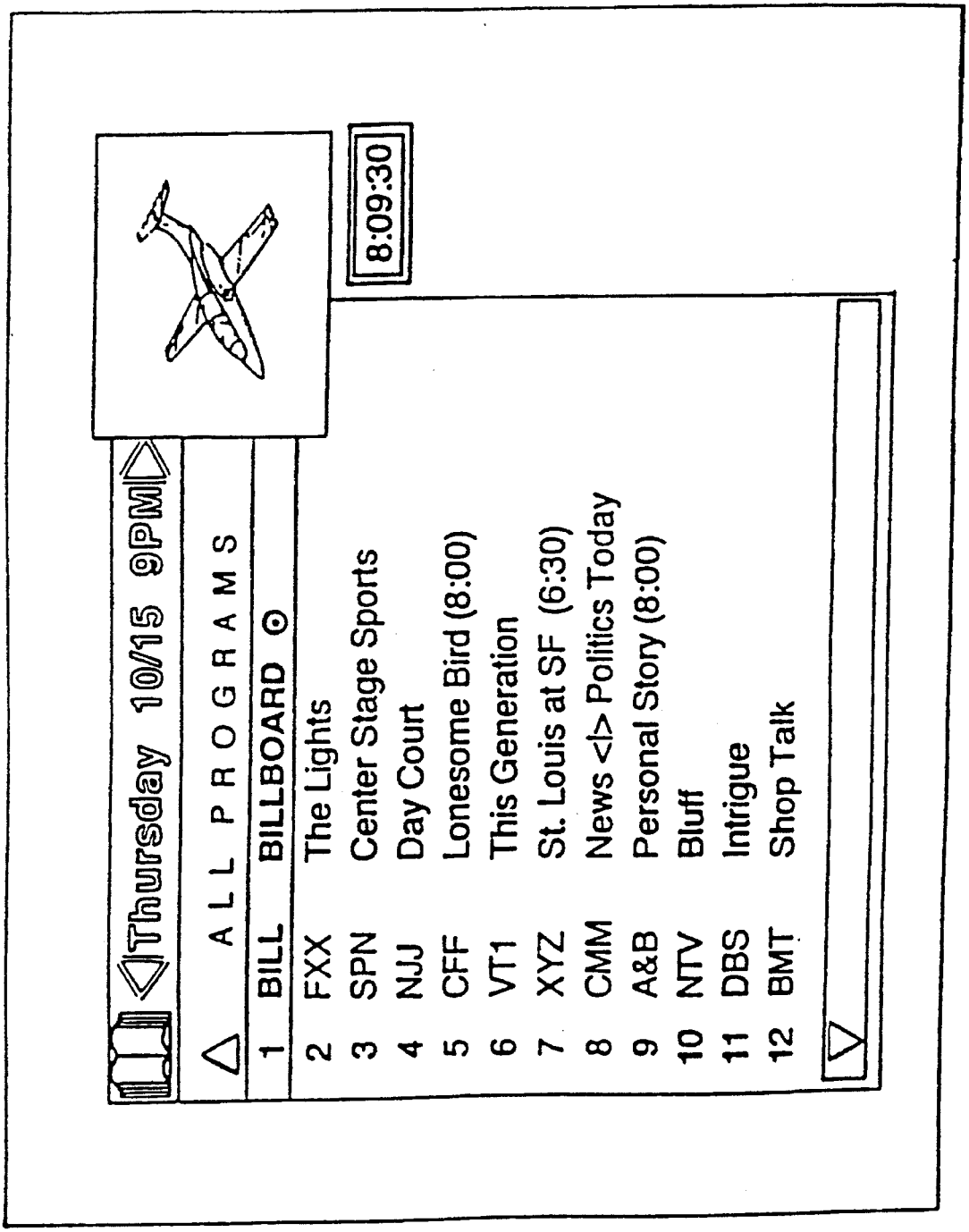
FIG. 16 illustrates the selection of an alternate hourly time slot beginning at 9 p.m. using the right arrow button of the remote control device.
Figure 17:
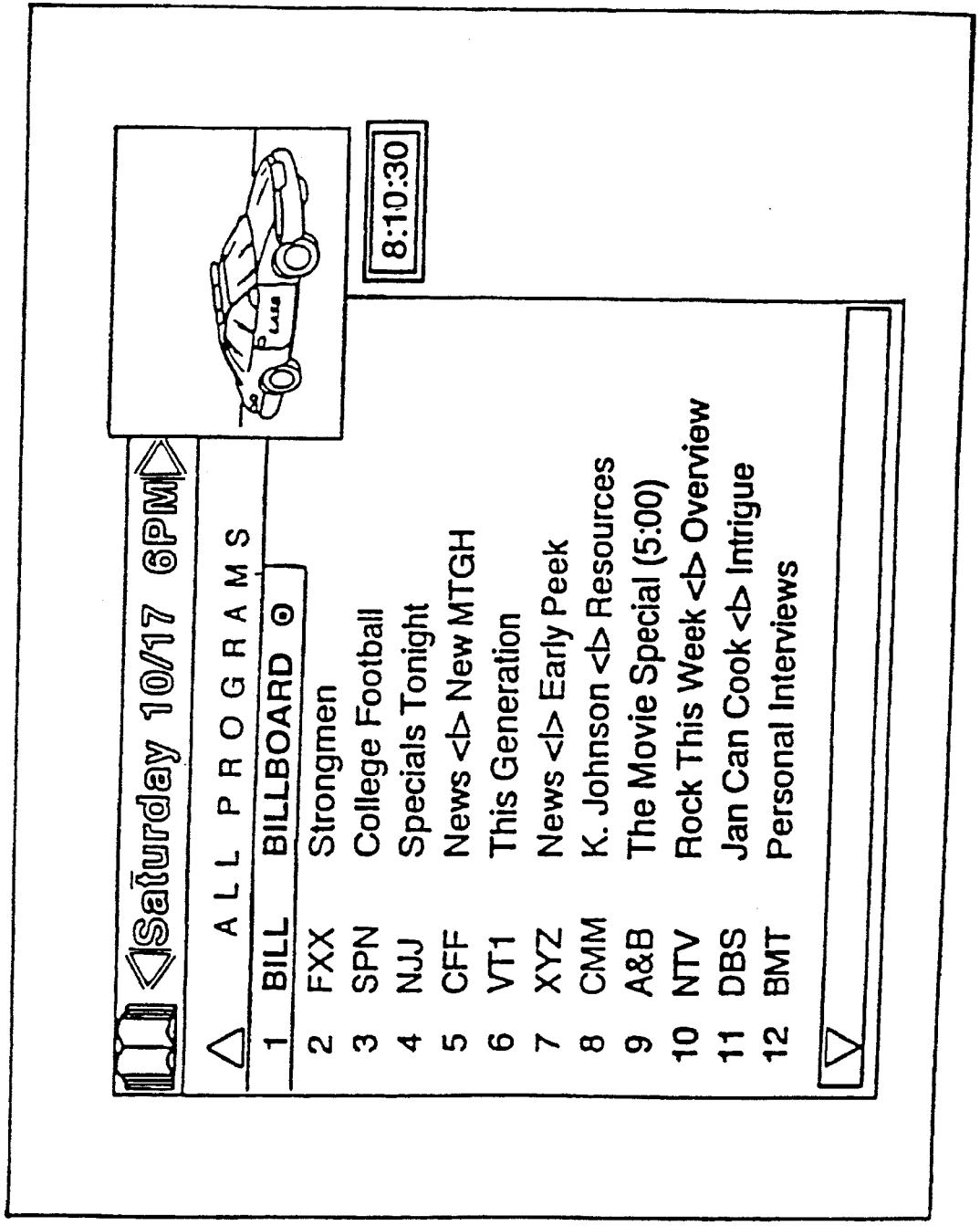
FIG. 17 illustrates the selection of an alternate day for the program/service listing by depressing the right arrow button of the remote control device.

Skipping now to FIG. 16, a further feature of the list function of the present invention is illustrated. In the event the user depresses the right arrow button 150, the CPU 63 displays the next hourly time slot listing on the screen 180. In the example of FIG. 16, the time slot for 9:00–10:00 p.m. is illustrated. It will be appreciated that, had the user depressed the left arrow button 148 three times, then the program/service listing for 6:00–7:00 p.m. would have been displayed. Additionally, as illustrated in FIG. 17, the continued depression of the right arrow button 150 for a predetermined amount of time (in the present embodiment for more than 2 seconds) results in the display of program/service listings for subsequent days. In this case, the continued depression of the right arrow button 150 has resulted in a scanning of the program/service listings through to Saturday, October 17. It will be noted that in the currently preferred embodiment, a scanning of subsequent days results in the display of the program/service listing from the beginning of prime time, namely, 6:00 p.m. (or 7:00 p.m., at the service provider's option). It will also be noted that the info function can be used in conjunction with the list function to display program/service information about the currently highlighted program/service. It will further be noted that the listing display will disappear if the user depresses the list button 138 once again. It is also contemplated that this list function can be used with audio-visual programs or services other than TV programs, in particular when the menu button 172 is used to display the output of other A/V devices 57. For example, if the VCR 56 is displayed on the TV 58, pressing the list button 138 on the remote control device 60 would display a listing of all programs recorded by the user on the VCR 56, highlighting the program now displayed from the VCR 56. Similarly, the list function would display CD ROM or telephone listings when these A/V devices are selected through the menu function.

Record Function

Figure 18:
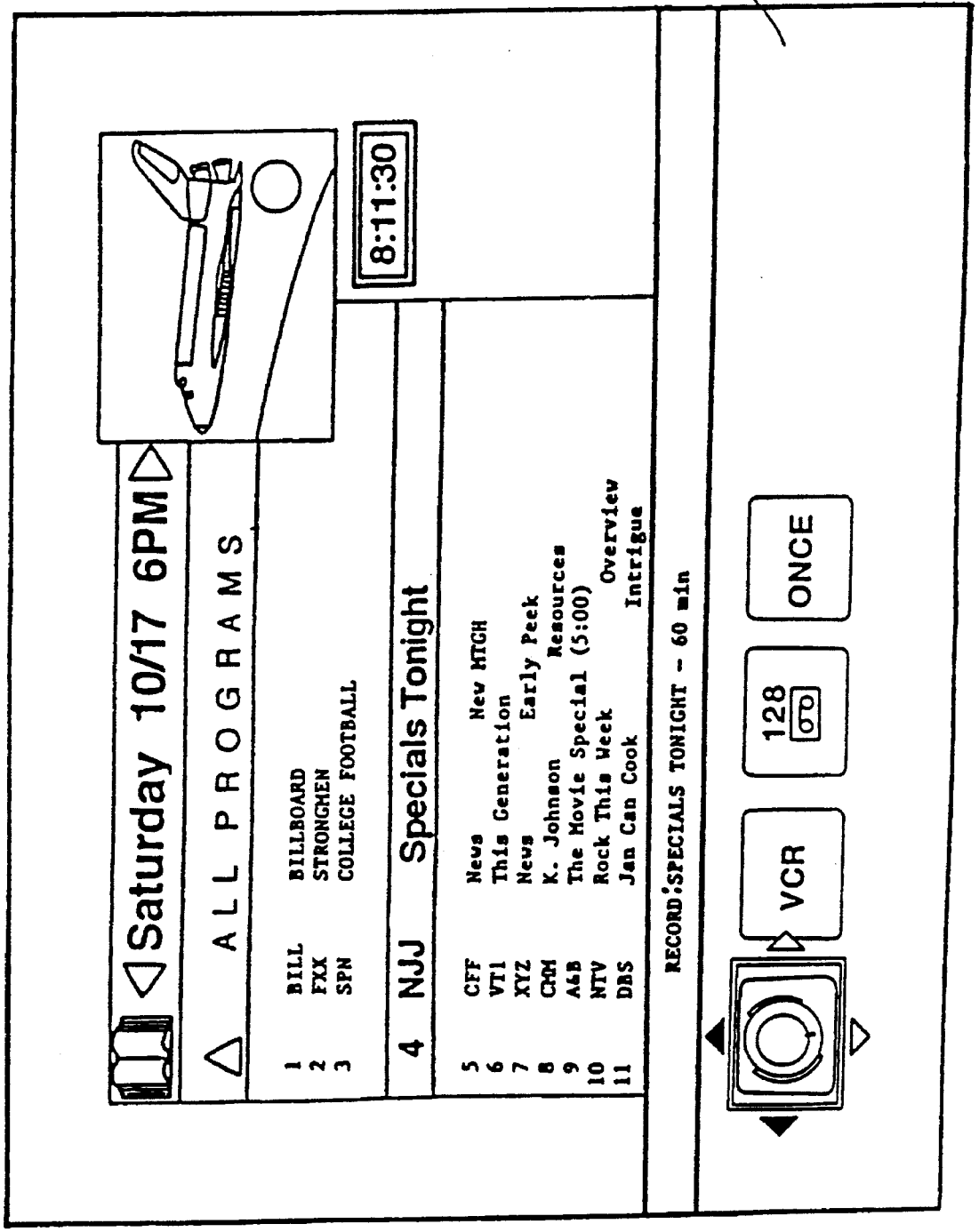
FIG. 18 illustrates displaying of a record panel confirming the title and length of the program to be recorded, along with a confirmation of which VCR and tape to record on, by depressing a select button in the remote control device.
Figure 19:
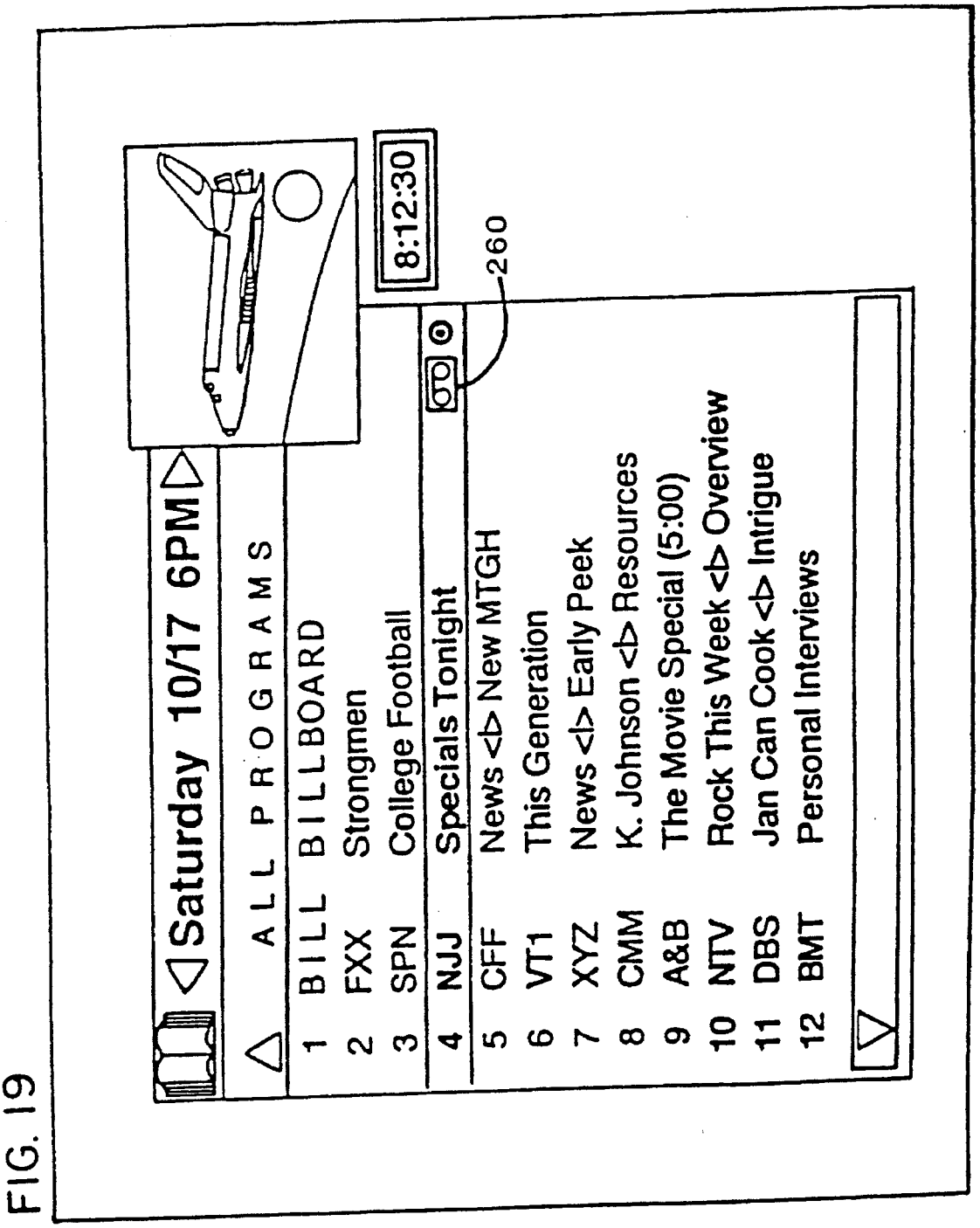
FIG. 19 illustrates the present invention's use of the select button on the remote control device while the program/service listing is displayed to instruct the selected VCR or A/V recording device to make a copy of the highlighted program.

Referring now to FIG. 18, which illustrates a program/service listing displayed in response to the user having continuously depressed the right arrow button 150 on the remote control device 60. The exemplary program/service listing displayed is for Saturday, October 17 beginning at prime time (6:00 p.m.). The up and down arrow buttons 145 and 146 on the remote control 60 are then used to highlight the program "Specials Tonight". Assume now the user desires to record the exemplary program "Specials Tonight". By pressing the record button 162 on the remote control device 60, a record panel 259 is displayed by the CPU 63 on the screen 180, confirming the title and length of the program to be recorded, along with a highlighted select ("bull's eye") icon as shown in FIG. 18. It is contemplated that other functions can be included in the record panel 259, such as a function for selecting different VCRs or other A/V recording devices, a function for selecting different tapes or reading media, and/or a function for selecting how often the recording is to take place (once, weekly, daily). Once the select button 155 is pressed, the program listing is redisplayed without the record panel 259. A record icon 260 is displayed on the screen 180, as shown in FIG. 19. The "Specials Tonight" program which will begin on Saturday, October 17, will then be recorded automatically. In the event the viewer changes his mind and does not desire to record the program "Specials Tonight", by pressing the record button 162 again and then pressing the select button 155 once more, the program listing will be redisplayed without the record icon 260 and no recording will take place.

Mark and Jump Functions

Figure 15:
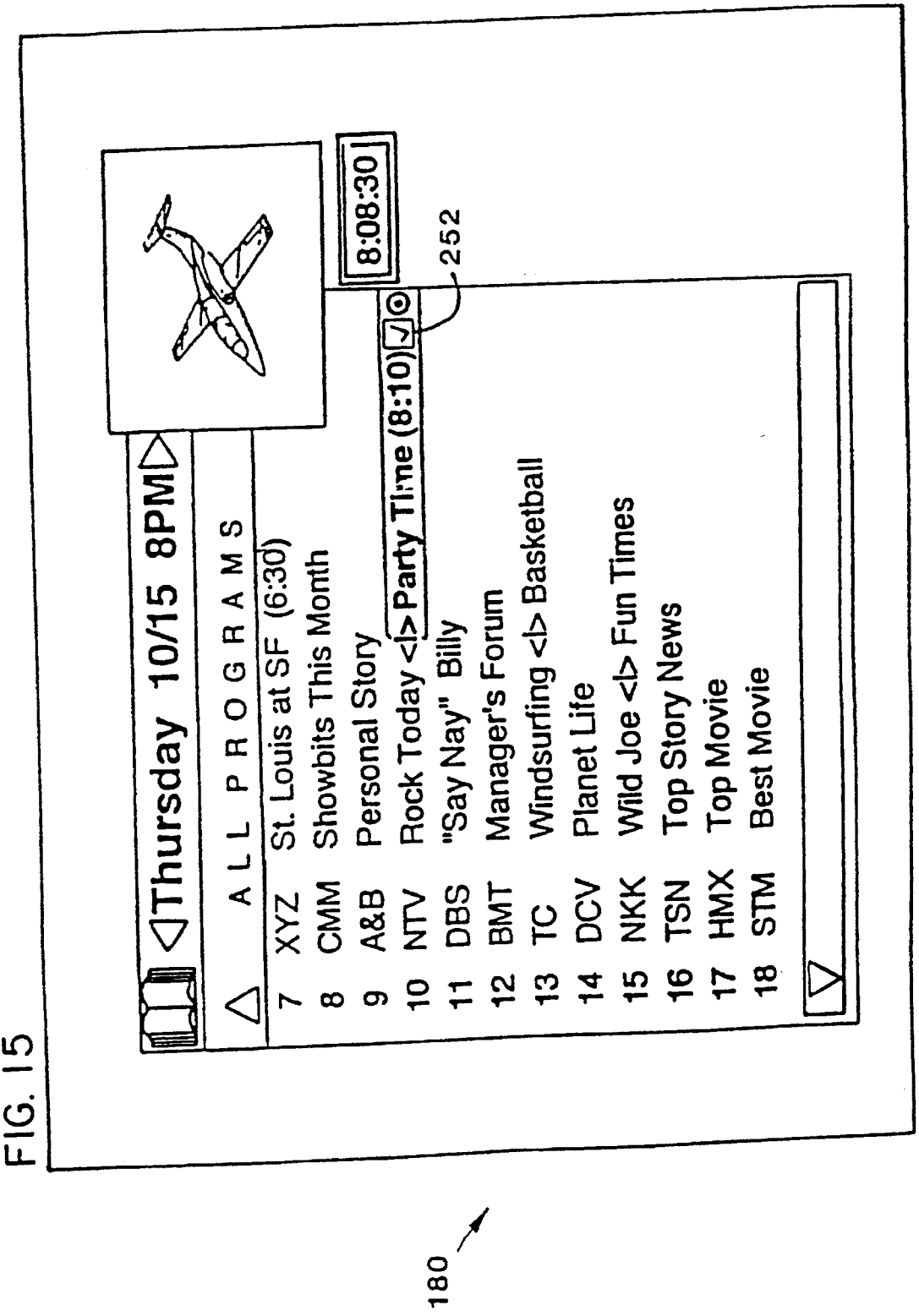
FIG. 15 is an additional feature of the list function of the present invention where the user marks the highlighted program with the mark button of the remote control device.

Skipping now to FIG. 15, the mark function of the present invention and its operation will be described. Shown in FIG. 15 is a program listing reflecting Channel 10 (NTV) having been selected using the up and down arrow buttons 145 and 146 on the remote control device 60. Assume now the current time is 8:08:30 p.m. In accordance with the teachings of the present invention as described earlier, the program "Rock Today" would be highlighted on the screen 180. The program "Party Time" may be highlighted by the viewer by pressing the right arrow button 150. The mark function may then be initiated by pressing the mark button 142 on the remote control device 160. As illustrated in FIG. 15, a mark identifier 252 is displayed adjacent to the selected program (in the present example, "Party Time"). Skipping again to FIG. 20, a reminder box 254 is displayed on the screen 180 at the time the program "Party Time" begins (in the present example, 8:10 p.m.), regardless of what channel is currently being viewed then by the user on TV 58. It should also be noted that programs playing live in a current time slot can be marked while displayed in full screen by depressing the mark button 142. This causes a mark identifier 189 to be displayed in the graphic overlay panel 185, as shown in FIGS. 6 and 21.

Figure 20:
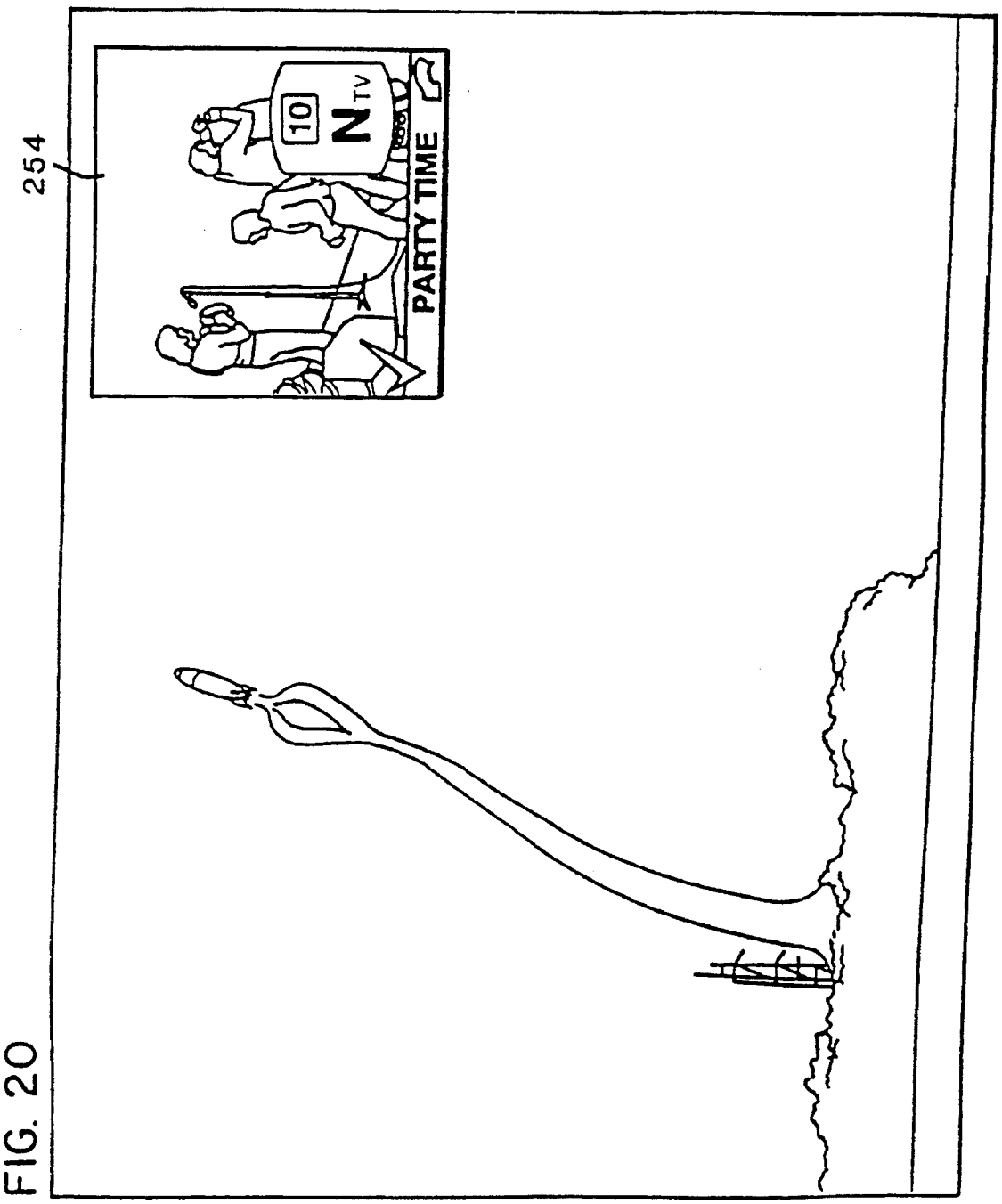
FIG. 20 illustrates the present invention's "reminder" feature, which automatically displays a live picture-in-picture (PIP) window of a previously marked program when the program is received by the A/V transceiver.
Figure 21:
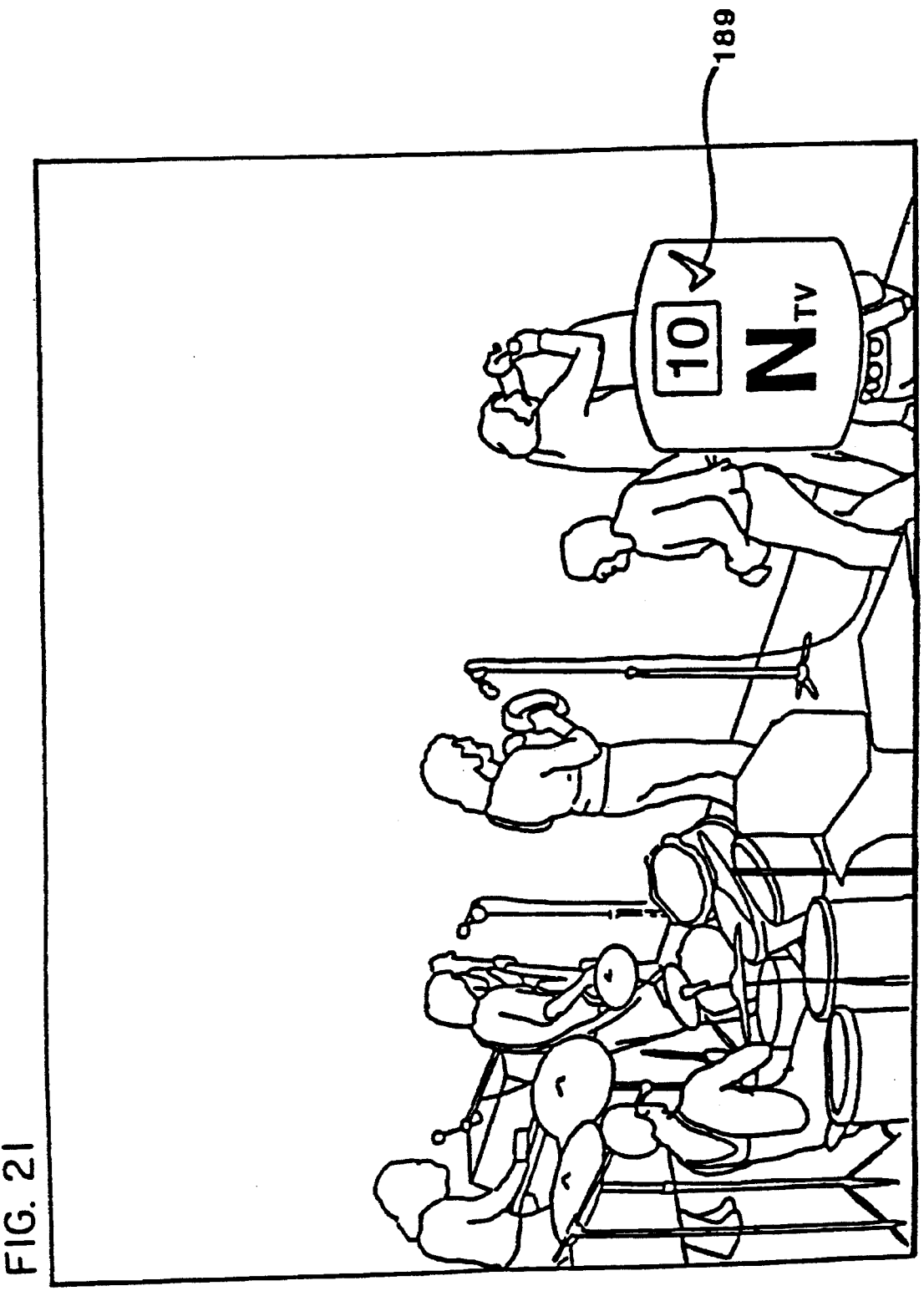
FIG. 21 illustrates the present invention's jump function, wherein pressing a jump button one the remote control device permits a user to jump directly to a full screen view of a previously marked program, and wherein pressing the jump button again results in the display of another marked program.

Referring now to FIGS. 20 and 21, depressing the jump button 132 while the reminder PIP window 254 is displayed switches the program displayed in the main viewing area of the screen 180 to the program which the user has previously marked (see FIG. 21). If more than one program has been marked, by repetitively depressing the jump button 132, users can jump to the other previously marked programs displaying them in full screen in the main display area of the screen 180 one at a time. It will be appreciated that in an alternate embodiment, the picture-in-picture window 254 illustrated in FIG. 20 may be preceded by a reminder icon displayed automatically in the PIP window 254 a few minutes prior to the actual start of the program. It will also be noted that the mark and jump functions may be used with audio-visual programs other than TV shows, allowing a user to mark and subsequently jump between, for example, a VCR program, a CD ROM program, an on-line service or an answering machine message, in addition to the TV programs previously marked while viewing television channels.

Categories Function

Figure 22:
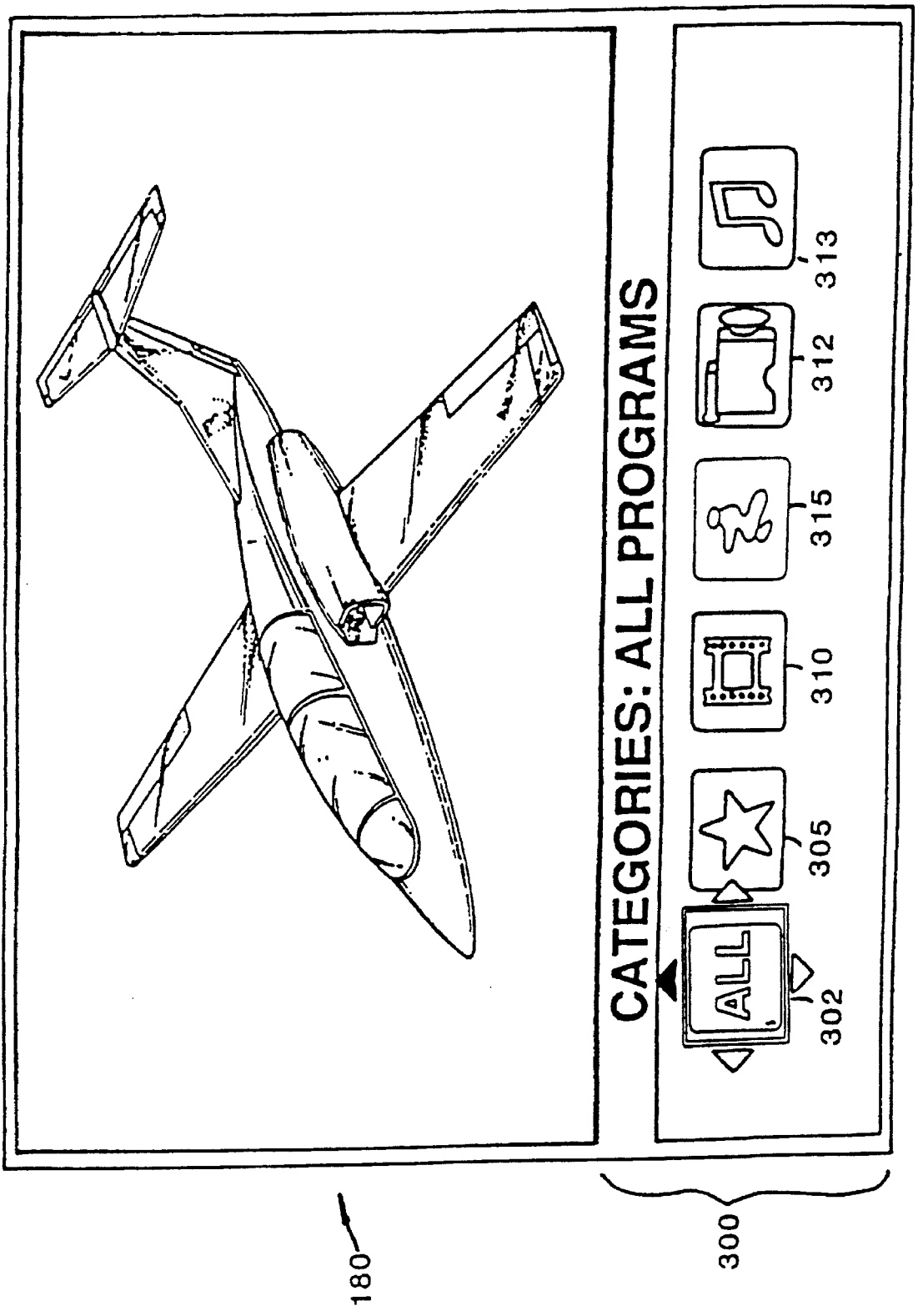
FIG. 22 illustrates the categories function of the present invention which is displayed by pressing the categories button on the remote control device.
Figure 23:
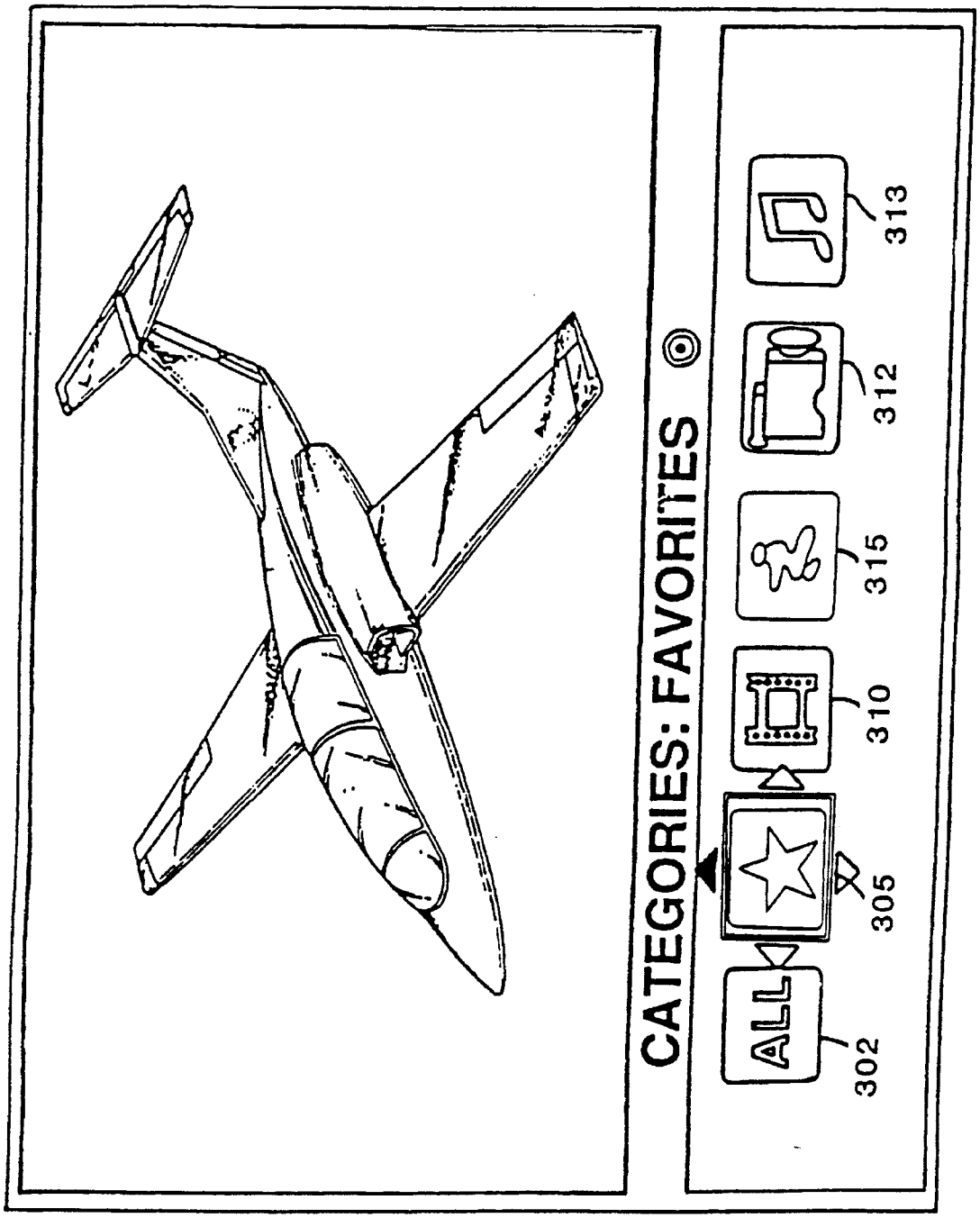
FIG. 23 further illustrates the categories function wherein the "favorites" category is highlighted by pressing the right arrow button on the remote control device.

Referring now to FIGS. 22–32, the categories function of the present invention will be described. To initiate the categories function of the present invention, the categories button 140 is depressed on the remote control device 60. As illustrated in FIG. 22, the CPU 63 displays a categories graphic overlay panel 300 which is superimposed over the currently viewed program on screen 180. A plurality of categories are identified by representative icons. The first category which is selected by default is the "all" category 302, and is highlighted around the border. The "all" category 302 refers to all currently available programs/services being transmitted by the service provider 50. By depressing the right arrow button 150 or left arrow button 148 on the remote control device 60, other categories may be highlighted. For example, by depressing the right arrow button 150, the next category "favorites", as indicated by a star icon 305, is highlighted (See FIG. 23). Similarly, by depressing the right arrow button 150 again, a movies icon 310 is highlighted. By depressing the right arrow button 150 another time, a sports icon 315 is highlighted (see FIG. 24), and so on. Additional categories may include a news icon 312 and a music video icon 313. However, it will be appreciated that many other categories can be displayed. By repeatedly pressing the right arrow button 150, the user can make category icons appear, scrolling from right to left against the category overlay panel 300.

Figure 24:
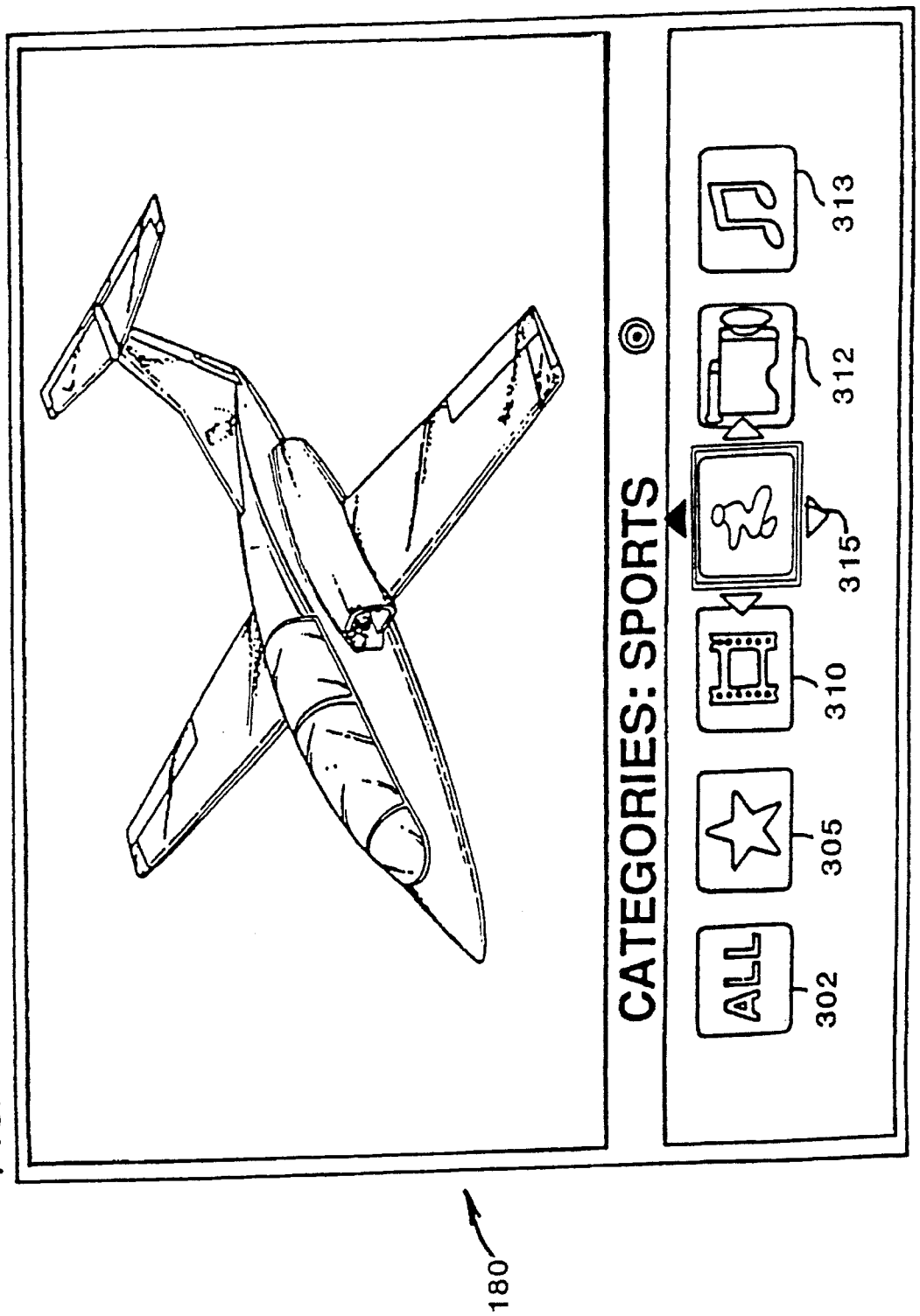
FIG. 24 further illustrates the categories function wherein the "sports" category is highlighted by depressing the right arrow button on the remote control device.
Figure 25:
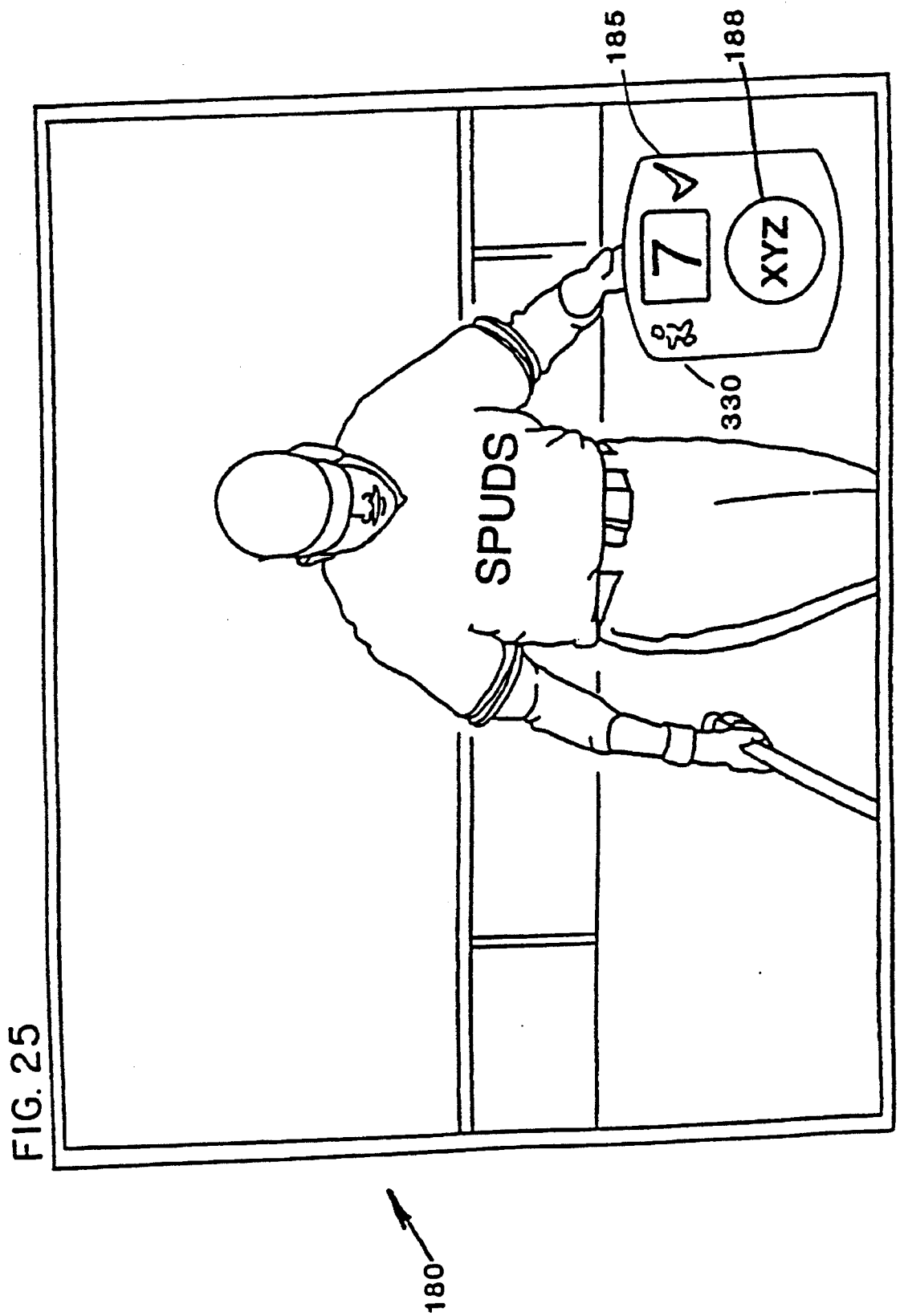
FIG. 25 illustrates a representative television image in the case where the "sports" category has been selected by depressing the select button on the remote control device.

In FIG. 24, the sports category has been highlighted by the user as indicated by the highlighted sports icon 315. To select a category that is currently highlighted, the user can press the select button 155 and the category overlay panel 300 disappears while the currently viewed program displayed on the screen 180 is replaced by the nearest available program in the category just selected. The selection of the sports category results in the display of only sports related programs on the TV 58. FIG. 25 illustrates an exemplary baseball game which is displayed after the user presses the select button 155. As illustrated, the sports icon 330 is also displayed in the graphic overlay panel 185 along with the channel identifier 188.

Figure 26:
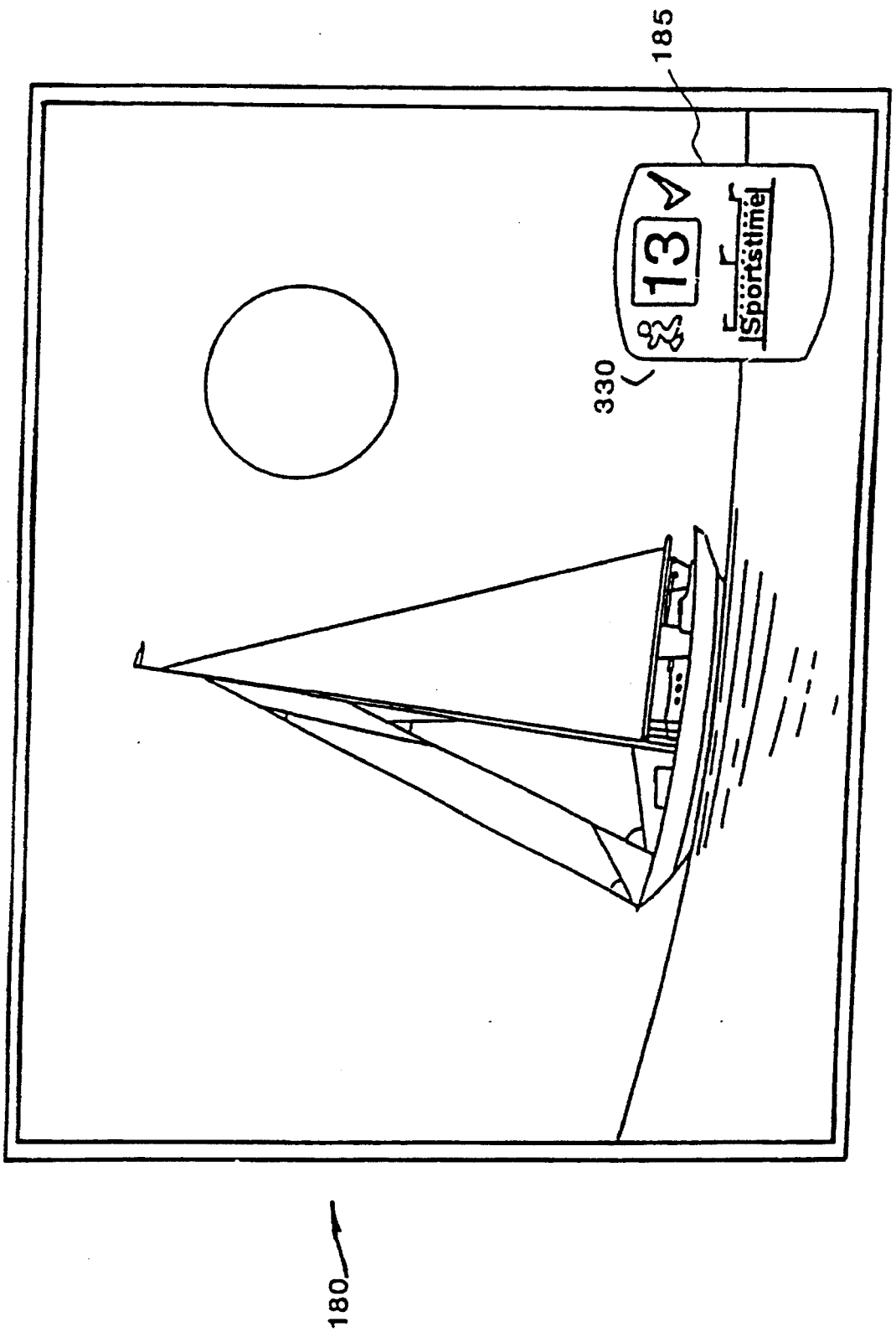
FIG. 26 is a further illustration of a representative television image in which the "sports" category has been selected, and an alternate sports channel has been further selected by a user through the use of the up arrow button on the remote control device.

Assume now after the nearest sports program has been displayed on the screen 180, the user desires to view additional sports category programs on the TV 58. By depressing the up channel button 130 or the up arrow button 145 on the remote control device 60, the transceiver 54 displays the next higher number channel which is currently showing a sports program. In the example of FIG. 26, the sports program relates to a windsurfing event. As shown, the sports icon 330 continues to be displayed along with the numerical channel indicator and the channel identifier 188 (in the example of FIG. 26 "Sportstime") in the graphic overlay panel 185.

Figure 27:
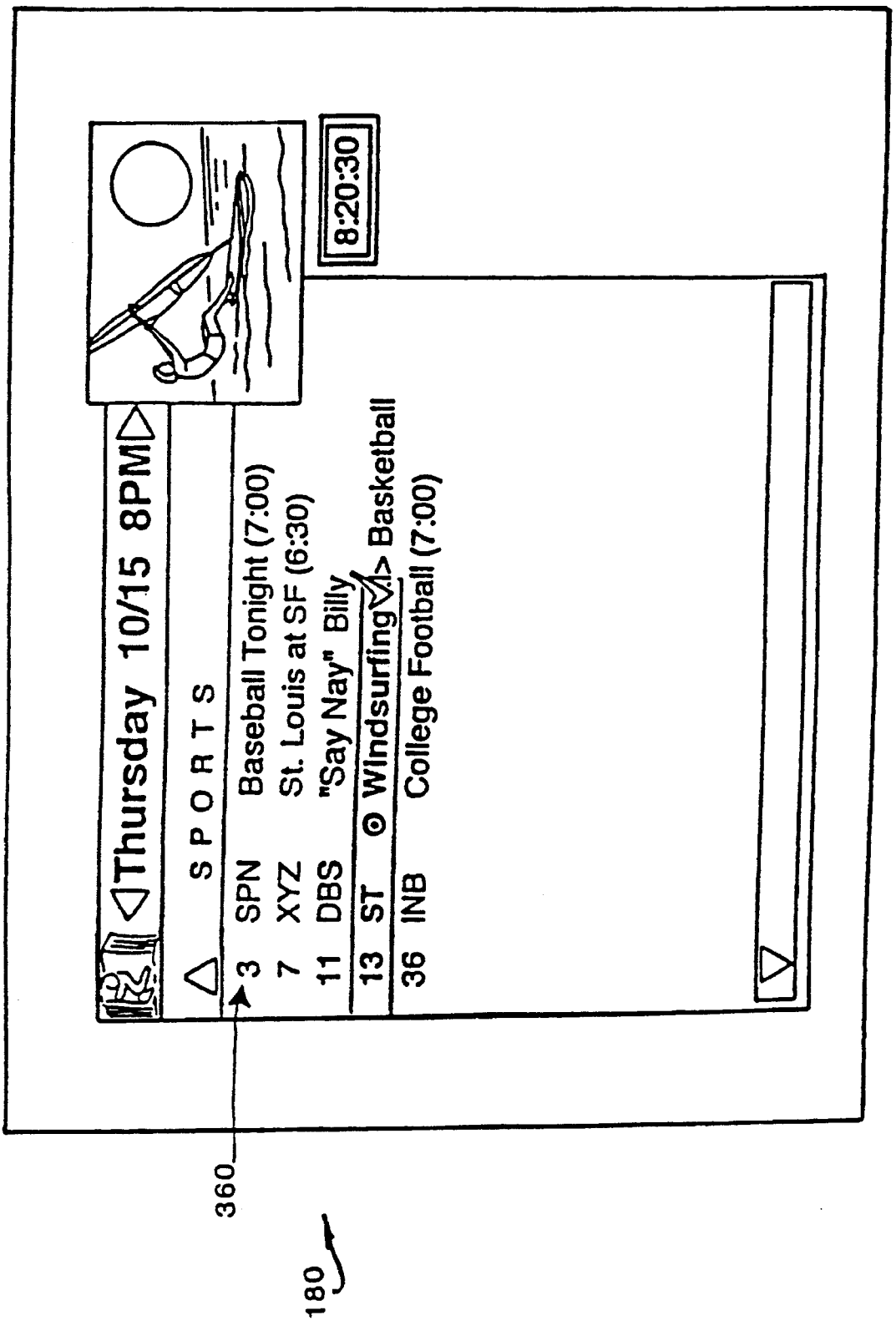
FIG. 27 illustrates a sports program listing in which the list button has been depressed after the "sports" category has been selected.

Referring now to FIG. 27, if the user has selected the category of sports (icon 315), and depresses the list button 138, a program/service listing 360 of currently available sports programs is displayed on screen 180. It will also be noted that the currently viewed sports program will continue to be displayed in a picture-in-picture window 365. As previously discussed, with respect to the list function, programs which are shown during half hour intervals (See FIG. 27 "Windsurfing" and "Basketball") are identified and may be individually selected using the remote control device 60.

Figure 28:
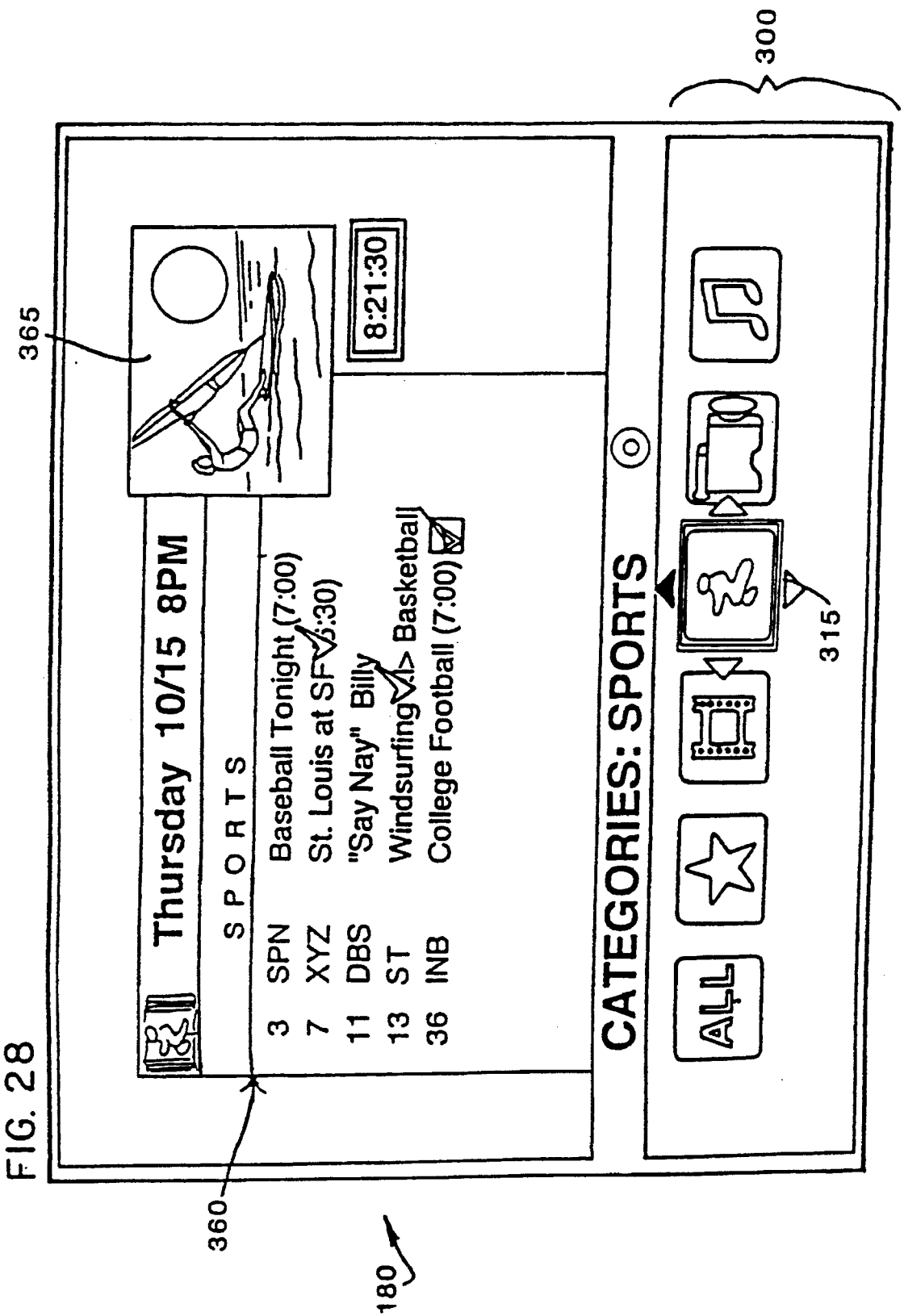
FIG. 28 illustrates the categories function in conjunction with the list function.
Figure 29:
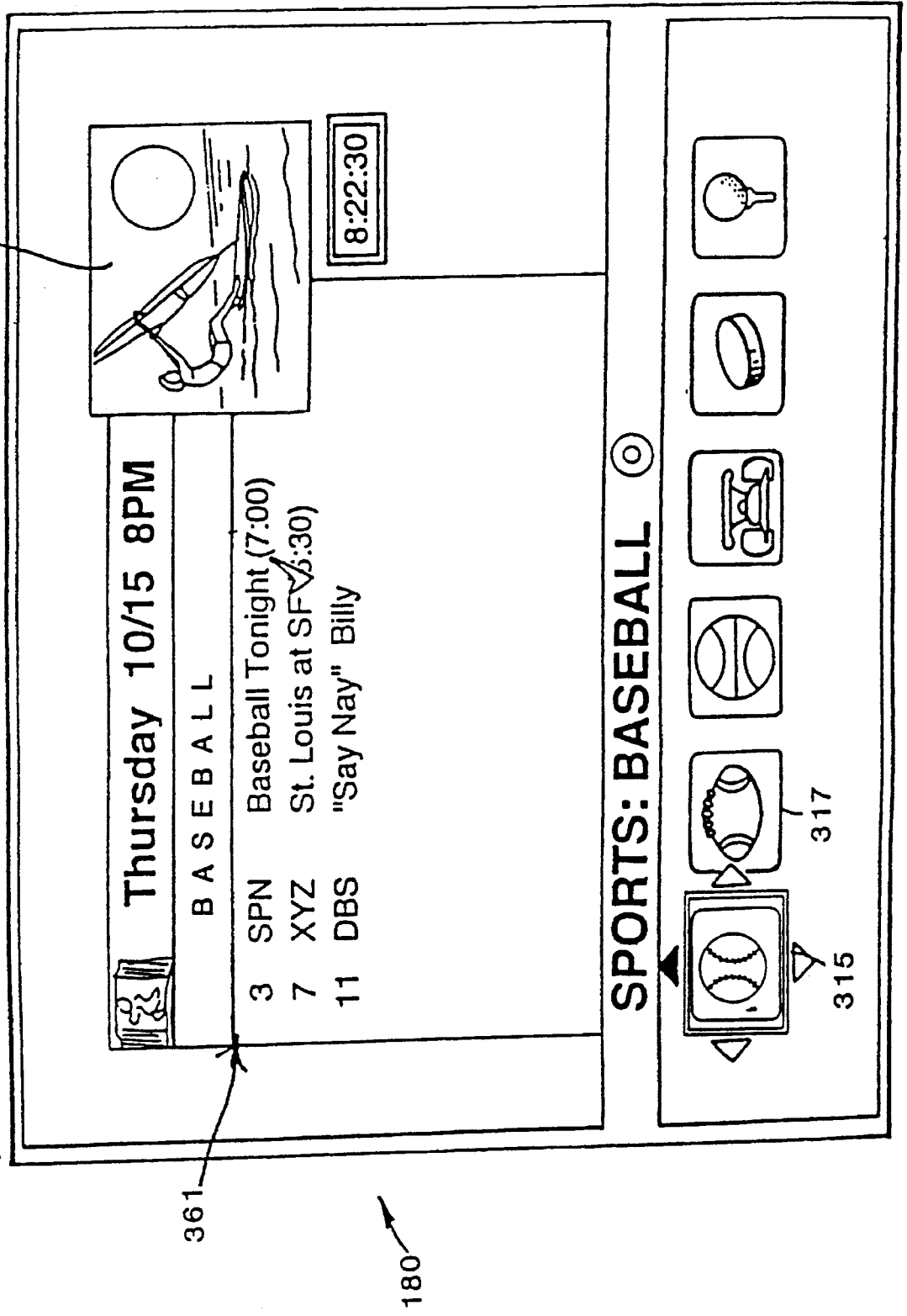
FIG. 29 further illustrates the categories and list functions when the down arrow button is depressed on the remote control device, breaking down the "sports" category into sub-categories such as baseball or football.

Referring now to FIG. 28, which illustrates a program listing with the sports icon 330 in the category overlay panel highlighted, displayed in response to the user having pressed the list button 138, and then presses the categories button 140. Assume now the user desires to break down the main sports category into finer sub-categories such as baseball, football, basketball, hockey, etc. By depressing the down arrow button 146 on the remote control device 60, the user causes the CPU 63 to select a default sport sub-category (baseball in this example) and display a plurality of sports sub-category icons against the categories overlay panel 300 as illustrated in FIG. 29. The default sports sub-category icon 315 is also highlighted, and the program listing 361 comprises only programs of that sports sub-category, i.e. baseball in this example. By pressing the right arrow button 150 on the remote control device 60, the user can highlight the football sub-category icon 317, then press the select button 155 to cause only football programs to be listed. Alternatively, the user can press the up arrow button 145 to display the main categories again, with the sports icon 315 highlighted as illustrated in FIG. 28. The user can also press the categories button 140 once more to make the categories overlay panel 300 disappear.

Figure 30:
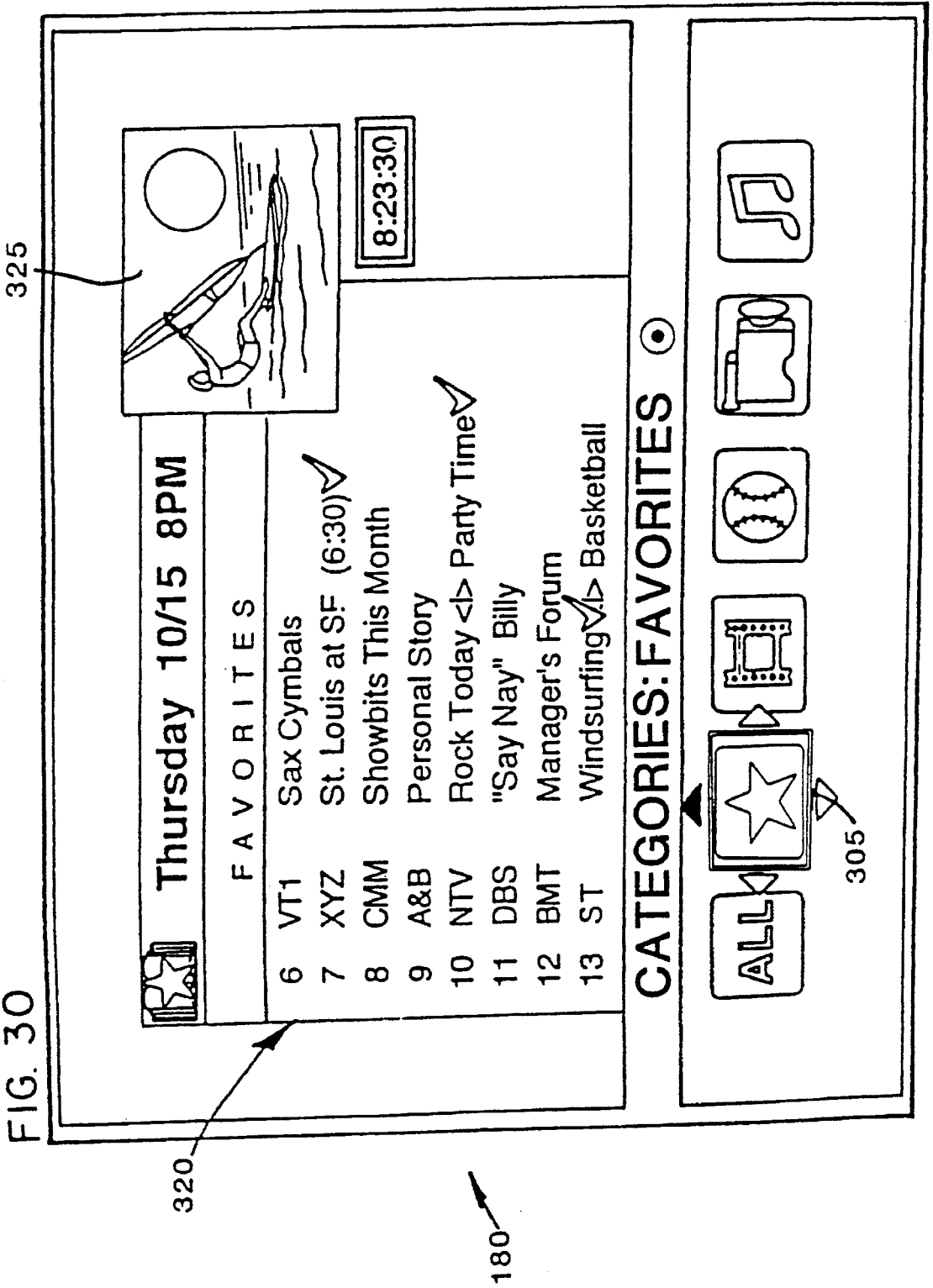
FIG. 30 is a further illustration of the categories and list functions in which the category "favorites" is highlighted and can now be selected by depressing the select button or broken down into sub-categories by depressing the down arrow button on the remote control device.
Figure 31:
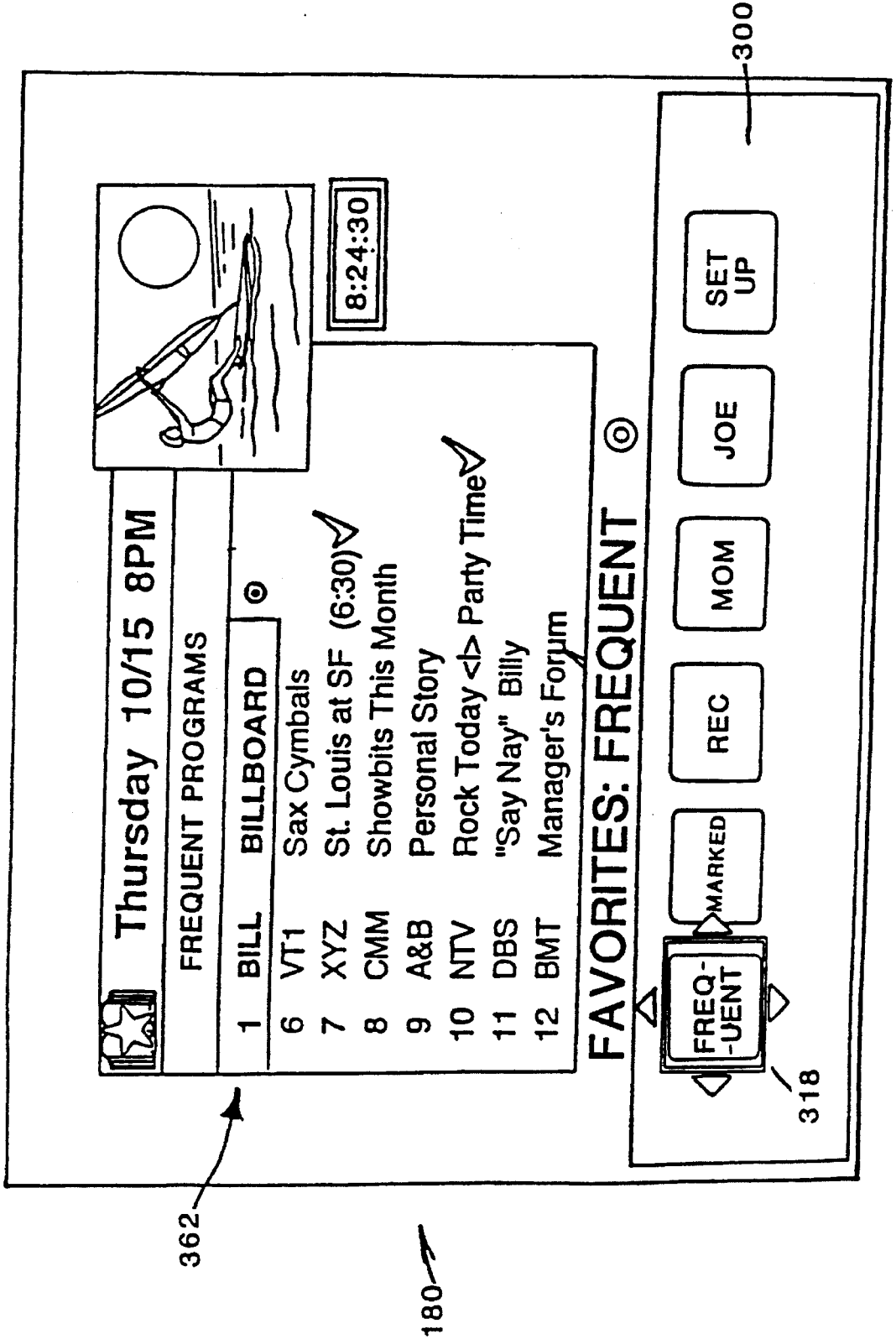
FIG. 31 further illustrates the categories and list functions, where the "favorites" category has been broken down into a sub-category of "frequent" programs which are currently listed.

Referring now to FIG. 30, which illustrates a program listing 320 with the favorite icon 305 in the category overlay panel highlighted, displayed in response to the use having selected the "favorites" category using the left arrow button 148 on the remote control device 60. The program listing 320 comprises favorite programs for the current time slot including frequently viewed programs, marked programs, and programs to be recorded, as well as programs that match specified user preferences. Assume now that the user desires to resolve the "favorites" category into finer sub-categories. By pressing the down arrow button 146 on the remote control device 60, the user causes the CPU 63 to display a plurality of favorites sub-category icons against the categories overlay panel 300, as illustrated in FIG. 31. The CPU 63 highlights the "frequent" programs sub-category icon 318 and displays a program listing 362 of programs most frequently watched by the user as determined by the CPU 63 from previous monitoring of the user's viewing habits. In the normal course of operation, the CPU 63 monitors programs which are most frequently viewed and compiles a prioritized list of those frequent programs for each time slot, which list is stored in the rewritable non-volatile part of the system random access memory (such as SRAM) 65.

In the presently preferred embodiment, if a viewer views a television program for more than 10 minutes, the current program and channel identifiers are compared to frequent programs already stored in system memory 65 for that particular time slot, and an updated list of frequent programs is created by CPU 63 and stored in the system memory 65. In the event there are no frequent programs stored in the system memory 65 for any particular time slot, then a general list of most frequently watched programs is retrieved from the system memory 65. It is anticipated that the majority of frequent programs will be stored in time slots corresponding to prime time, or during daytime television hours.

Figure 32:
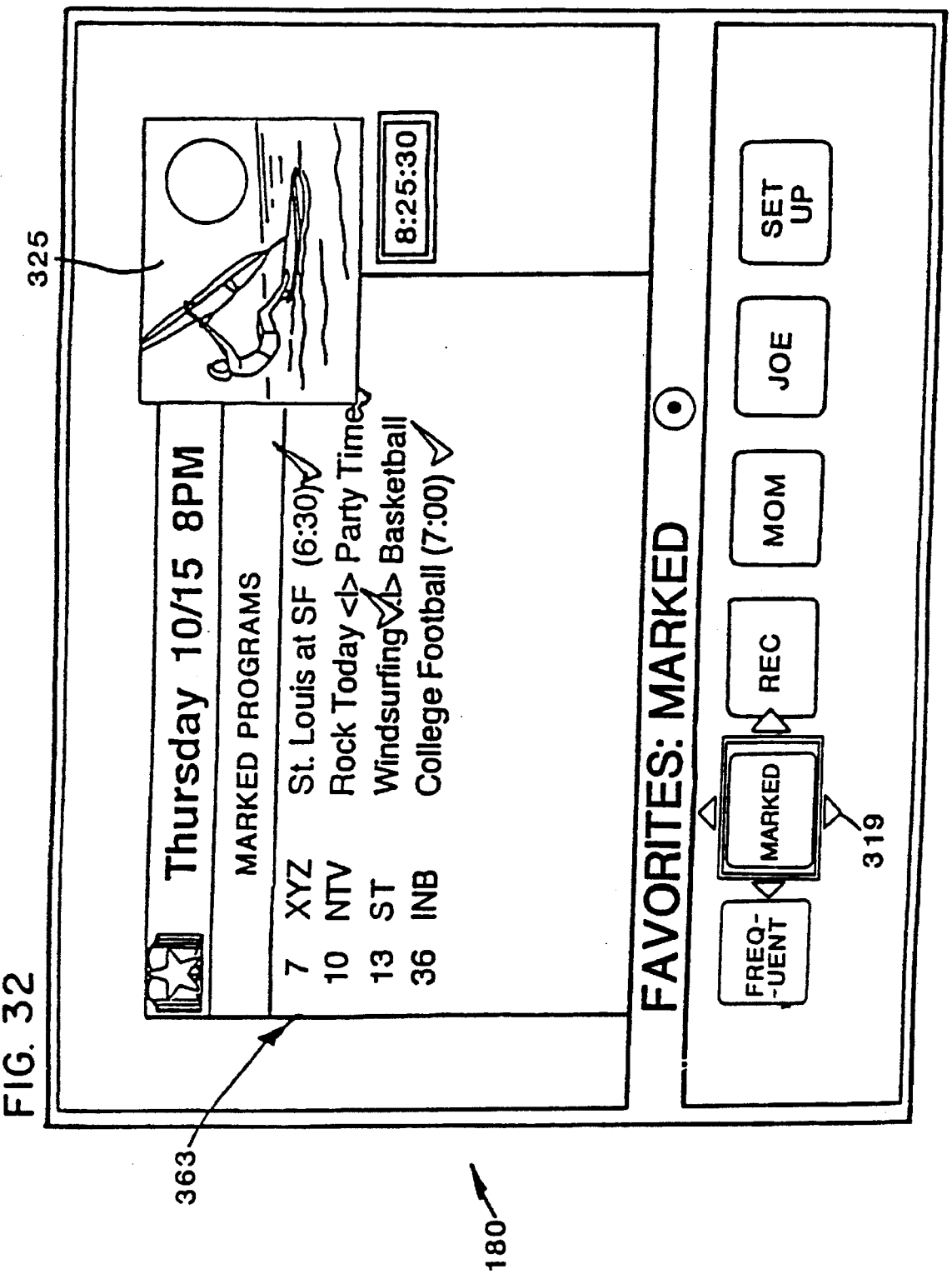
FIG. 32 is a further illustration of the categories and list functions, where another "favorites" sub-category, "marked programs", is highlighted displaying a list of previously marked programs.

By pressing the right arrow button 150, the user can move the highlighting from the "frequent" programs sub-category icon 318 to the "marked programs" sub-category icon 319, as shown on FIG. 32. Accordingly, the CPU 63 highlights the "marked programs" icon 319 and displays a program listing 363 of only programs that have been previously marked. Other favorite sub-categories include a record sub-category of all programs selected for recording, and personalized favorites sub-categories such as "Mom" 321 and "Joe" 322. It is contemplated that new preferences can be defined by individual users by selecting a special favorites sub-category, represented by a "set-up" icon 323, then marking preferred items from a list of programs and/or categories, as well as specifying an icon and/or a name for this new preference set. By first defining and subsequently selecting, for example, the "Mom" sub-category icon 321, a user can view only programs that match the interests defined earlier by the mother of the household.

It is also contemplated that this category function can be used in combination with A/V programs or services other than TV programs, in particular when the menu button 172 is used to select the VCR 56, or one of the other A/V devices 57. For example, pressing the categories button 140 while viewing a VCR listing (FIG. 36, below) would enable users to find all previously recorded comedy programs. Similarly, the categories function could enable users to find phone listings in the "gardening" category, according to telephone directory information accessed from the provider 50 via the T/T cable 52.

While the present invention has been described with the categories function having different effects on the displayed image when used during full screen display and when used in conjunction with list function, it will be appreciated that the present invention also may be practiced with the categories function having consistent effect on the displayed image in either situation, as desired.

Pix Function

Figure 33:
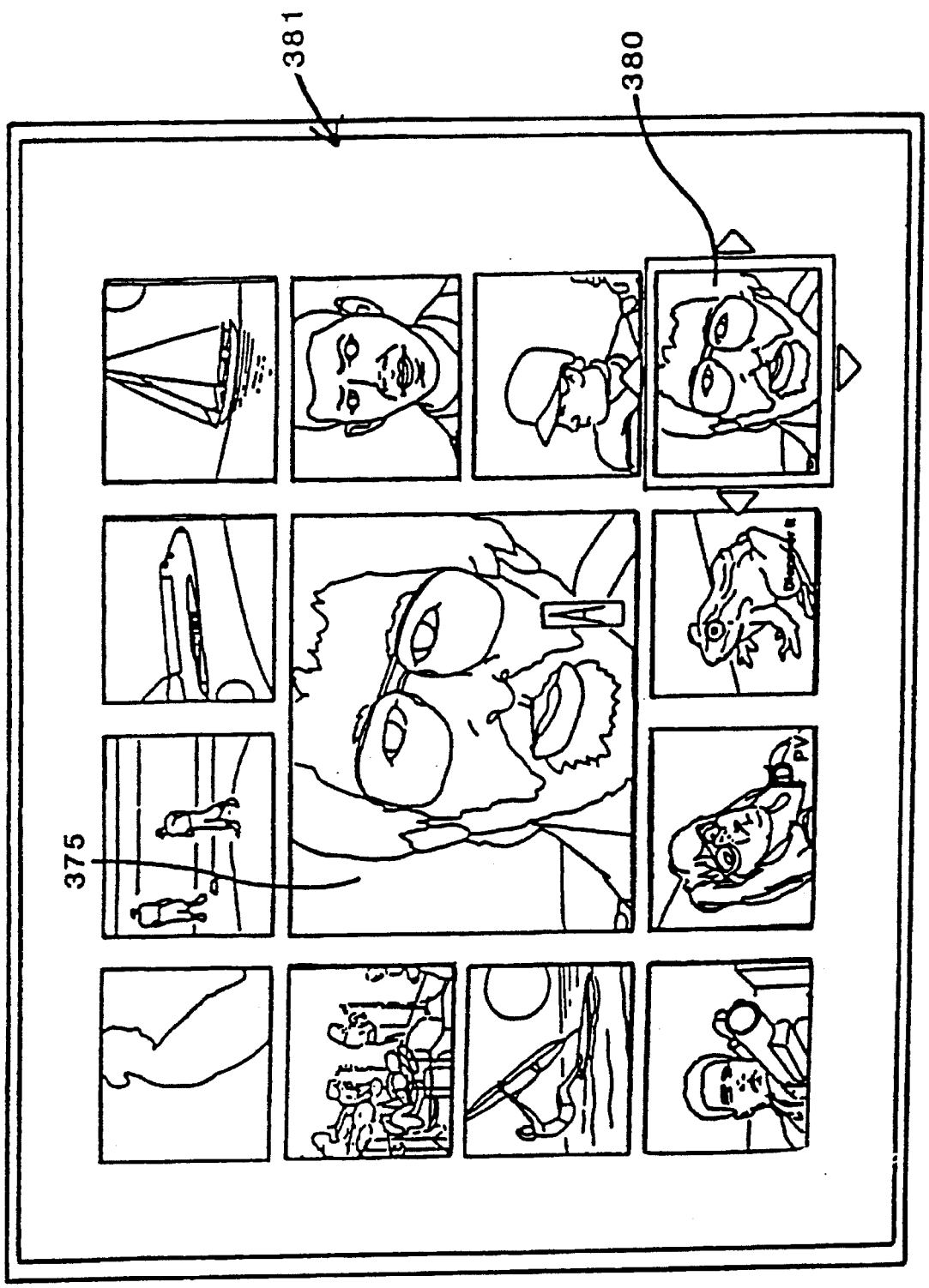
FIG. 33 conceptually illustrates the pix function of the present invention wherein multiple PIP windows are displayed by pressing the pix button on the remote control device.
Figure 34:
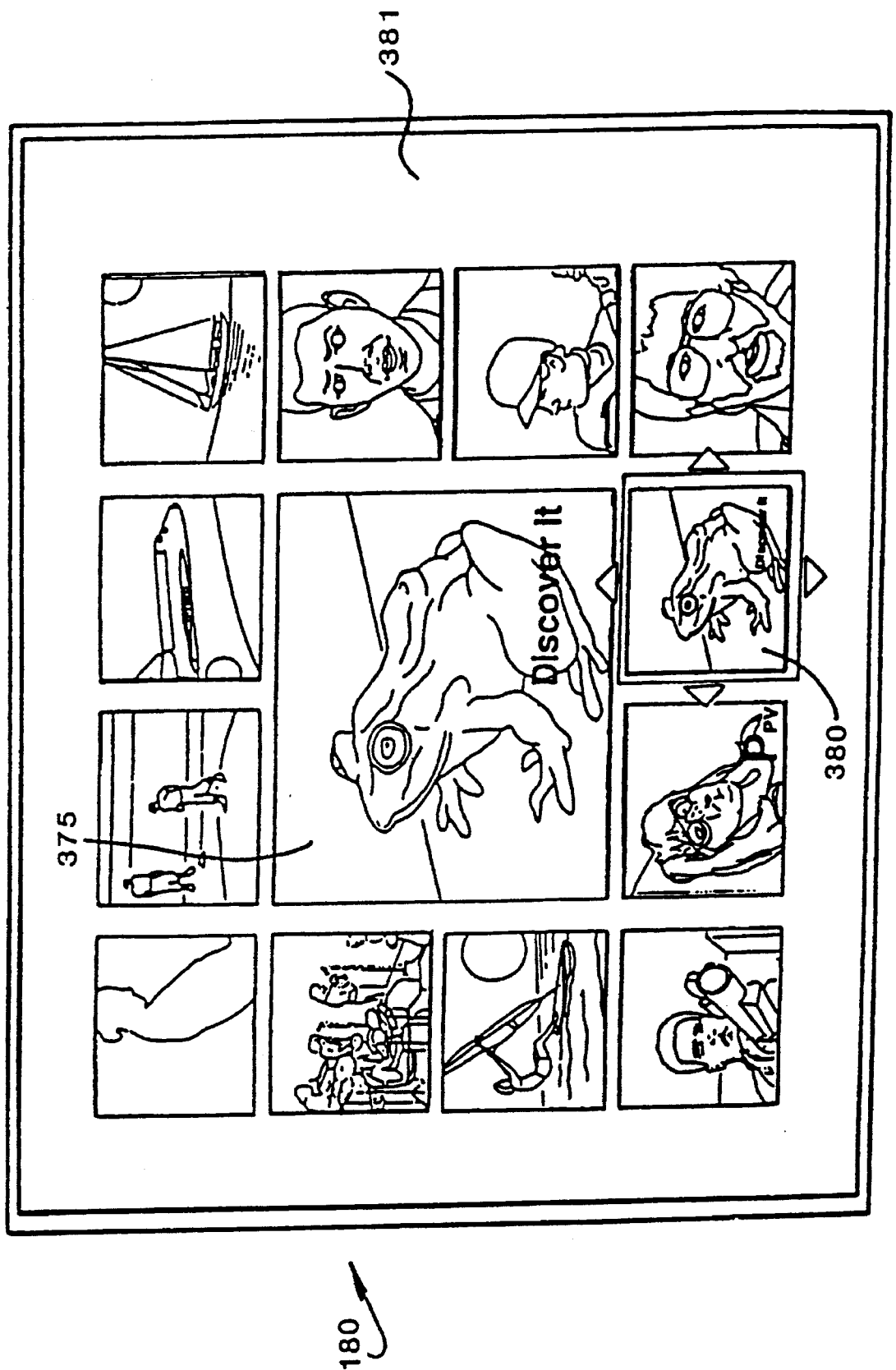
FIG. 34 illustrates the pix function of the present invention in which a new PIP window has been highlighted and is displayed in a larger format in the center of the display screen.

Referring now to FIGS. 33 and 34, the present invention's picture-in-picture (or pix function) will now be described. The depression of the pix button 144 on the remote control device 60 results in the display of a pix display 381 as illustrated in FIG. 33. As shown in the present embodiment, 12 picture-in-picture video windows are arranged within the screen 180, along the perimeter of the pix display 381, with a central picture-in-picture window 375 also displayed. Depressing the pix button 144 on the remote control device 60 results in the simultaneous display of multiple programs currently transmitted over the T/T cable 52, the VCR 56, the CD ROM 70 and/or the other A/V devices 57. Moreover, one of the picture-in-picture windows displaying the last program viewed in full screen, such as, for example, picture-in-picture window 380, is highlighted. As shown in FIG. 33, the highlighted smaller screen is also displayed in larger size in the central picture-in-picture window 375, with the audio track of the program also audible to the user. Accordingly, a user may watch a motion picture or television program, including the audio track, in window 375, while viewing multiple other programs simultaneously. In the presently preferred embodiment, the A/V connect module 66 samples (or "grabs") a video frame from each of the 12 programs every pre-determined (N) number of frames. Accordingly, a user viewing the pix display 381 perceives each of the 12 small picture-in-picture windows as sequential representative images of every N frames per window. However, the picture-in-picture window 375 represents a full motion display of the currently selected program, provided that a second TV tuner 67 is included within the A/V connect module 66.

Additionally, in the preferred embodiment of the present invention, it is contemplated that the user is able to view the pix display 381 by category by pressing the categories button 140 and selecting a particular category, such as favorites or movies. For example, the pix display 381 illustrated in FIG. 33 is comprised of only favorite programs, as the user had previously selected the favorites category. Had the user selected the "marked" subcategory, only marked programs would be displayed on the pix display 381, allowing users to easily add or delete programs in the pix display 381 by using the mark button 142. If no categories have been selected (which is equivalent to selecting the "all programs" category), then the pix display 381 displays the 12 programs nearest to the last selected program. Similarly, pressing the info button 136 would display the graphic overlay panel 190 shown in FIG. 7 for program information.

Referring now to FIG. 34, which illustrates the selection of a different pix program to be viewed in the central picture-in-picture window 375. By depressing the left arrow button 148 on the remote control device 60, the highlighting 380 is moved one window to the left. In the example of FIG. 34, a "Discover It" program is now highlighted and shown simultaneously in the central picture-in-picture window 375. Similarly, through the use of the left arrow button 148 and the right arrow button 150 along with the up arrow button 145 and the down arrow button 146 on the remote control device 60, each of the pix programs in the pix display 381 may be viewed within the central picture-in-picture window 375, as desired. As in the list function, pressing the select button 155 displays the currently highlighted program in full screen. Alternatively, pressing the pix button 144 a second time causes the pix display 381 to disappear and the last highlighted program appears in full screen.

Figure 35:
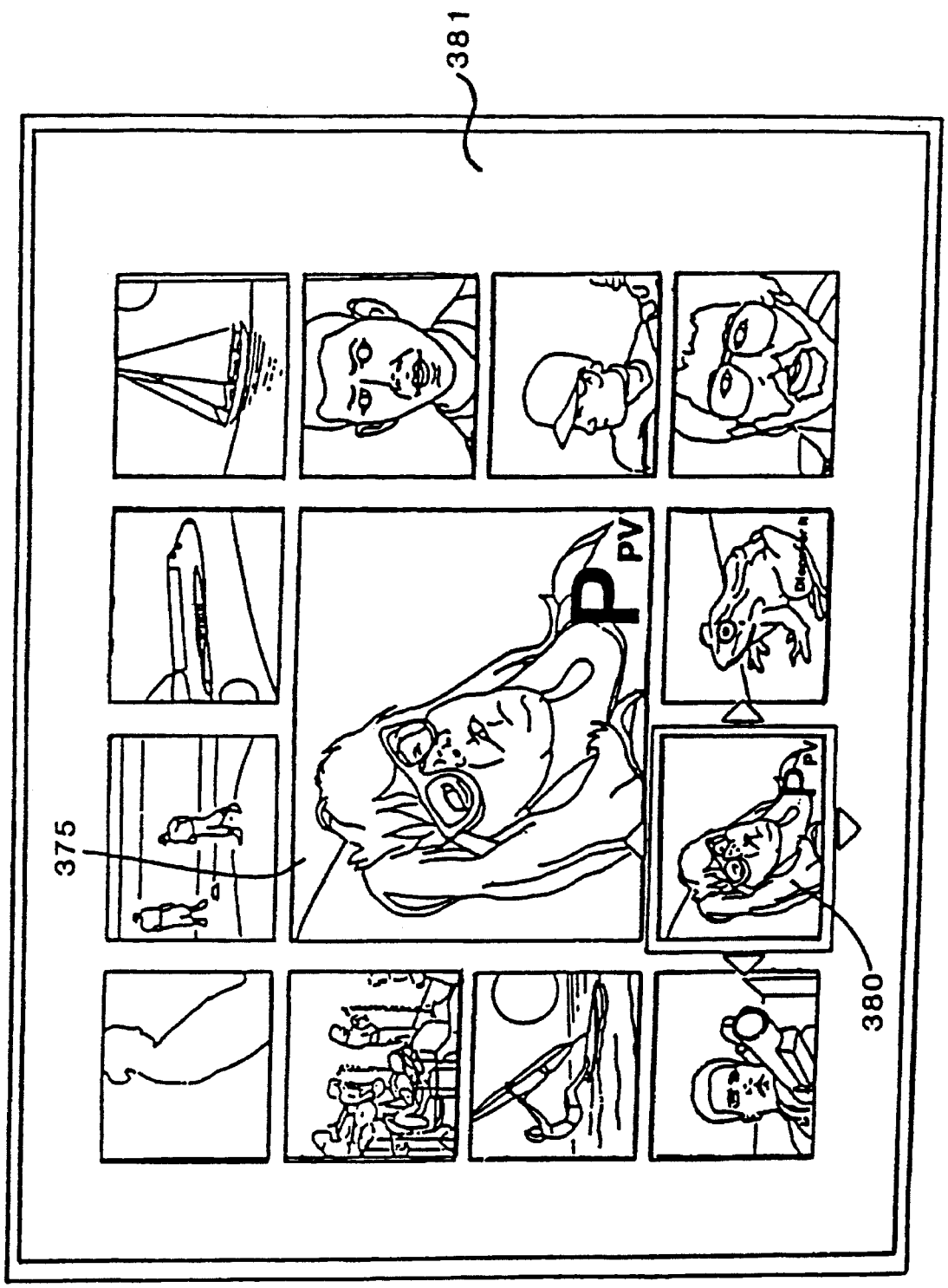
FIG. 35 is a further illustration of the present invention's pix function in which, through the use of the remote control device, a PIP window showing a pay-per-view program has been highlighted and is displayed in the center portion of the screen.

Referring to FIG. 35, selection of pay-per-view movie currently shown in one of the picture-in-picture window 380 of the pix display 381 for viewing is illustrated. As described earlier, by depressing the left arrow button 148 on the remote control device 60, the PIP window 380 becomes highlighted. In the example of FIG. 32, the pay-per-view channel shows a preview trailer for the motion picture "Jeff's World", which is now displayed in the center PIP window 375 and the perimeter PIP window 380 simultaneously. To select the pay-per-view movie, the select button 155 is depressed on the remote control device 60. It is contemplated that pressing a single, double or triple digit number on the numeric keypad 176, followed by the ok button 178 of the remote control 60, will display the corresponding pay-per-view channel, along with the 12 nearest channels. It is also contemplated that this pix function can be used with audio-visual programs and services other than TV shows, in particular when the menu button 172 is used to display the output of the VCR 56, the CD 70, a hard disk or one of the other A/V devices 57 connected to the A/V transceiver 54.

Menu Function

Figure 36:
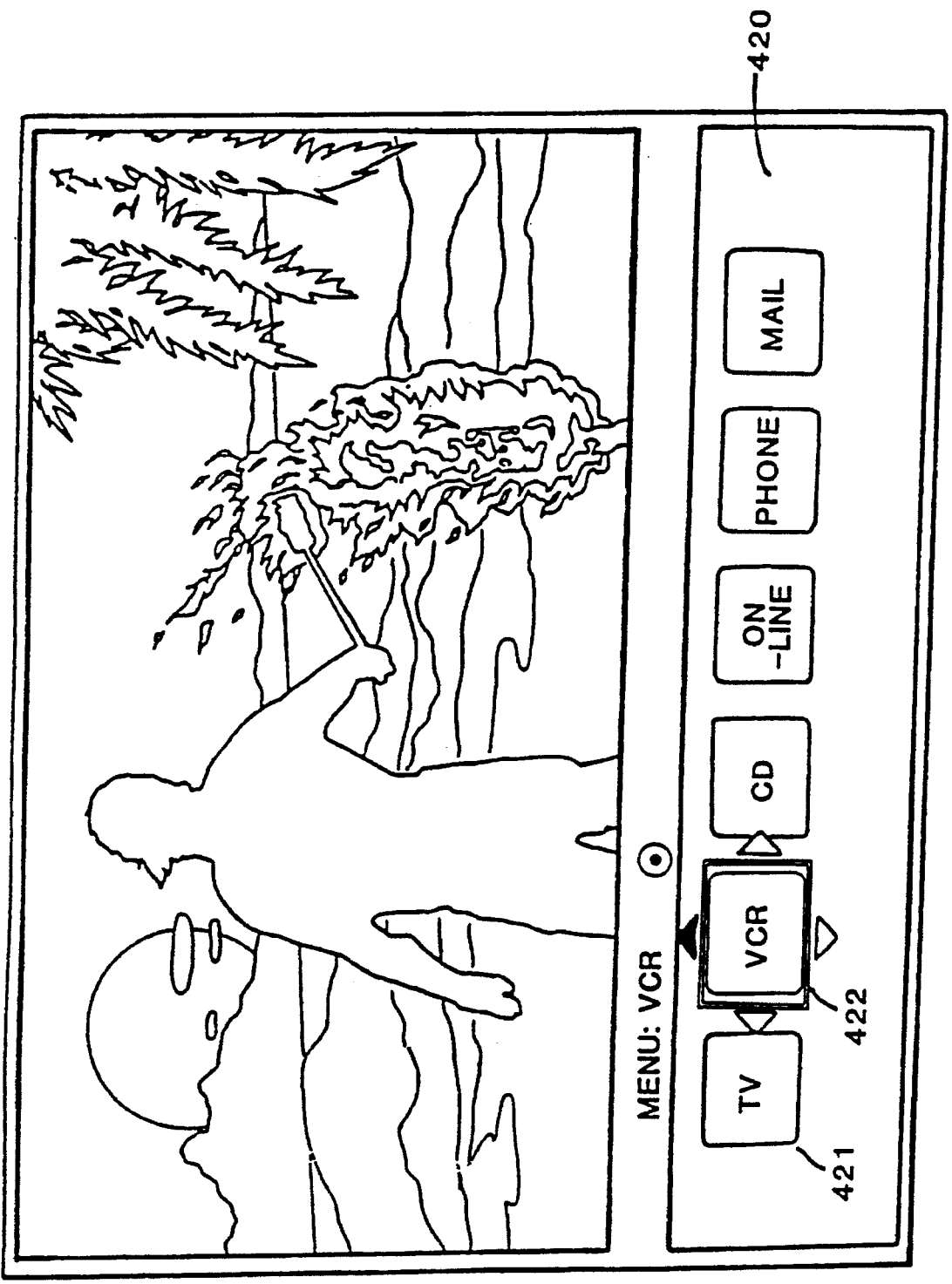
FIG. 36 illustrates the menu function which permits users to press a menu button to switch the television display to other audio-visual devices coupled to the transceiver, such as VCR, CD, on-line services, telephone, etc. For example, once VCR is selected, with the right arrow button, the TV displays an image from the videotape currently in the VCR and the user can press the play button on the remote to playback a previously recorded program on the video tape.

Referring now to FIG. 36, the menu function will now be described. The menu function permits users to switch the television display to any A/V source connected to the transceiver 54, such as the VCR 56, the CD ROM module 70, or one of the other A/V devices 57, and lets users control those A/V sources directly. As shown in FIG. 36, upon pressing the menu button 172 on the remote control device 60, the CPU 63 displays on the screen 180 a graphic overlay panel 420 which is superimposed over the currently viewed audio-visual program. As further shown in FIG. 36, a plurality of audio-visual sources connected to the transceiver 54 are identified by representative icons. The currently viewed A/V source icon is automatically highlighted, typically the TV icon 421. By depressing the right arrow button 150, or left arrow button 148 on the remote control 60, other A/V source icons may be highlighted and previewed. For example, by depressing the right arrow button 150, the next A/V source icon, VCR 422, is highlighted, as shown in FIG. 36. Simultaneously, CPU 63 displays an audio-visual program derived from the highlighted source icon, in this case a videotape playing in the VCR 56 onto the screen 180, as illustrated in FIG. 36. To select and control any A/V source whose icon is currently highlighted, in this case the VCR 56, the user can press the select button 155, whereafter the graphic overlay panel 420 disappears while the currently viewed program sourced from the VCR 56 is displayed in full screen. Thereafter, the user can press the play button 168 on the remote control device 60 to cause the CPU 63 to instruct the VCR 56 through the A/V connect module 66 or the IR control 82 to playback a previously recorded program on the VCR 56. Similarly, the user can press the stop arrow button 166, the rewind button 164, and/or the fast-forward button 170 on the remote control device 60 to further control the program sourced from VCR 56. It is contemplated that the CD ROM module 70 and some of the other A/V devices 57 including other CDs, VCRs, laser disc players, hard disks, telephones, answering machines, as well as transmitting devices connected to voice mail, electronic mail and various on-line services can be similarly selected and controlled through the use of the menu function, as illustrated in FIG. 36.

Other Functions

Figure 41:
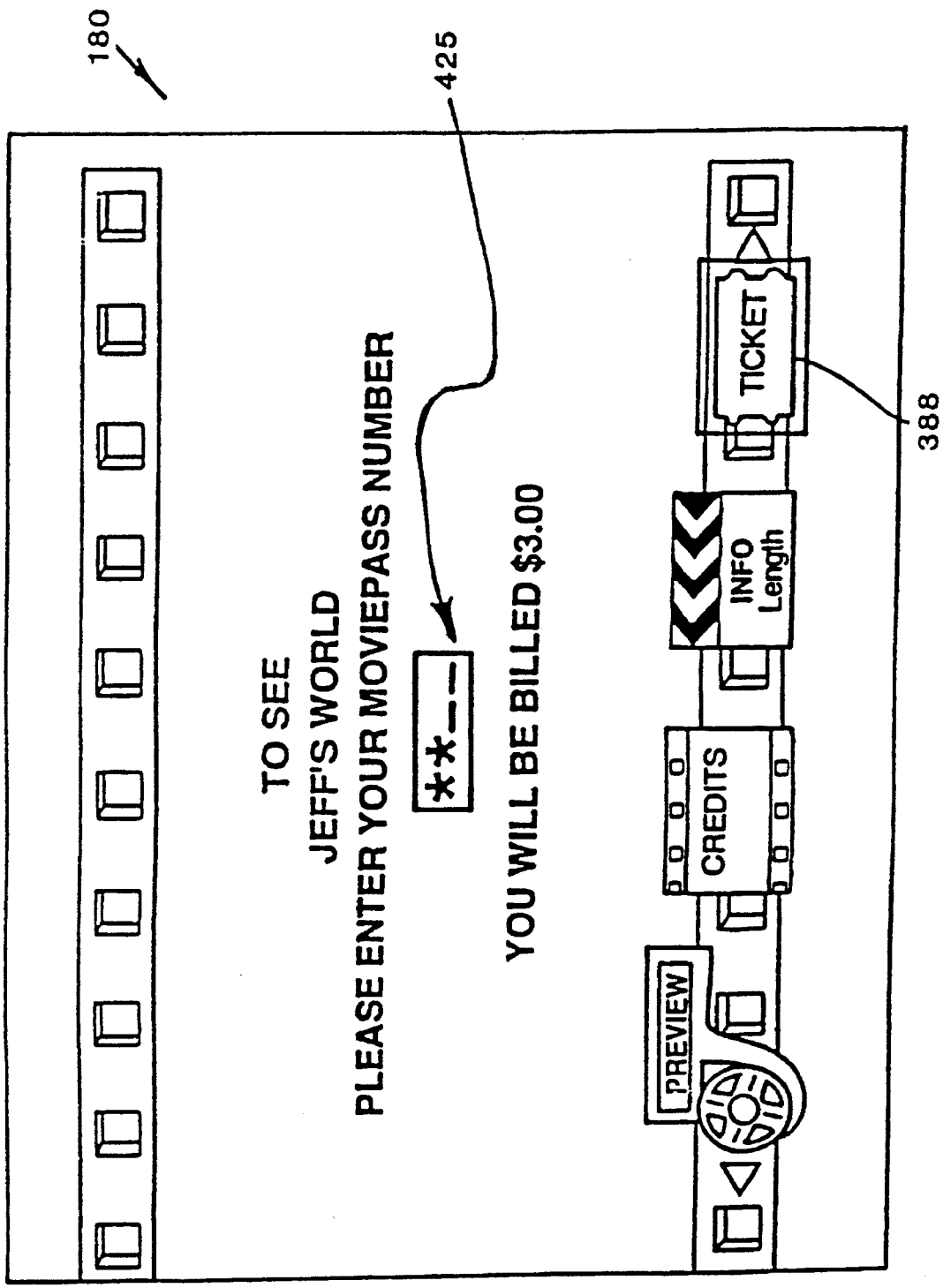
FIG. 41 illustrates a confirmation feature for ordering a pay-per-view offering through the use of the numeric keypad on the remote control device under the above illustrated embodiment.
Figure 49:
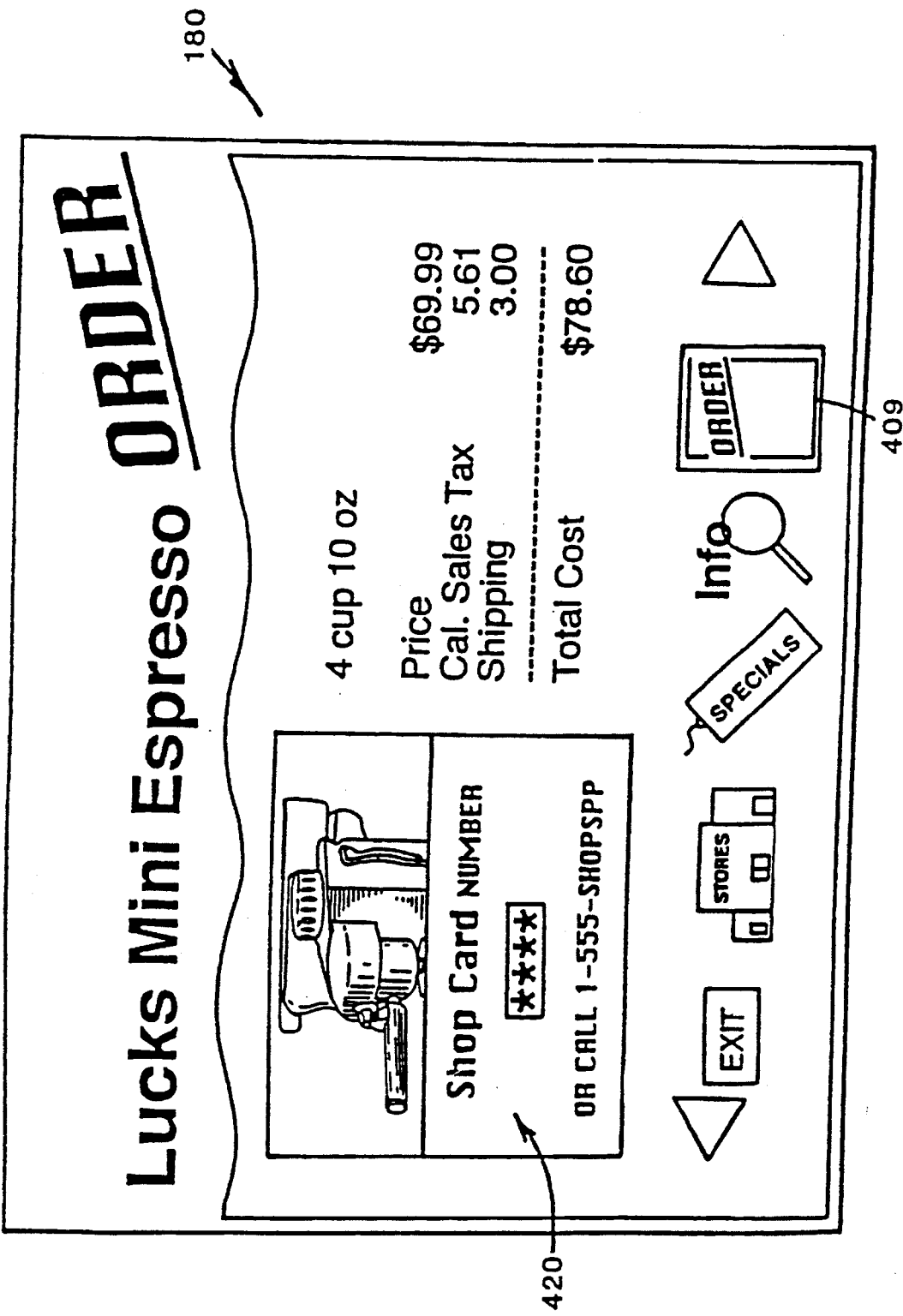
FIG. 49 is an order screen in which the user, using the numeric keypad on the remote control device, enters a personal identification number to order the mini-espresso machine under the above illustrated embodiment.

Other functions may be realized with the present invention, including numeric data entry. As shown in FIGS. 41 and 49, by pressing one or more buttons on the numeric keypad 176 of the remote control device 60, a user can confirm a financial transaction by entering his or her personal identification number (PIN) in a confirmation display field 425. The numeric keypad 176 may also be used for dialing TV channel numbers, telephone numbers and other program source identifiers, as desired.

Yet another function which may be optionally realized by the present invention is a talk function, whereby a user can depress the talk button 181 on the remote control device 60, and thereafter issue spoken commands into the microphone 179 located on the remote control device 60 in lieu of or in addition to pressing buttons on the remote control device 60. Through the use of voice recognition hardware and software operating in conjunction with the CPU 63, the present invention can be made to interpret the spoken commands requested by the user, and invoke the corresponding functions. For example, a user may speak the word "sports" while pressing talk button 181, which is equivalent to invoking the category function and highlighting the sports category, as if the user had pressed the corresponding sequence of buttons, as described earlier. It is further contemplated that the remote control device 60 in conjunction with the TV 58 and a camera can be used as a video telephone for video conferencing and the like, wherein having engaged a telephone line (via the menu function) the user speaks directly into the remote control device 60 as if it were a standard telephone.

Pay-Per-View Interface

Figure 37:
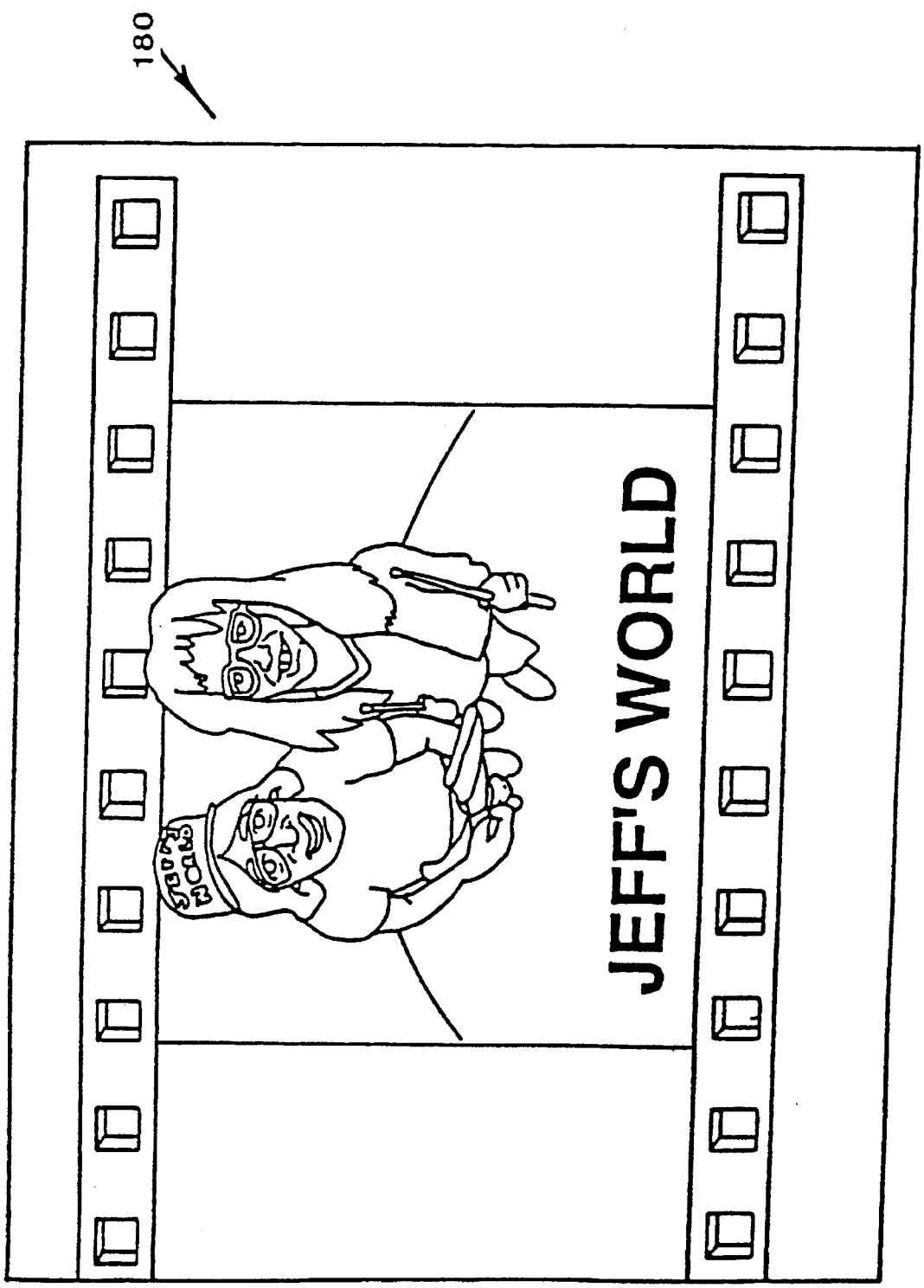
FIG. 37 illustrates one embodiment of the present invention for selecting a pay-per-view channel offering entitled "Jeff's World" through the use of the select button of the remote control device.
Figure 38:
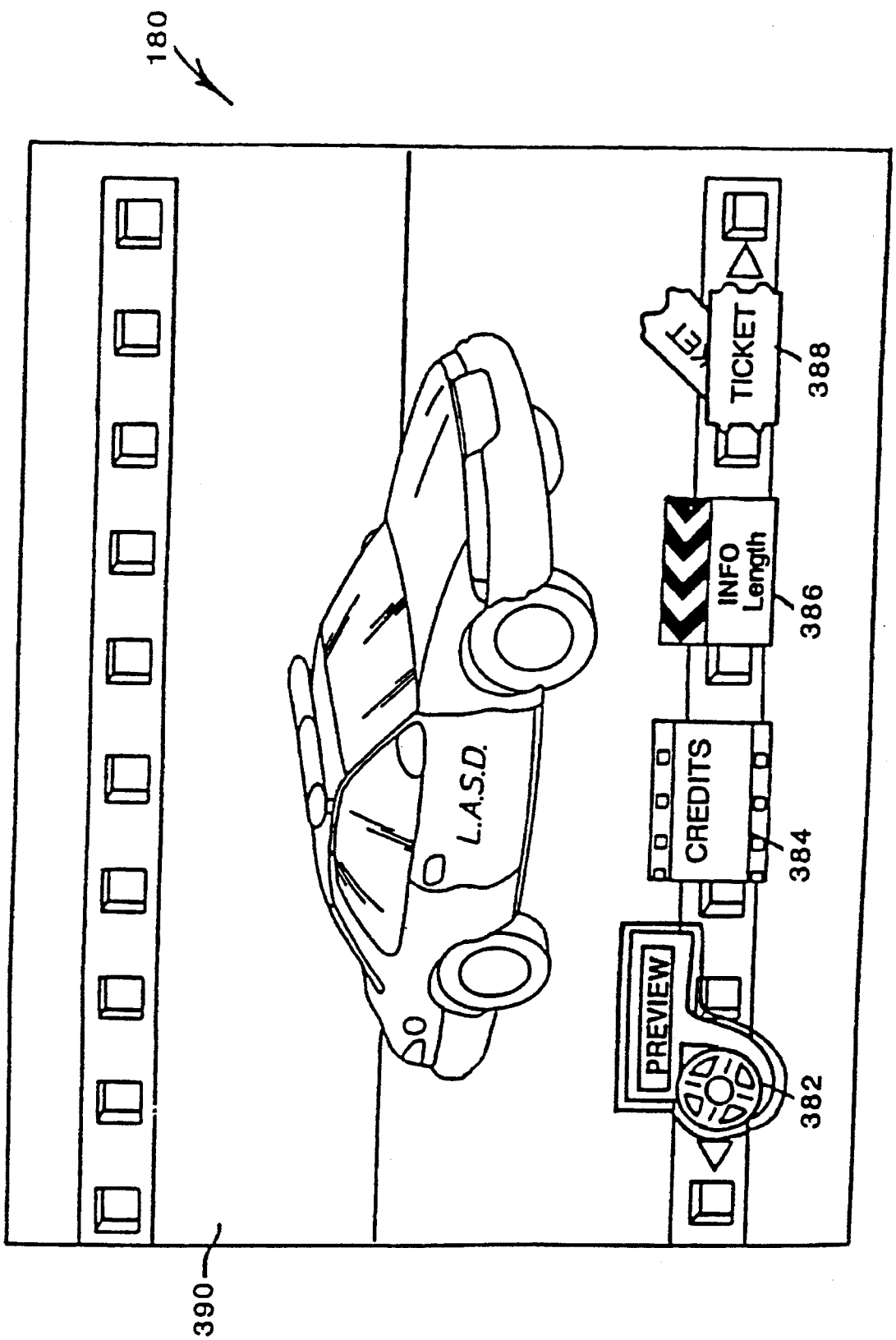
FIG. 38 illustrates a preview feature of pay-per-view under the above illustrated embodiment.

The present invention includes one possible pay-per-view (PPV) interface which will now be described. Assume that the user has selected the TV source icon 421 using the menu function displayed in the graphic overlay panel 420, and further selects a pay-per-view program using either the list or the pix function. This selection results in an initial title screen to be displayed, as illustrated in FIG. 37, which may be static or animated. As shown in FIG. 38, upon the selection of the PPV program and subsequent to the display of the title screen of FIG. 37, a preview icon 382, a credit icon 384, an info icon 386, and a ticket icon 388 are displayed, along with a preview trailer which is continuously looping and is displayed in a half-screen picture-in-picture window 390. It will be noted that in FIG. 38, the preview icon 382 has been highlighted by default, thereby corresponding to the trailer being shown in the window 390.

Figure 39:
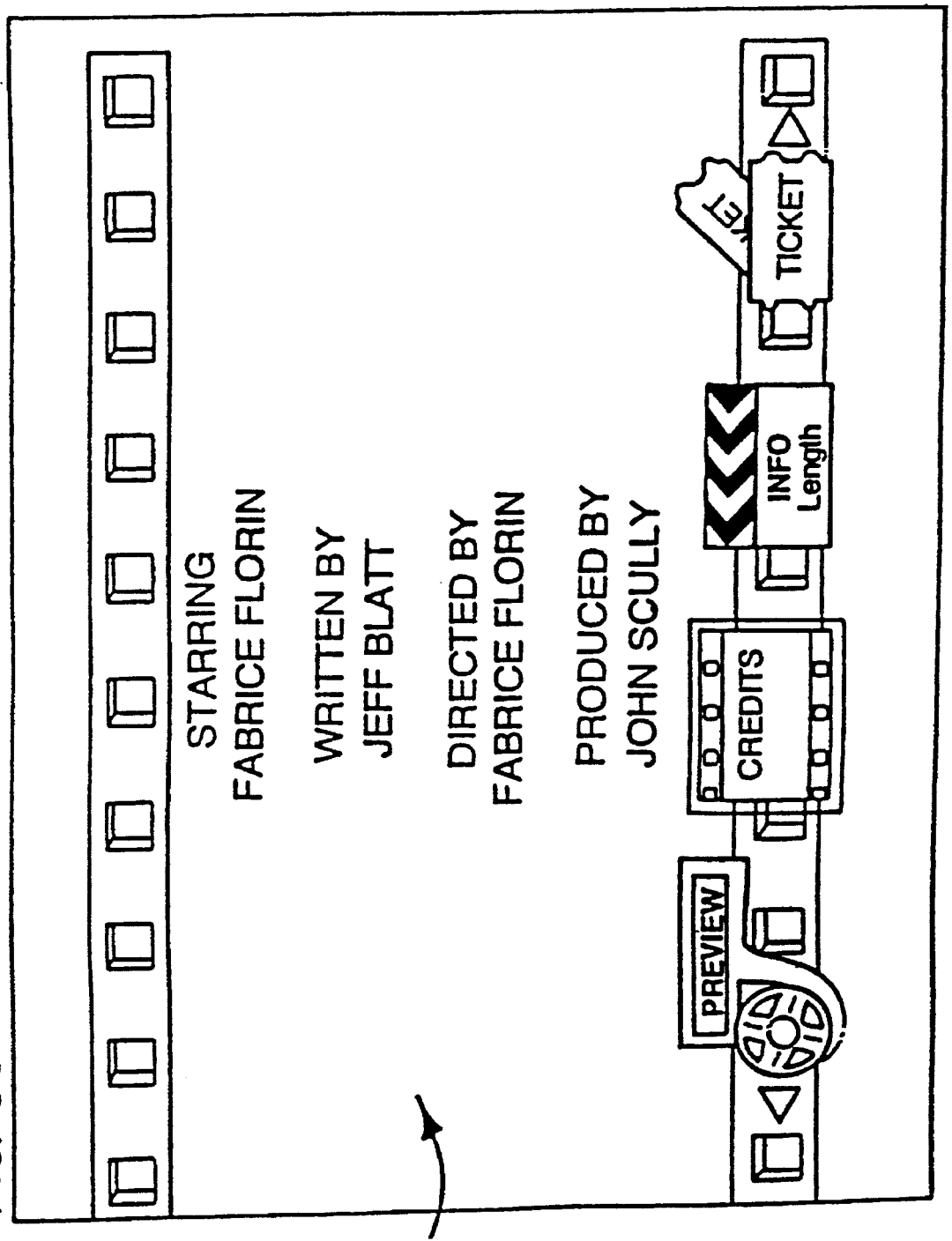
FIG. 39 illustrates a credits feature of pay-per-view under the above illustrated embodiment.
Figure 40:
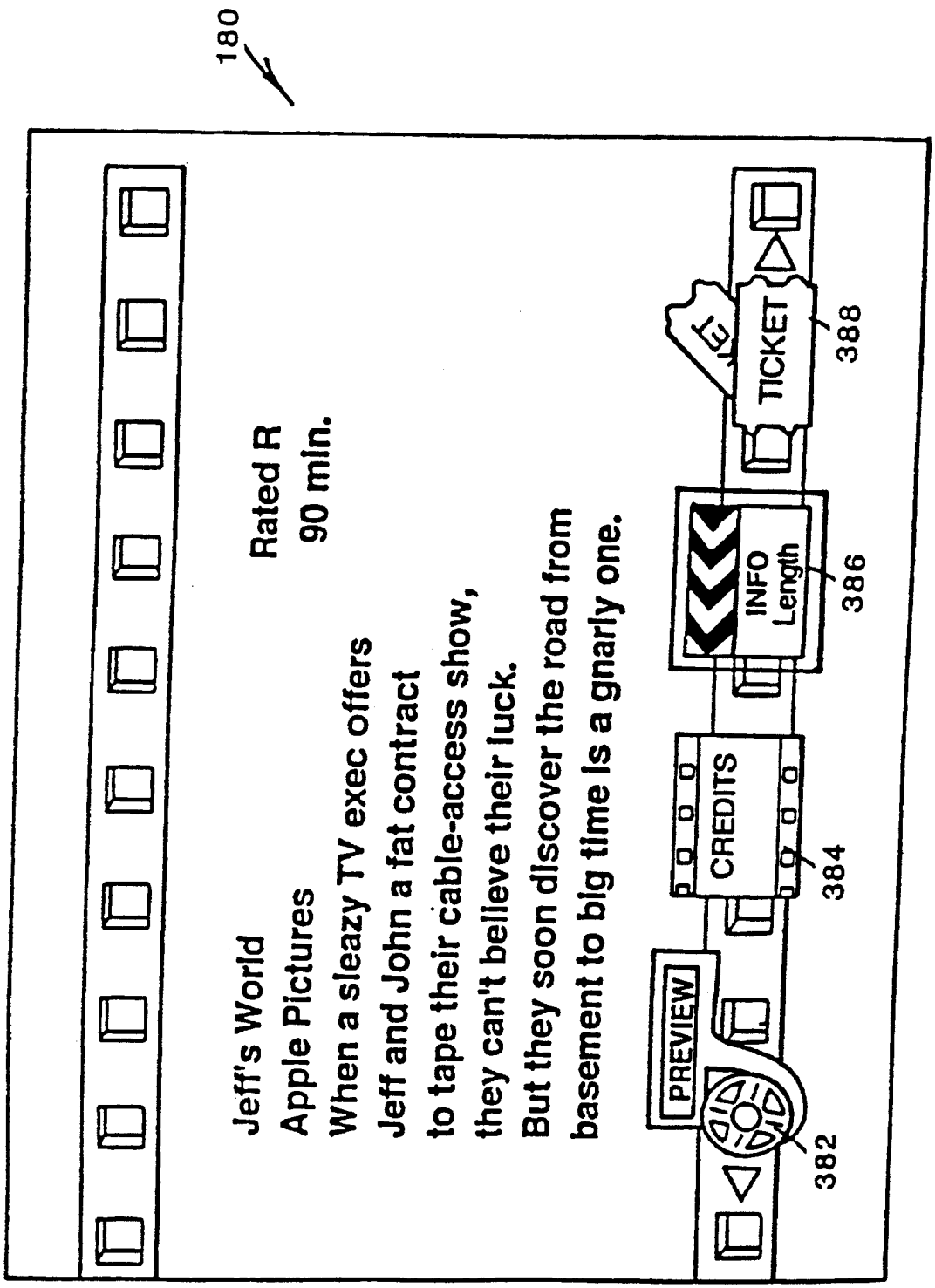
FIG. 40 illustrates an info feature of pay-per-view under the above illustrated embodiment.

Referring now to FIG. 39, by depressing the right arrow button 150 of the remote control device 60, the credit icon 384 may be highlighted. The credits for the pay-per-view movie are displayed on the screen 180 within the window 390. By depressing the right arrow button 150 once again, the info icon 386 is highlighted. As shown in FIG. 40, information related to the pay-per-view movie is then provided to the user, such as the title, the production company, a brief description of the movie, the rating and the total length. If the user desires to watch the pay-per-view movie, he/she depresses the right arrow button 150 once again to highlight the ticket icon 388, as illustrated in FIG. 41.

Figure 42:
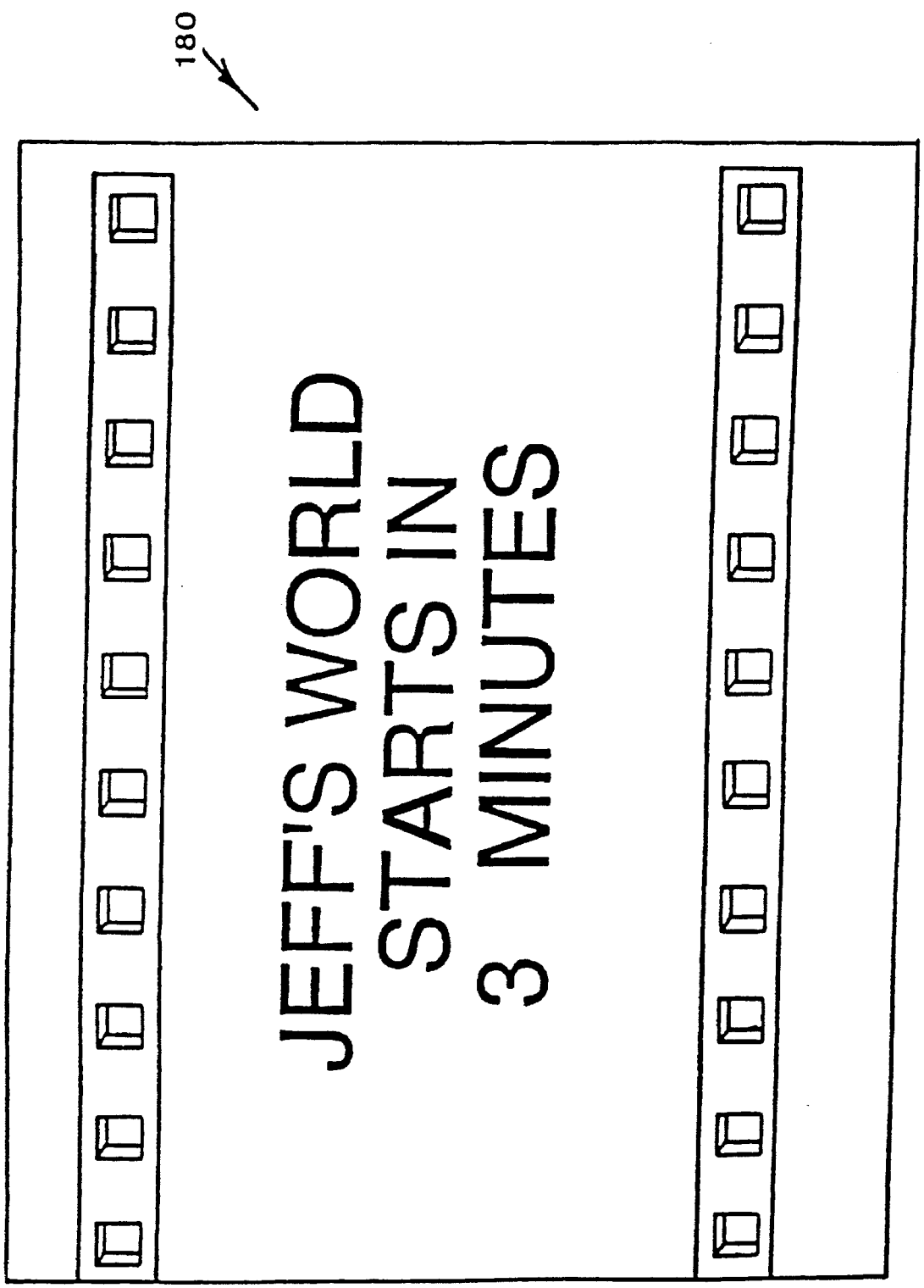
FIG. 42 illustrates the reminder feature advising the user that the selected offering of pay-per-view will begin in three minutes under the above illustrated embodiment.

As shown in FIG. 41, upon the selection of the highlighted "ticket" icon 388, the CPU 63 generates and displays on the screen 180 a request for the user to input a "movie pass" password using the numeric keypad 176 of the remote control device 60. After entering the personal identification number (PIN) using the numeric keypad 176, causing a confirmation sound to be played and confirmation symbols such as asterisks to fill in a blank confirmation display 425, the user depresses the ok button 178 or the select button 155 on the remote control device 60 to order and view the pay-per-view movie. As shown in FIG. 42, transceiver 54 then displays the ordered program if it is available, or displays a message informing the viewer that the pay-per-view movie will begin screening within X number of minutes. In operation, depressing the ok button 178 or the select button 155 subsequent to the entering of the movie pass personal identification number (PIN) results in the CPU 63 providing a signal to the cable service provider 50, over the T/T cable 52 using one of the back channels 102 (See FIG. 3*a*). It will further be appreciated that during the waiting period prior to the transmission of the pay-per-view movie, additional trailers and other previews may be displayed to the user on the screen 180. It will also be noted that if the user incorrectly enters his/her movie pass PIN number, pressing the clear button 177 on the numeric keypad 176 allows them to clear the confirmation display 425 and start over again. It will also be appreciated that other pay-per-view interfaces may be designed and implemented using the teachings of the present invention on general purpose audio-visual user interface.

Home Shopping Interface

Figure 43:
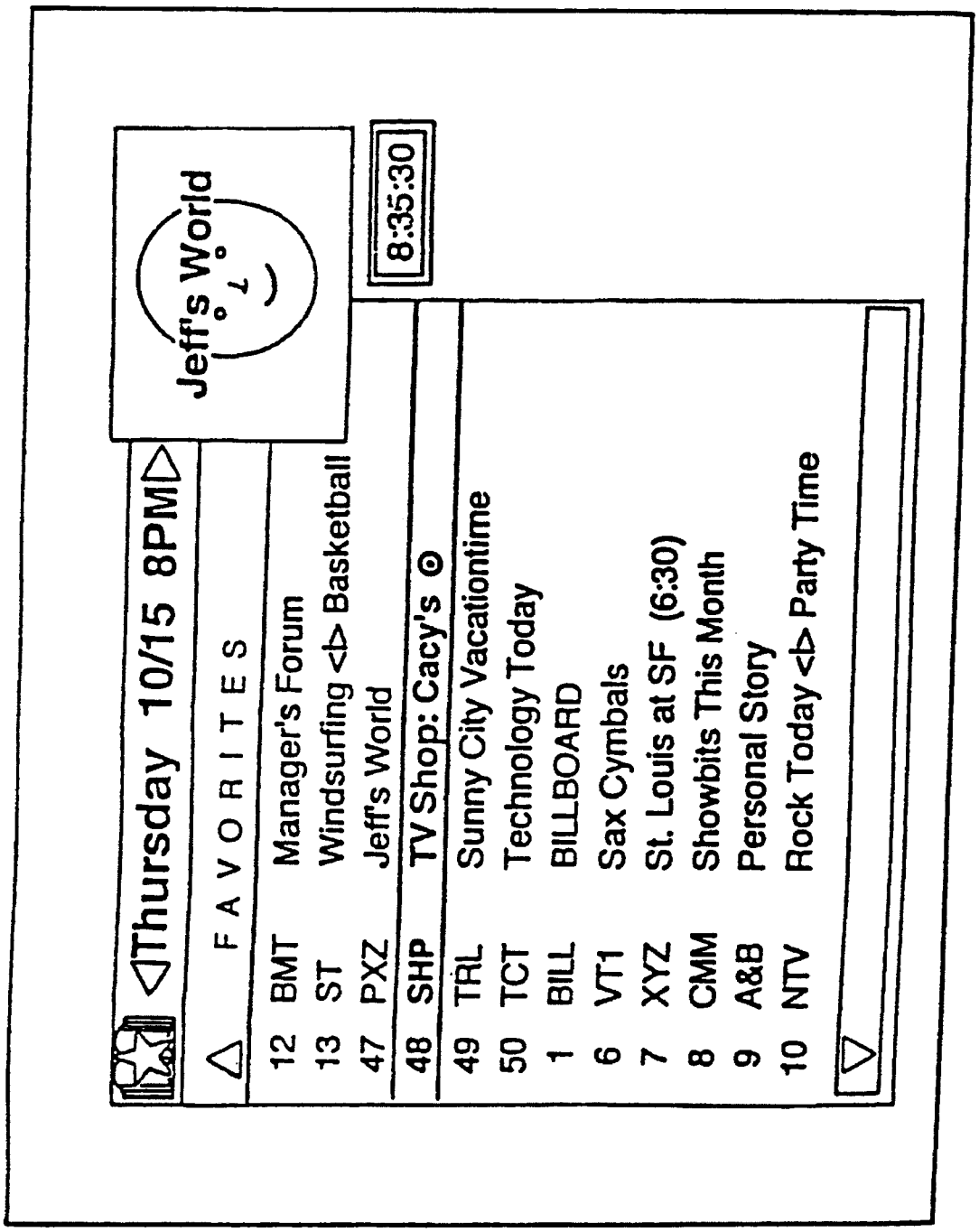
FIG. 43 illustrates one embodiment of the present invention for selecting and interacting with a home shopping service (TV Shop) offering.
Figure 44:
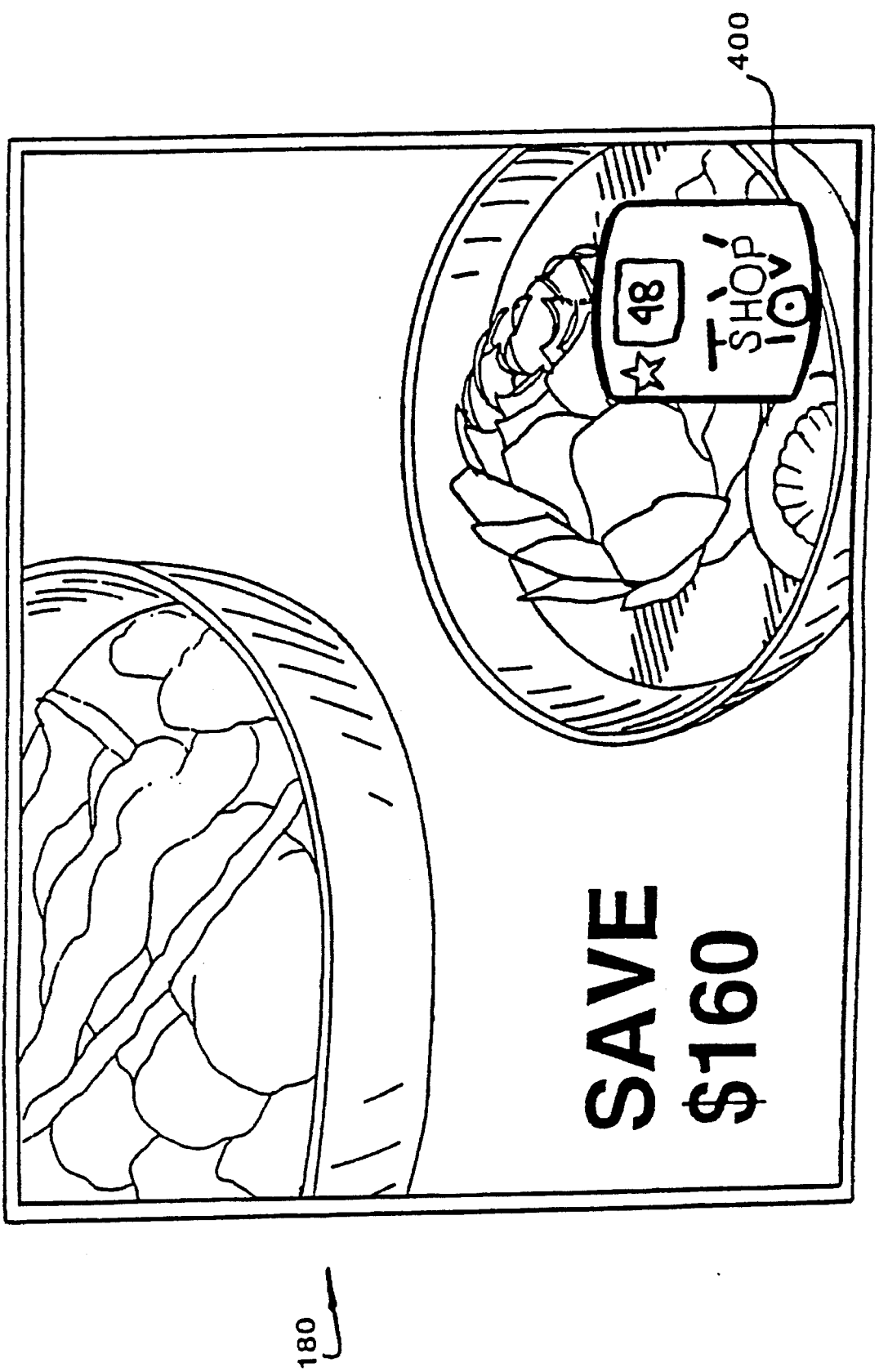
FIG. 44 illustrates a sample commercial shown to the user if the home shopping service is selected through the use of the select button on the remote control device under the above illustrated embodiment.

The present invention includes one possible home shopping interface, which will now be described. In FIG. 43, a channel identified as "SHP" or "TV Shop" represents a dedicated home shopping service within the electronic spectrum illustrated in FIG. 3*a*. It will be noted that although in its present embodiment, TV Shop is presented as a television channel, it could also be presented as an on-line service through a transmitting device connected to the T/T cable 52. In the current embodiment, the selection of the TV Shop service results in a continuous full-motion video display of various paid-for commercials or advertising messages. As shown in the representative screen of FIG. 44, a TV Shop icon is displayed along with a blinking select icon (or right arrow icon) in a graphic overlay panel 400, at the start and end of each advertisement, prompting users to press the select button 155 (or right arrow 150).

Figure 45:
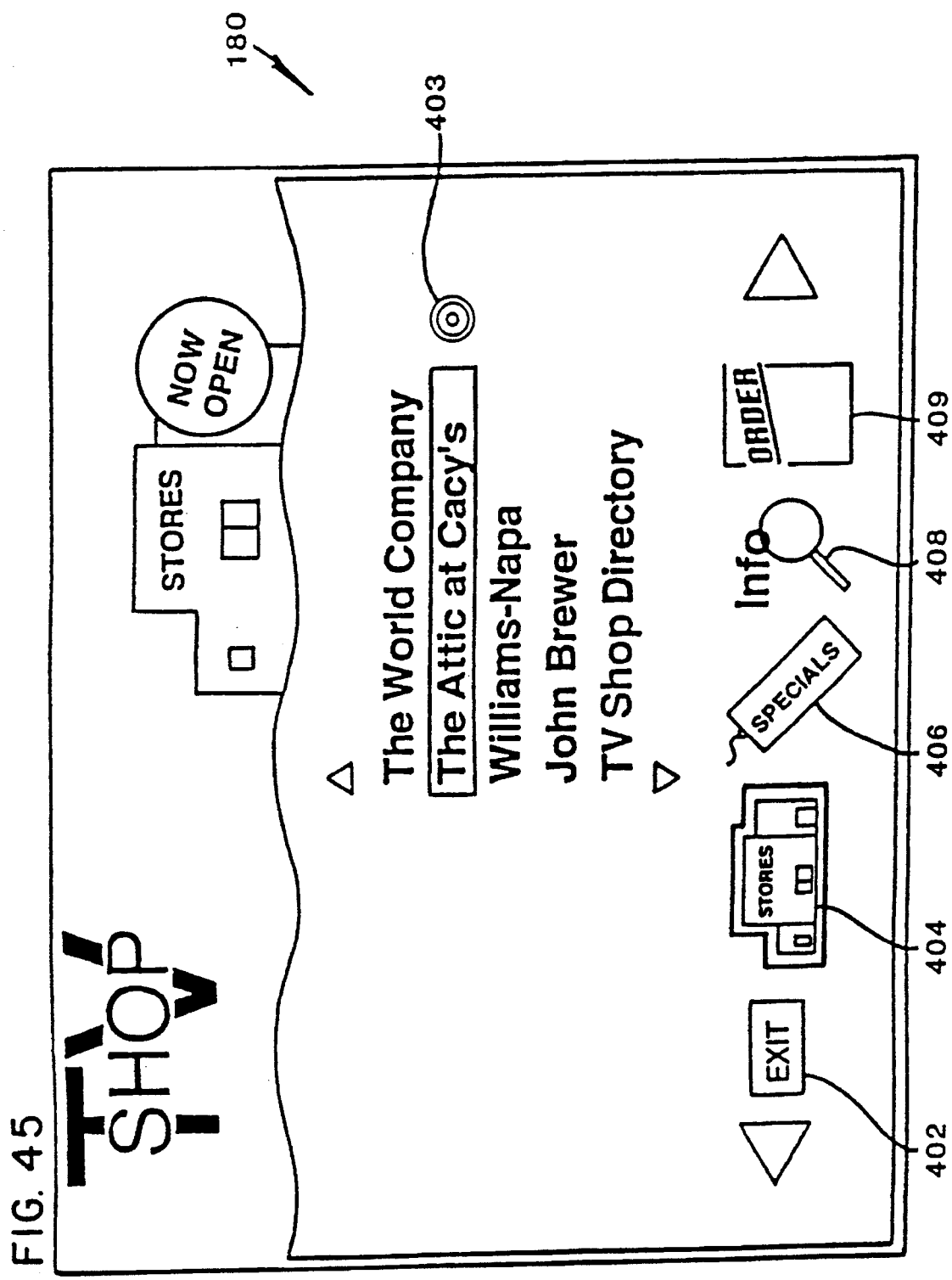
FIG. 45 illustrates a menu permitting the user to select various shops available on the home shopping service using the select button on the remote control device under the above illustrated embodiment.
Figure 46:
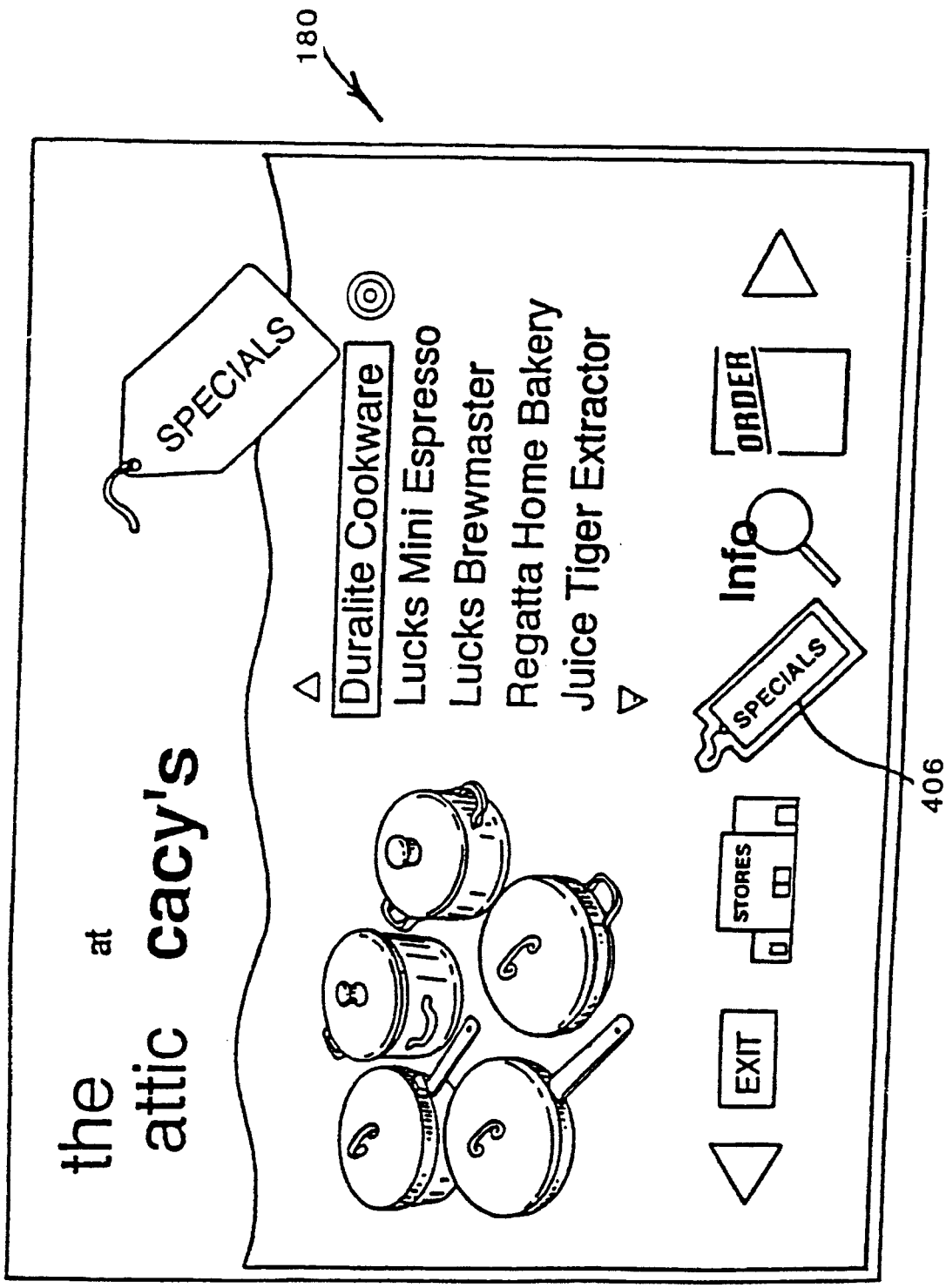
FIG. 46 is a further illustration of the home shopping service in which a cookware product is highlighted under the above illustrated embodiment.

Referring now to FIG. 45, by pressing the select button 155 (or the right arrow button 150), the user can view additional information relating to the advertisements shown in the full motion video section of the TV Shop. In the example of FIG. 45, it will be noted that a listing of the advertisers is provided, in which the advertisers whose commercial was playing last is highlighted. Through the use of the up arrow button 145 or the down arrow button 146, the user may scroll through the advertisers, sequentially highlighting each of their advertising identifiers, along with a select icon 403 prompting a user to select that advertiser. Moreover, as shown in FIG. 45, an "exit" icon 402, a "stores" icon 404, a "specials" icon 406, an info icon (or "compare" icon) 408, an "order" icon 409 and other icons may be presented to the viewer. As illustrated in FIG. 46 the selection of the "Attic at Casey's" advertiser with the select button 155 (or the right arrow button 150) results in a display of the various specials available from that advertiser. In FIG. 46, there is shown cookware highlighted in conjunction with a still image of the cookware for sale. By depressing the down arrow button 146 on remote control device 60, the highlighted section on the display can be moved down such that the mini-espresso (see FIG. 47) is selected. Simultaneously with the highlighting of the mini-espresso selection, a still image of the mini-espresso machine for sale is shown.

Figure 47:
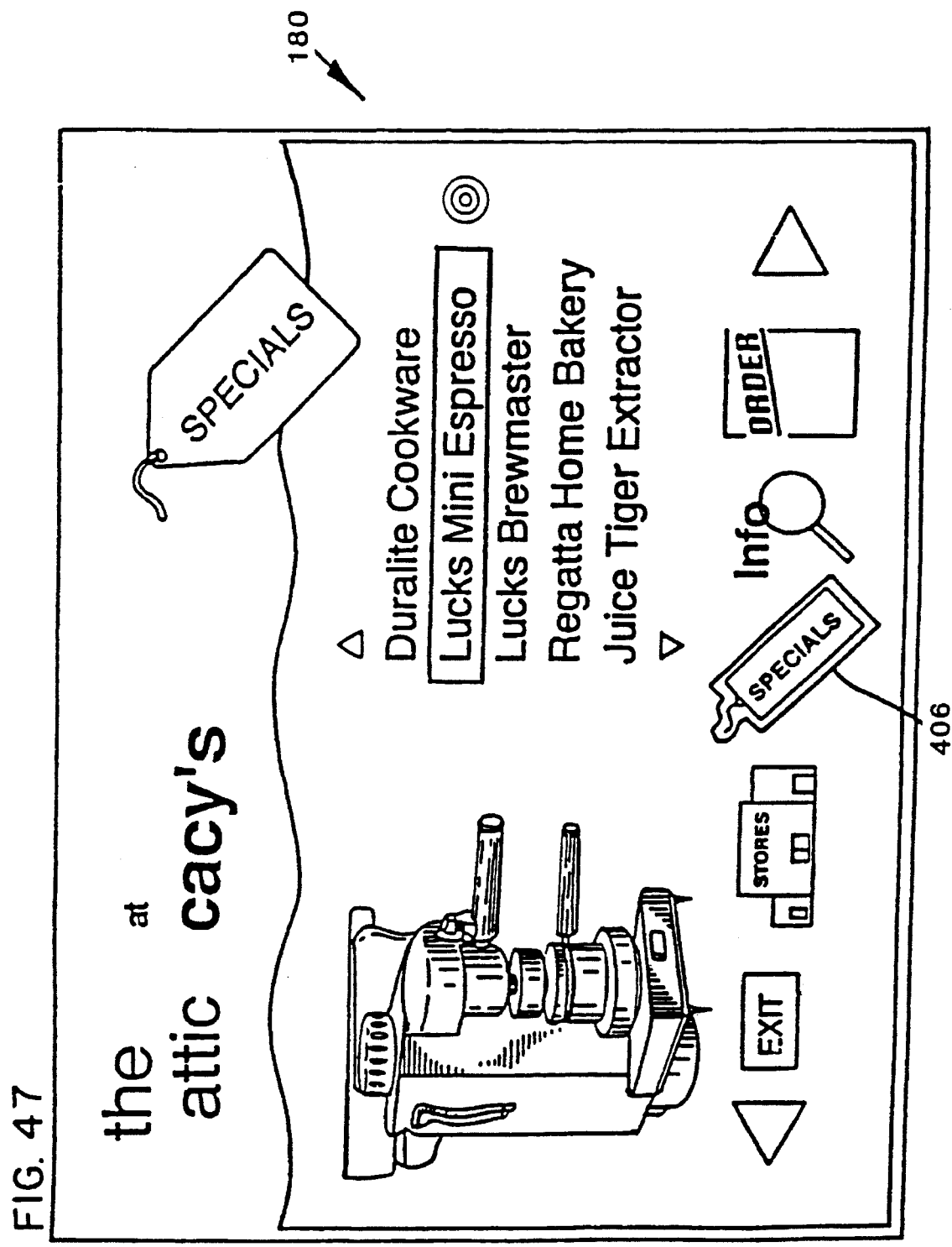
FIG. 47 is a further illustration of the home shopping service in which a mini-espresso machine is highlighted, and can be selected for ordering with the select button on the remote control device under the above illustrated embodiment.
Figure 48:
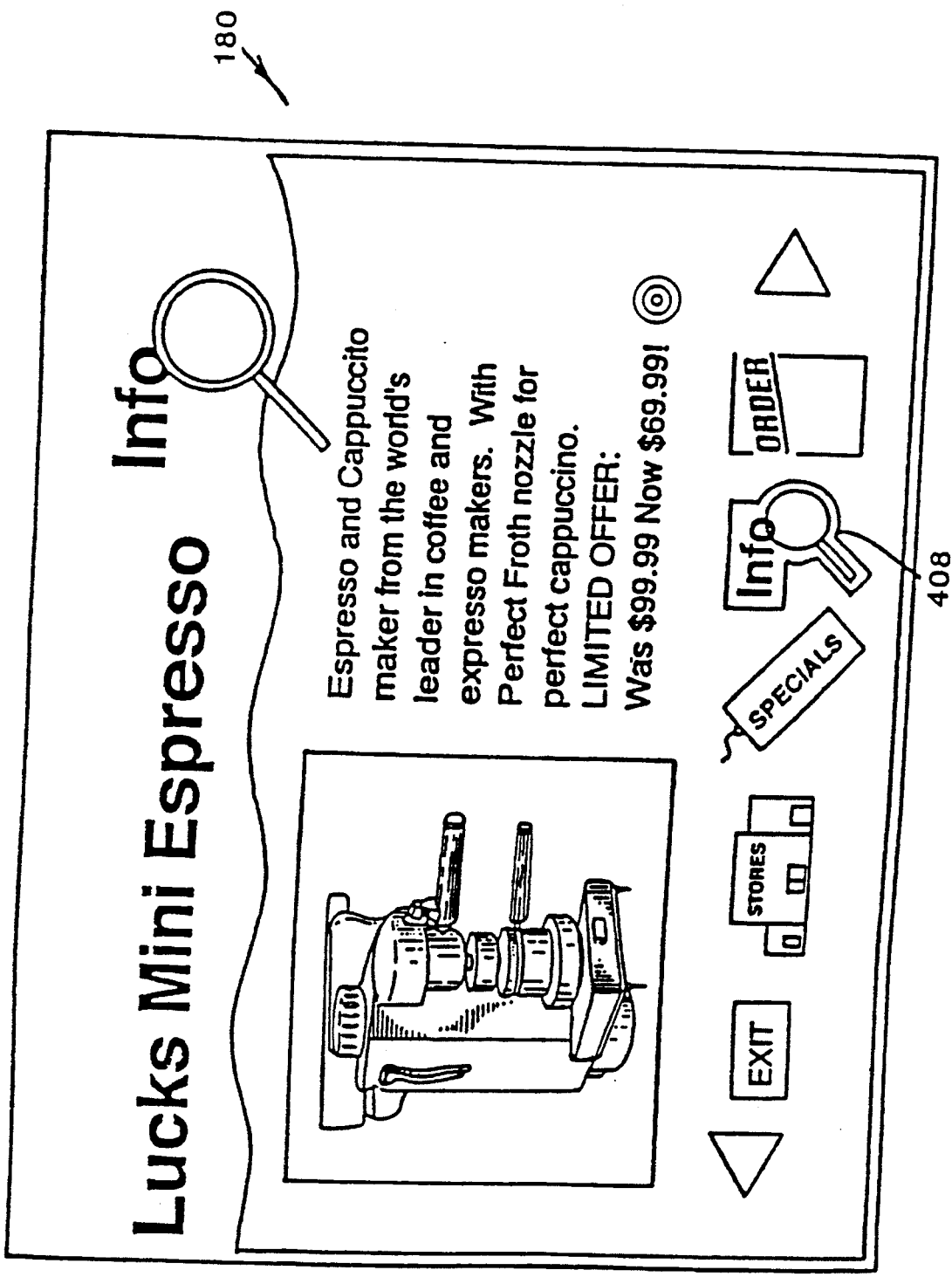
FIG. 48 is an information screen provided to the user after selecting a mini-espresso machine for ordering under the above illustrated embodiment.
Figure 50:
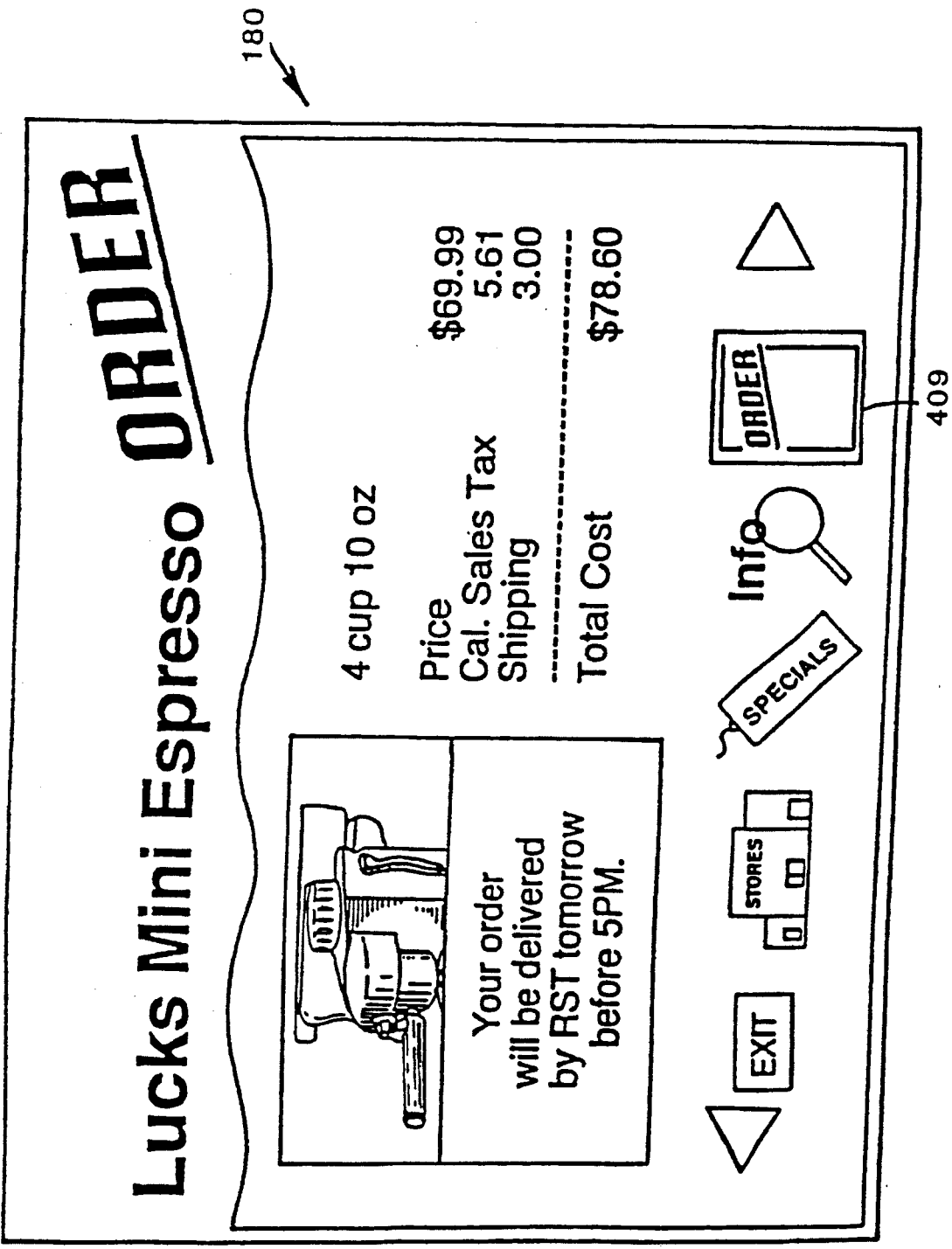
FIG. 50 is a sample order confirmation provided to the user subsequent to ordering a product in the home shopping service under the above illustrated embodiment.

Referring to FIG. 48, to obtain further information regarding the mini-espresso machine illustrated in FIG. 47, the user depresses the select button 155 (or the right arrow button 150) on the remote control device 60 to highlight the info icon 408. As illustrated in FIG. 48, information relating to the particular product (i.e. espresso machine) is shown on the screen 180. To order the mini-espresso machine illustrated in FIGS. 47 and 48, the user depresses the select button 155 (or the right arrow button 150) to highlight the order icon 409. As illustrated in FIG. 49, a personal identification order number window 420 is displayed in which the user (using the numeric keypad 176) inputs a personal identification number (PIN). After entering the personal identification number (PIN), the ok button 178 or select button 155 is depressed to order the product. In the presently preferred embodiment, once the personal identification number (PIN) of the user is entered into the system of the present invention and the ok button 178 or the select button 155 is depressed, a signal is provided by the CPU 63 to the service provider 50, using one of the back channels 102 (See FIG. 3)a. As illustrated in FIG. 50, a confirmation of the order, along with a delivery time is displayed to the user. It will also be appreciated that other home shopping interface variants may be designed and implemented using the teachings of the present invention.

Summary

The present invention as described provides methods and apparatus for a unique audio-visual interface for television and other A/V programs and services. The present invention's functions and features provide a user interface which helps users find and view programs of interest, access related information, control various audio-visual devices and order products or services from their own homes. While the present invention has been described with references to the various figures, it will be appreciated that the figures are for illustration only, and do not limit the spirit and scope of the invention. For example, although the figures have, by necessity, used example screens having certain attributes, icons, criteria or functions, it will be appreciated that the invention is not limited by the specific examples provided. Rather, the present invention has application in any television and/or audio-visual display system. In addition, it will be noted that the present invention may be realized using a variety of computer hardware and computer software, and is not limited to any particular hardware or software systems.

Moreover, it will be appreciated that many of the functions and features of the present invention, such as graphic overlay panels, icons, and selection methods, are not static events and are perceived by the user as having motion, color, sound and/or animation. Specifically, it will be appreciated that the present audio-visual user interface also includes an audio interface using a plurality of sound icons and backgrounds, which compliment the visual interface and are played almost every time a function of the present invention is used, and which cannot be illustrated graphically here, but are part of the present invention. Due to the limitations of a written specification, the reader is referred to a videotape entitled "EZTV" submitted by the Applicants concurrent with the filing of the application on which this patent is based.

We claim:

1. An interactive user interface and audio-visual (A/V) system comprising:

a transceiver coupled to art audio-visual (A/V) display for receiving audio-visual signals in an electronic signal spectrum from a signal source, said transceiver including interface generation means for causing said A/V display to display an interface, said interface including selectively displayed multiple levels of information related to an audio-visual program viewed on said A/V display, wherein said multiple levels of information include information received by said transceiver over a plurality of information tracks;

control means in communication with said transceiver for permitting a user viewing said A/V display to selectively display said multiple levels of information on said A/V display;

wherein said interface is displayed in an overlay region that includes at least one direction cue to identify at least one direction on said A/V display corresponding to at least one additional level of information.

2. The audio-visual system as defined by claim 1 wherein a plurality of direction cues are displayed on said A/V display, wherein one or more of said plurality of direction cues are available direction cues said available direction cues being highlighted on said A/V display.

3. An interactive user interface an audio-visual (A/V) system comprising:

a transceiver coupled to an audio-visual (A/V) display for receiving audio-visual signals in an electronic signal spectrum from a signal source, Said transceiver including interface generation means for causing said A/V display to display an interface, said interface including selectively displayed multiple levels of information related to a currently viewed program viewed on said A/V display:

control means in communication with said transceiver for permitting a user viewing said A/V display to selectively display said multiple levels of information on said A/V display;

wherein a plurality of direction cues are displayed on said A/V display, wherein one or more of said plurality of direction cues are available direction cues, said available direction cues being highlighted on said A/V display;

wherein said control means includes direction arrow buttons, said user activating one of said direction arrow buttons corresponding to the direction identified by one of said available direction cues resulting in said transceiver causing said A/V display to display an additional level of information related to said currently viewed program.

4. The audio-visual system as defined by claim 3 wherein activation of a left and a right direction button on said control means results in movement between pages of information relating to said currently viewed program.

5. The audio-visual system as defined by claim 3 wherein activation of an up and a down button on said control means results in movement between additional levels of information, wherein said additional levels of information provide data on a plurality of currently viewed subjects in said currently viewed program.

6. The audio-visual system as defined by claim 3 wherein said additional levels of information are selectively displayed in an overlay region that comprises a horizontal bar on a lower portion of said A/V display.

7. An interactive user interface and audio-visual (A/V) system, comprising:

a transceiver coupled to an audio-visual (A/V) display for receiving audio-visual signals in an electronic signal spectrum from a signal source, said transceiver including interface generation means for causing said A/V display to display an interface, said interface including selectively displayed multiple levels of information related to an audio-visual program viewed on said A/V display;

control means in communication with said transceiver for permitting a user viewing said A/V display to selectively display said multiple levels Of information on said A/V display;

wherein said transceiver further includes a switcher and at least one tuner/demodulator coupled to said signal source; said switcher coupling said at least one tuner/demodulator to said A/V display and a storage means, for switching digital and analog A/V data between said signal source, said A/V display and said storage means, said transceiver further including at least one processor unit, at least one system memory, unit, and a bus controller cooperatively coupled together for receiving input control and data signals and in response generating output control and data signals for said signal source, said A/V display, and said storage means.

8. The audio-visual system as defined by claim 7 wherein said electronic signal spectrum includes at least one digital program listing channel for downloading program listing data from said signal source to said system memory.

9. The audio-visual system as defined by claim 8 wherein said program listing data is downloaded to said system memory such that said data is interleaved, and wherein said program listing data comprises data for a current date followed by data for another day of the week.

10. The audio-visual system as defined by claim 8 wherein said program listing data includes program title data.

11. The audio-visual system as defined by claim 8 wherein said program listing data includes show time data and channel number data.

12. The audio-visual system as defined by claim 8 wherein said program listing data includes length data and caption data for audio-visual programs.

13. The audio-visual system as defined by claim 7 wherein said electronic signal spectrum comprises analog and digital A/V channels.

14. The audio-visual system as defined by claim 7 wherein said control means includes a hand held remote control device.

15. An interactive user interface and audio-visual (A/V) system, comprising:

a transceiver coupled to an audio-visual (A/V) display for receiving audio-visual signals in an electronic signal spectrum from a signal source, said transceiver including interface generation means for causing said A/V display to display an interface, said interface including selectively displayed multiple levels of information related to an audio-visual program viewed on said A/V display;

control means in communication with said transceiver for permitting a user viewing said A/V display to selectively display said multiple levels of information on said A/V display;

wherein said interface generation means further includes listing means for causing said A/V display to selectively display a program listing that contains listing information related to A/V programs viewable on said A/V display;

wherein said program listing includes a first picture-in-a-picture (PIP) window in which the currently viewed program viewed by said user prior to said activation of said listing means is displayed on said A/V display.

16. The audio-visual system as defined by claim 15 wherein said program listing includes a program listing icon to identify to said user that said listing means has been activated.

17. The audio-visual system as defined by claim 15 wherein a listing for the currently viewed program that is displayed in said first picture-in-picture (PIP) window is highlighted when said program listing is activated.

18. The audio-visual system as defined by claim 17 wherein said control means includes a remote control device operated by said user having direction arrow buttons, including up, down, left and right buttons.

19. The audio-visual system as defined by claim 18 wherein said program listing scrolls up and down to display additional program listings for said current date and time when said user continues to depress respectively, said up and down buttons on said remote control device.

20. The audio-visual system as defined by claim 18 wherein depressing said up and down buttons causes a particular program listing to be selected, said particular program listing being thereby highlighted on said A/V display.

21. The audio-visual system as defined by claim 18 wherein said interface generation means causes said A/V display to display listings for future time slots if said user depresses a predefined button on said remote control device and in which the speed of display increases if the user depresses the predefined button longer than N seconds.

22. The audio-visual system as defined by claim 15 wherein said program listings are displayed in hourly time slots, programs of less than one hour in duration being displayed adjacent to one another separated by a half hour delineation mark.

23. An interactive user interface and audio-visual (A/V) system, comprising:

a transceiver coupled to an audio-visual (A/V) display for receiving audio-visual signals in an electronic signal spectrum from a signal source, said transceiver including interface generation means for causing said A/V display to display art interface, said interface including selectively displayed multiple levels of information related to an audio-visual program viewed on said A/V display, wherein said multiple levels of information include information received by said transceiver over a plurality of information tracks;

control means in communication with said transceiver for permitting a user viewing said A/V display to selectively display said multiple levels of information on said A/V display;

wherein said interface generation means is further includes listing means for causing said A/V display to selectively display a program listing that contains listing information related to A/V programs viewable on said A/V display;

wherein said interface generation means includes marking means for marking programs on said program listing.

24. The audio-visual system as defined by claim 23 wherein said control means includes a remote control device operated by said user having direction arrow buttons, including up, down, left and right buttons.

25. The audio-visual system as defined by claim 22 wherein said marking means is activated by said user choosing a selected program from said program listing using said up and down buttons and then activating a mark button on said remote control device.

26. An interactive User interface and audio-visual (A/V) system, comprising:

a transceiver coupled to an audio-visual (A/V) display for receiving audio-visual signals in an electronic signal spectrum from a signal source, said transceiver including interface generation means for causing said A/V display to display an interface, said interface including selectively displayed multiple levels of information related to an audio-visual program viewed on said A/V display;

control means in communication with said transceiver for permitting a user viewing said A/V display to selectively display said multiple levels of information on said A/V display wherein said interface generation means further includes listing means for causing said A/V display to selectively display a program listing that contains listing information related to A/V programs viewable on said A/V display:

wherein said interface generation means includes marking means for marking programs on said program listing, each of said programs on said program listing corresponding to one of said audio-visual signals;

wherein said marking means is activated by said user choosing a selected program from said program listing. Using up and down buttons on said control means and then activating a mark button on said control means;

wherein when said user activates said mark button on said control means, said listing means causes said A/V display to display a reminder mark adjacent to said marked program wherein said interface generation means causes said A/V display to display a reminder indication on a date and at a time based on the date and time that said selected program is carried over the audio-visual signal that corresponds to said marked program.

27. The audio-visual system as defined by claim 26 wherein said interface generation means causes said A/V display to display a reminder icon at a predefined location on said A/V display on the date and at the time that said selected program is carried by one of said audio-visual signals.

28. An interactive user interface and audio-visual (A/V) system, comprising:

a transceiver coupled to an audio-visual (A/V) display for receiving audio-visual signals in an electronic signal spectrum from a signal source, said transceiver including interface generation means for causing said g display to display an interface, said interface including selectively displayed multiple levels of information related to an audio-visual program viewed on said A/V display;

control means in communication with said transceiver for permitting a user viewing said A/V display to selectively display said multiple levels of information on said A/V display;

wherein said interface generation means further includes listing means for causing said A/V display to selectively display a program listing, said program listing including information related to A/V programs viewable on said A/V display;

wherein said interface generation means includes marking means for marking a selected program on said program listing;

wherein said interface generation means causes said A/V display to display a reminder icon at a predefined location on said A/V display on the date and at the time that said selected program is carried by one of said audio-visual signals;

wherein said reminder icon comprises a picture-in-a-picture (PIP) window in which said selected program is displayed.

29. The audio-visual system as defined by claim 28 wherein said control means further includes a jump button, the activation of said jump button by a user while said PIP window is displayed results in said A/V display displaying said selected program in a primary portion of said A/V display, and said program originally displayed in said primary portion displayed in said PIP window.

30. The audio-visual system as defined by claim 29 wherein further repetitive activation of the jump button results in the display in said primary portion of said display of other selected programs which said user has marked using said marking means.

31. The audio-visual system as defined by claim 28 wherein said interface generation means further includes record means for causing programs to be recorded by a storage recorder coupled to said transceiver.

32. The audio-visual system as defined by claim 31 wherein said record means is activated by said user choosing said selected program on said listing using up and down buttons on said control means and then activating a record button on said control means.

33. The audio-visual system as defined by claim 32 whereupon said user activating said record button, said listing means causes said A/V display to display a record icon adjacent to said selected program.

34. The audio-visual system as defined by claim 31 wherein said record means causes said storage recorder to record said selected program on the date and at the time said selected program is received by said transceiver.

35. A method for generating and displaying an interface on an audio-visual (A/V) system comprising the steps of:

receiving audio-visual (A/V) signals in an electronic signal spectrum from a signal source using a transceiver coupled to an A/V display, said transceiver including interface generation means;

said interface generation means causing said A/V display to display an interface, said interface including a currently viewed level of information that has been selected by a user from multiple levels of information related to an audio-visual program viewed on said A/V display;

said user selectively displaying said multiple levels of information on said A/V display using control means in communication with said transceiver;

said user pressing one or more direction buttons on said control means to cause said currently viewed level of information about said audio-visual program to be replaced in said interface with a next level of information about said audio-visual program.

36. The method as defined by claim 35 further including the step of displaying a numeric level indicator identifying the currently viewed level of information.

37. The method as defined by claim 35 wherein said interface is displayed in an overlay region that includes at least one direction cue to identify at least one direction on said A/V display corresponding to at least one additional level of information.

38. The method as defined by claim 37 wherein a plurality of direction cues are displayed on said A/V display, wherein said plurality of direction cues include one or more available direction cues, said available direction cues being highlighted on said A/V display.

39. The method as defined by claim 35 wherein said control means includes a remote control device having direction arrow buttons, said user activating one of said direction arrow buttons corresponding to the direction identified by one of said available direction cues resulting in said transceiver causing said A/V display to display an additional level of information related to a currently viewed program.

40. The method as defined by claim 39 wherein activation of a left and a right direction button on said control means results in movement between pages of information relating to said currently viewed program.

41. The method as defined by claim 39 wherein activation of an up and a down button on said control means results in movement between additional information levels, said additional information levels providing data on a plurality of currently viewed subjects in said currently viewed program.

42. The method as defined by claim 29 wherein said interface is displayed in an overlay region that comprises a horizontal bar on a lower portion of said A/V display.

43. A method for generating and displaying an interface on an audio-visual (A/V) system comprising the steps of:

receiving audio-visual (A/V) signals in an electronic signal spectrum from a signal source using a transceiver coupled to an A/V display, said transceiver including interface generation means for causing said A/V display to display an interface, said interface including selectively displayed multiple levels Of information related to an audio-visual program viewed on said A/V display;

a user selectively displaying said multiple levels of information on said A/V display using control means in communication with said transceiver;

wherein said transceiver further includes:

a switcher and at least one tuner/demodulator coupled to said signal source, said switcher coupling said at least one tuner/demodulator, said A/V display, and a storage means, for switching digital and analog A/V data between said signal source, said A/V display and said storage means, said transceiver further comprising at least one processor unit, at least one system memory unit, at least one data bus, an A/V decoder, an A/V encoder, a control interface unit, and a bus controller cooperatively coupled together for receiving input control and data signals and in response generating output control and data signals for said signal source, said A/V display, and said storage means.

44. The method as defined by claim 43 wherein said electronic signal spectrum includes at least one digital program listing channel, and further including the step of downloading program listing data from said signal source to said system memory.

45. The method as defined by claim 44 wherein said program listing data is downloaded, such that said data is interleaved and wherein said program listing data comprises data for a current date followed by data for another day of the week.

46. The method as defined by claim 44 wherein said program listing data includes program title data.

47. The method as defined by claim 44 wherein said program listing data includes show time data and channel number data.

48. The method as defined by claim 44 wherein said program listing data includes length data and caption data for A/V programs.

49. The method as defined by claim 43 further wherein said interface generation means includes marking means for marking A/V programs in a program listing.

50. The method as defined by claim 49 wherein said marking means is activated by said user choosing a selected A/V program from said program listing using up and down buttons and then activating a mark button on said control means.

51. The method as defined by claim 43 wherein when said user activates a mark button on said control means, a listing means causes said A/V display to display a reminder mark adjacent to a selected program in a program listing.

52. The method as defined by claim 51 wherein said interface generation means causes said A/V display to display a reminder icon at a predefined location on said A/V display on the date and at the time that said selected program is carried on one of said audio-visual signals.

53. The method as defined by claim 43 wherein said electronic signal spectrum comprises analog and digital channels.

54. The method as defined by claim 43 wherein said transceiver further includes listing means for causing said A/V display to selectively display listing information related to A/V programs viewable on said A/V display.

55. The method as defined by claim 54 wherein the activation of said listing means results in a listing interface being displayed on said A/V display.

56. The method as defined by claim 55 wherein said listing means causes said A/V display to display a program listing of currently available A/V programs available to the user for viewing on said A/V display.

57. The method as defined by claim 56 wherein said listing means causes said A/V display to display a first picture-in-picture (PIP) window in which the currently viewed program viewed by said user prior to said activation of said listing means is displayed on said A/V display.

58. The method as defined by claim 57 wherein said listing means causes said A/V display to display a program listing icon to identify to said user that said program listing has been activated.

59. The method as defined by claim 58 wherein said listing means further causes said A/V display to display the current date and time.

60. The method as defined by claim 57 wherein A/V program listings in said program listing are displayed in hourly time slots, programs of less than one hour in duration being displayed adjacent to one another separated by a half hour delineation mark.

61. The method as defined by claim 57 wherein upon activation of said listing means, the listing for the currently viewed program displayed in said first PIP window is highlighted.

62. The method as defined by claim 61 wherein said program listing is selectively scrolled up and down by said user to view additional program listings for said current date and time by continuing to depress, respectively, said up and down buttons on said [remote]control means.

63. The method as defined by claim 61 wherein depressing said up and down buttons selects a particular program listing, said particular program listing being thereby highlighted on said A/V display.

64. The method as defined by claim 61 wherein said interface generation means causes said A/V display to display listings for future time slots if said user depresses a button on said control means where the speed of display increases if the user depresses said button longer than N seconds.

65. A method for generating and displaying an interface on an audio-visual (A/V) system comprising the steps of:

receiving audio-visual (A/V) signals in an electronic signal spectrum from a signal source using a transceiver coupled to an A/V display, said transceiver including interface generation means for causing said A/V display to display an interface, said interface including selectively displayed multiple levels of information related to an audio-visual program viewed on said A/V display;

a user selectively displaying said multiple levels of information on said A/V display using control means in communication with said transceiver;

wherein said transceiver further includes listing means for causing said A/V display to selectively display a program listing that contains information related to A/V programs viewable on said A/V display;

wherein said interface generation means includes marking means for marking a selected program on said program listing;

wherein said interface generation means causes said A/V display to display a reminder icon at a predefined location on said A/V display on the date and at the time that said selected program is carried on one of said audio-visual signals;

wherein said reminder icon includes a picture-in-picture window in which said selected program is displayed.

66. The method as defined by claim 65 further including the step of activating a jump button on said control means, the activation of said jump button results in said A/V display displaying said selected program in a primary portion of said display, said program originally displayed in said primary portion displayed in a PIP window.

67. The method as defined by claim 66 further including the step of said user repetitively activating said jump button resulting in the display in said primary portion of said A/V display of other programs which said user has marked using a marking means.

68. The method as defined by claim 65 wherein said interface generation means further includes record means for causing programs to be recorded by a storage recorder coupled to said transceiver.

69. The method as defined by claim 68 wherein said record means is activated by said user choosing a highlighted program on said program listing using said up and down buttons and then activating a record button on said control means.

70. The method as defined by claim 68 whereupon said user activates said record button, said listing means causes said A/V display to display a record icon adjacent to said highlighted program.

71. The method as defined by claim 69 wherein said record means causes said storage recorder to record said highlighted program on the date and at the time said highlighted program is received by said transceiver.

* * * * *